(12) United States Patent
Chenicheri et al.

(10) Patent No.: US 11,507,925 B1
(45) Date of Patent: Nov. 22, 2022

(54) FOOD SERVICE MANAGEMENT FOR FOOD-ASSOCIATED EVENTS FROM CALENDAR APPLICATION

(71) Applicant: Microsoft Technology Licensing, LLC, Redmond, WA (US)

(72) Inventors: Balagopal Chenicheri, Renton, WA (US); Shabnam Erfani, Kirkland, WA (US); Venkata Sreekanth Kannepalli, Redmond, WA (US); Wende E. Copfer, Woodinville, WA (US); Ashwini Lakshmi Narasimhan, Redmond, WA (US); Jin Young Kim, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 2 days.

(21) Appl. No.: 17/351,007

(22) Filed: Jun. 17, 2021

(51) Int. Cl.
*G06F 3/0482* (2013.01)
*G06Q 10/10* (2012.01)
*G06Q 40/00* (2012.01)

(52) U.S. Cl.
CPC ....... *G06Q 10/1095* (2013.01); *G06F 3/0482* (2013.01); *G06Q 40/12* (2013.12)

(58) Field of Classification Search
CPC .............. G06Q 10/1095; G06F 3/048–05
See application file for complete search history.

(56) References Cited

U.S. PATENT DOCUMENTS

| | | | |
|---|---|---|---|
| 9,898,788 B1* | 2/2018 | Calargun | G06Q 50/12 |
| 10,217,144 B1* | 2/2019 | Hession | H04W 4/023 |
| 11,205,212 B1* | 12/2021 | Iacono | G06Q 30/0641 |
| 11,321,420 B1* | 5/2022 | Fregly | H04L 41/5083 |

(Continued)

OTHER PUBLICATIONS

"Group Orders", Retrieved from: https://web.archive.org/web/20210120025928/https:/corporate.grubhub.com/group-orders/, Jan. 20, 2021, 6 pages.

(Continued)

*Primary Examiner* — Daniel Rodriguez
(74) *Attorney, Agent, or Firm* — International IP Law Group, PLLC

(57) ABSTRACT

A calendar application server, a computer-readable storage medium, and a corresponding method for food service management for food-associated events within the context of a calendar application are described herein. The computer-readable storage medium includes computer-executable instructions that, when executed by processor(s), cause the processor(s) to associate food services with a food-associated event within a calendar application in response to user commands received via an event UI functionality provided by the calendar application, to connect with any of the food services via corresponding APIs in response to user commands received via the event UI functionality provided by the calendar application, to generate food service data for the food-associated event in response to user interaction(s) with any of the food services via corresponding APIs provided within the context of the calendar application, and (Continued)

to reconcile the food service data with food-associated event data corresponding to the food-associated event within the calendar application.

20 Claims, 36 Drawing Sheets

(56) References Cited

U.S. PATENT DOCUMENTS

| | | | |
|---|---|---|---|
| 2005/0256737 A1* | 11/2005 | Liu | G06Q 10/109 |
| | | | 705/2 |
| 2007/0168205 A1* | 7/2007 | Carlson | G06Q 30/00 |
| | | | 705/5 |
| 2008/0162252 A1 | 7/2008 | Lee et al. | |
| 2009/0106296 A1* | 4/2009 | Sickmiller | G06F 40/174 |
| | | | 707/E17.118 |
| 2010/0057864 A1* | 3/2010 | Laird-McConnell | |
| | | | G06Q 10/107 |
| | | | 709/206 |
| 2011/0137929 A1 | 6/2011 | Lehmann et al. | |
| 2013/0151357 A1 | 6/2013 | Havas et al. | |
| 2015/0095073 A1* | 4/2015 | Li | G06Q 30/0269 |
| | | | 705/6 |
| 2015/0254788 A1* | 9/2015 | Gupta | G06Q 30/0282 |
| | | | 705/15 |
| 2015/0339633 A1* | 11/2015 | Conner | G06Q 10/1095 |
| | | | 705/7.19 |
| 2016/0335605 A1 | 11/2016 | Tessler | |
| 2017/0134300 A1* | 5/2017 | Solomakha | G06F 16/9535 |
| 2017/0200096 A1 | 7/2017 | Cocanougher | |
| 2018/0165656 A1* | 6/2018 | Tessler | G06Q 10/10 |
| 2018/0342106 A1* | 11/2018 | Rosado | G06Q 10/109 |
| 2019/0259077 A1* | 8/2019 | Cuppari | G07F 9/001 |
| 2020/0034856 A1* | 1/2020 | Burke | G06Q 30/0201 |
| 2020/0120197 A1* | 4/2020 | Voothkoor | H04M 1/72451 |
| 2021/0073735 A1 | 3/2021 | Wang et al. | |
| 2021/0286705 A1* | 9/2021 | Carter | G06F 16/30 |
| 2021/0374884 A1* | 12/2021 | Cupid | G06Q 30/0635 |
| 2022/0115114 A1* | 4/2022 | Johnston | G06Q 30/0633 |
| 2022/0179527 A1* | 6/2022 | Schulman | G06F 3/04817 |

OTHER PUBLICATIONS

"LunchPro", Retrieved from: https://web.archive.org/web/20210115175648/https:/www.lunchpro.com/, Jan. 15, 2021, 6 Pages.

"Meeting Catering for Offices", Retrieved from: https://web.archive.org/web/20210118130231/https:/info.citypantry.com/corporate-office-catering/meetings, Jan. 18, 2021, 10 Pages.

"VisionCatering for Office365 (PDF)", Retrieved from: https://www.visionpeople.dk/media/136446/vpc_visioncatering_uk.pdf, Retrieved Date: Mar. 26, 2021, 1 Page.

Ibsen, Per, "VisionCatering for Office365", Retrieved from: https://web.archive.org/web/20200929191841/https:/www.visionpeople.dk/en/solutions/additional-solutions-and-nav-addons/visioncatering/, Sep. 29, 2020, 5 Pages.

Ibsen, Per, "VisionCatering forOffice365 (PDF)", Retrieved from https://www.visionpeople.dk/en/solutions/additional-solutions-and-nav-addons/visioncatering/, Retrieved Date: May 21, 2021, 3 Pages.

"International Search Report and Written Opinion Issued in PCT Application No. PCT/US22/028886", dated Aug. 4, 2022, 13 Pages.

* cited by examiner

FIG. 7A

- Save
- Discard
- Scheduling Assistant
- Busy ∨
- Response options ∨
- Resources ...

Calender ∨

Team Lunch Meeting

Invite attendees — Optional

12/21/2020  9:00 AM ∨ to 10:00 AM ∨  All day ⦿

Repeat: Never ∨  Virtual meeting ⦿

Search for a room or location

Remind me: 15 minutes before ∨ — 704   Repeat order ⦿

Include resources like food or transportation

Add a description or attach documents

← → Mon, Dec 21, 2020 ∨

| 8a | |
| 9a | 9 AM - 10 AM  You are available |
| 10a | |
| 11a | |
| 12p | |
| 1p | |
| 2p | |
| 3p | |
| 4p | |

↩ Reply all ⌵ 🗑 Delete ⊘ Junk Block ⋯

Receipt for your event with food

Food Service Manager
Mon 04/26/2021 5:38PM
To: Chandra

Thank you for using: Food service manager
Now that your event is over, here's your receipt for reimbursement.

📅 Team Meeting
🕔 Mon, 26 April 2021, 05:00PM - 05:30Pm
💻 Online meeting

Merchant: Food Service Manager
Total gift card funded: -3
Gift card budget: $33.00
Credit card charged: ****005

| Date | Recipient | Net price | Qty. | Service fees | Total amount |
|---|---|---|---|---|---|
| 04/26/21 | Kerri; Sam | $33.00 | 2 | 3.50% | $68.31 |
| 04/26/21 | Chandra | $33.00 | 1 | 3.50% | $34.16 |
| Total | | | | | $102.47 |

The total amount above has been charged to your payment method ending in 0005.

↶ Reply all ☑ 🗑 Delete ⊘ Junk Block ⋯

[NON_PROD] [Ready for submission]: Expense report for 102.47 USD between April 26,2021 - April 26,2021

MSExpense notifications
Mon 04/26/2021 5:50PM
To: Chandra

1106

Expense Reporting

To save you time, we have your recent expense transaction(s) ready to be submitted for approval on your behalf.

Make sure you review the draft. You can edit details as necessary and click submit and let these transactions be auto-submitted for approval in 4 working days for a touchless expense!

Additional details ∧

Pre-populated expense purpose: ∧

Chandra: Tuesday April 27, 2021 | 102.47 USD

Need add an interim approver ∧

Need to make more changes ∧

| Line item description | Update CC/IO | Is personal transaction |
|---|---|---|
| Food Service \| Mon, Apr 26, 2021 \| 68.31 USD | 000000 | ☐ Yes |
| Food Service \| Mon, Apr 26, 2021 \| 34.16 USD | 000000 | ☐ Yes |

| | |
|---|---|
| View Draft | ∧ |

Chandra
Chandra; Tue, Apr 27, 2021 102.47 USD

Auto submitted Expense for - Chandra: Tue. Apr 27,2021 102.47 USD 102.47 USD
Total amount Date                                         Tue, Apr, 27, 2021
Status                                     Pending Approval

1106

Line items

| Transaction date | Category | Amount | ∨ |
|---|---|---|---|
| Mon Apr 26 2021 | Food Service | 68.31 USD | |
| Transaction date | Category | Amount | ∨ |
| Mon Apr 26 2021 | Food Service | 34.16 USD | |

Total expense amount   102.47 USD
Personal Expense           0.0 USD

Comments (optional)

[Submit]

Share feedback

FOOD SERVICE MANAGEMENT FOR FOOD-ASSOCIATED EVENTS FROM CALENDAR APPLICATION

BACKGROUND

The present disclosure relates to food service management for events. In particular, the present disclosure relates to managing food services for food-associated events within the context of a calendar application.

SUMMARY

The following presents a simplified summary in order to provide a basic understanding of some aspects described herein. This summary is not an extensive overview of the claimed subject matter. This summary is not intended to identify key or critical elements of the claimed subject matter nor delineate the scope of the claimed subject matter. This summary's sole purpose is to present some concepts of the claimed subject matter in a simplified form as a prelude to the more detailed description that is presented later.

In an embodiment described herein, a computer-readable storage medium is described. The computer-readable storage medium includes computer-executable instructions that, when executed by at least one processor, cause the processor(s) to associate food services with a food-associated event within a calendar application in response to first user commands received via an event user interface functionality provided by the calendar application, where at least one of the first user commands includes an authorization to interact with the food services according to a specified budget to select desired food for the food-associated event. The computer-executable instructions, when executed by the processor(s), also cause the processor(s) to connect with any of the food services via corresponding application programming interfaces in response to second user commands received via the event user interface functionality provided by the calendar application, where the corresponding application programming interfaces are provided within the context of the calendar application. The computer-executable instructions, when executed by the processor(s), also cause the processor(s) to generate food service data for the food-associated event in response to user interaction(s) with at least one of the food services via at least one corresponding application programming interface provided within the context of the calendar application, where the user interaction(s) include one or more selections of the desired food for the food-associated event, and where the selection(s) comply with the specified budget for interacting with the food services. The computer-executable instructions, when executed by the processor(s), further cause the processor(s) to reconcile the food service data with food-associated event data corresponding to the food-associated event within the calendar application.

In another embodiment, a calendar application server is described. The calendar application server includes a processor and a computer-readable storage medium operatively coupled to the processor. The computer-readable storage medium includes computer-executable instructions that, when executed by the processor, cause the processor to enable execution of a calendar application on a first remote computing system corresponding to a first calendar, where the first remote computing system is communicably coupled to the calendar application server through a network, as well as to provide a first event user interface surfaced on a display of the first remote computing system in response to a user-initiated creation of a food-associated event with respect to a first calendar within the calendar application. The computer-executable instructions, when executed by the processor, also cause the processor to associate a food service with the food-associated event within the calendar application in response to a first user command received via the first event user interface, where the first user command includes an authorization to interact with the food service according to a specified budget to select desired food for the food-associated event, as well as to transmit a food-associated event invitation to a second remote computing system corresponding to a second calendar in response to a second user command received via the first event user interface, where the second remote computing system is communicably coupled to the calendar application server through the network. The computer-executable instructions, when executed by the processor, also cause the processor to enable execution of the calendar application on the second remote computing system, provide a second event user interface surfaced on a display of the second remote computing system in response to a user-initiated acceptance of the food-associated event invitation, and connect with the food service associated with the food-associated event via an application programming interface corresponding to the food service in response to a third user command received via the second event user interface, where the application programming interface is provided within the context of the calendar application. The computer-executable instructions, when executed by the processor, further cause the processor to generate food service data for the food-associated event in response to a user interaction with the food service via the application programming interface, where the user interaction includes a selection of the desired food for the food-associated event, and where the selection complies with the specified budget for interacting with the food service. The computer-executable instructions, when executed by the processor, further cause the processor to reconcile the food service data with food-associated event data corresponding to the food-associated event within the calendar application such that the food-associated event is updated with respect to the first calendar and the second calendar.

In another embodiments, a method for enabling food service management for a food-associated event within the context of a calendar application is described. The method is implemented via at least one processor. The method includes associating food services with a food-associated event within a calendar application in response to first user commands received via an event user interface functionality provided by the calendar application, where at least one of the first user commands includes an authorization to interact with any of the food services according to a specified budget to select desired food for the food-associated event. The method includes connecting with any of the food services via corresponding application programming interfaces in response to second user commands received via the event user interface functionality provided by the calendar application, where the corresponding application programming interfaces are provided within the context of the calendar application. The method also includes generating food service data for the food-associated event in response to user interaction(s) with at least one of the food services via the corresponding application programming interfaces provided within the context of the calendar application, where the user interaction(s) include one or more selections of the desired food for the food-associated event, and where the selection(s) comply with the specified budget for interacting with the food services. The method further includes reconciling the food service data with food-associated event data corresponding to the food-associated event within the calendar application.

The following description and the annexed drawings set forth in detail certain illustrative aspects of the claimed subject matter. These aspects are indicative, however, of a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

BRIEF DESCRIPTION OF THE DRAWINGS

The following detailed description may be better understood by referencing the accompanying drawings, which contain specific examples of numerous features of the disclosed subject matter.

FIG. 7A is a schematic view of a first event user interface that is overlaid on top of a first calendar user interface within the context of a calendar application, as viewed from the perspective of the event organizer;

FIG. 7B is a schematic view depicting the manner in which the event organizer may click on the user interface element to reveal a corresponding dropdown menu for associating one or more third-party resources, such as, in particular, one or more food services, with the food-associated event;

FIG. 7D is a schematic view depicting the various user interface elements provided by the third-party resource panel in response to the event organizer choosing one or more food services (or one or more types of food services) to associate with the food-associated event;

FIG. 8A is another schematic view of a first event user interface that is provided within the context of a calendar application, as viewed from the perspective of the event organizer;

FIG. 9 is a schematic view depicting another exemplary event user interface including a food service panel that enables an event organizer to select one or more food services to associate with a food-associated event;

FIG. 11A is a schematic view depicting an exemplary event user interface and corresponding food service panel after an event organizer has associated one or more food services with a food-associated event;

FIG. 11B is a schematic view of the event user interface and the corresponding food service panel of FIG. 11A, in which the food service panel includes information regarding the payment method for interacting with the food service(s) associated with the event;

FIG. 11C is a schematic view of a receipt message that may be received by the event organizer after the food-associated event is over;

FIG. 11D is a schematic view of an expense reporting message that may be received by the event organizer after the food-associated event is over;

FIG. 12B is a schematic view of the chat-based messaging user interface of FIG. 12A, showing the manner in which the event user interface provides information regarding the food-associated event and any food service(s) that have been associated with the event;

DETAILED DESCRIPTION

Figure 1:
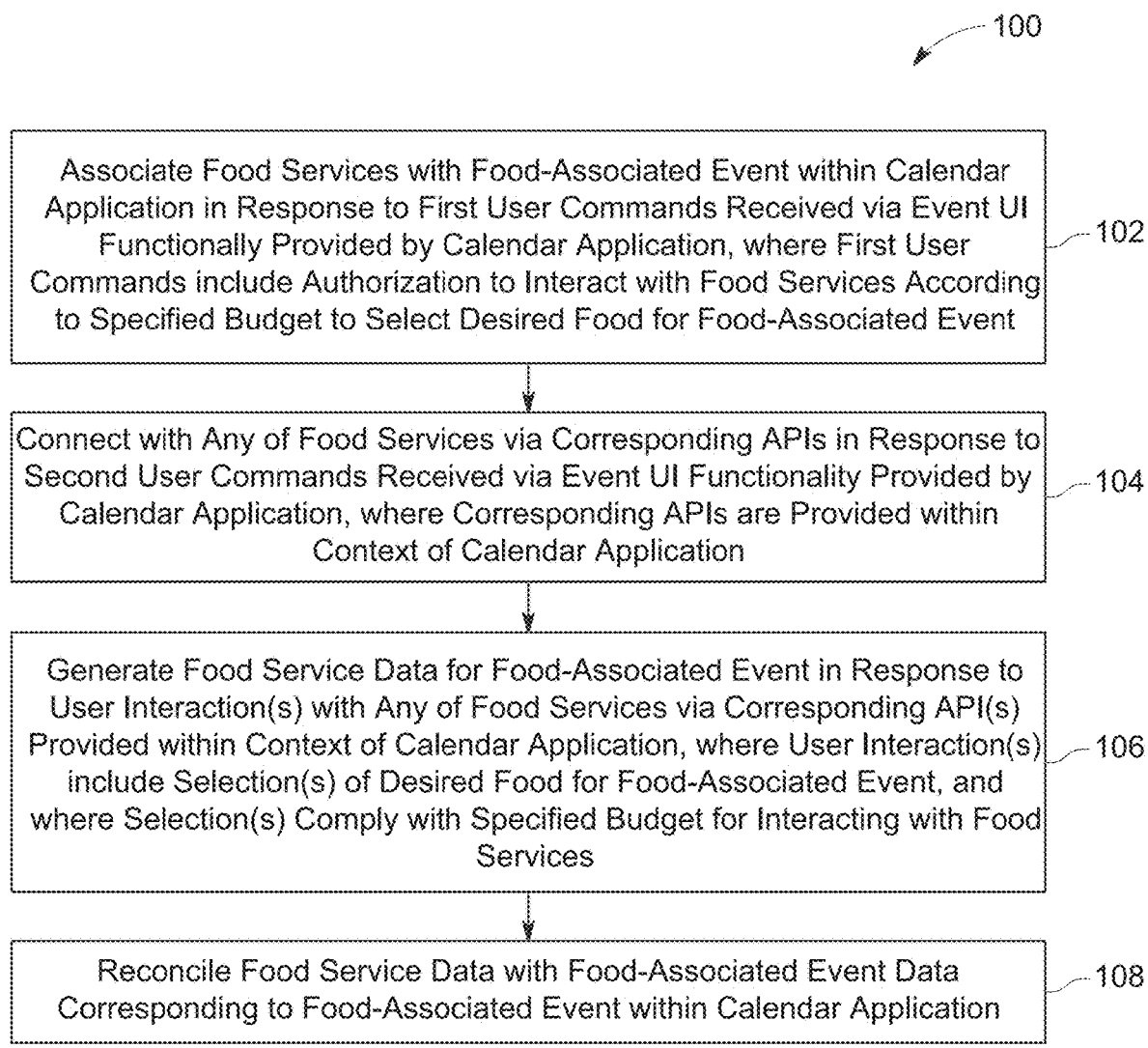
FIG. 1 is a process flow diagram of an exemplary method for enabling food service management for a food-associated event within the context of a calendar application according to embodiments described herein.

In today's environment, the use of calendar applications for time management and scheduling purposes has increased dramatically. In particular, such calendar applications are often used to create and/or manage food-associated events, such as, for example, virtual or in-person work meetings that occur during breakfast or lunch time as well as conferences or parties that typically include food. According to conventional techniques, the event organizer typically orders the desired food for the event by separately interacting with one or more food services outside the context of the calendar application. As an example, when an event organizer plans a work meeting during lunch time, the event organizer may order a catered meal for the work meeting by separately accessing the website of the corresponding restaurant or food delivery service to order the meal. As another example, when the event organizer creates the food-associated event within the calendar application, the event organizer may associate links to food-service websites and/or applications with the food-associated event within the calendar application. However, to actually access such food services, the event organizer and individual event attendees must follow the links to the websites and/or applications and, thus, navigate away from the food-associated event view provided by the calendar application. Accordingly, the utilization of such food services occurs outside the context of the calendar application and is not integrated into the food-associated event information within the calendar application in any meaningful way. This, in turn, places an additional burden on event organizers and event attendees since they are forced to separately manage and/or interact with the food services associated with the food-associated event.

Furthermore, according to conventional techniques, event attendees are generally limited in their interaction with the food services. Specifically, due to the technical constraints imposed by conventional techniques, the scope of interaction between the event attendees and the food services may be specifically defined by the event organizer such that the event attendees' choices with respect to the food services are restricted. For example, in most cases, the event attendees are limited to selecting food from a single restaurant or a single food delivery service. As a result, the event attendees' experience with respect to the food-associated event may be negatively impacted when the available food options do not adequately meet their food preferences and/or dietary restrictions.

The aforementioned issues associated with conventional techniques have been further amplified in today's environment, in which the percentage of meetings (and other events) which are conducted virtually (or remotely) has proliferated to the point where it is often not practical for the event organizer to order food for all the event attendees. For the most part, this has led to a decrease in the number of events that include a food-related component. However, this has a negative impact on the effectiveness of events, since including food with events naturally furthers and elevates the social aspect of such events, increasing the sense of togetherness or social connection between the event attendees.

Moreover, even when such virtual events do include a food-related component, it often becomes burdensome for the event organizer and/or the event attendees to reconcile expenses associated with the utilized food services. For example, if the event organizer allows the event attendees to order their own food and then submit their expenses for reimbursement, the event organizer often has to reconcile all the expenses to create a single expense report for the event. Alternatively, if the event attendees are forced to separately request reimbursement for every food-associated event they attend, it may become so tedious that they opt out of ordering any food at all. Therefore, conventional techniques are clearly not optimized for today's environment.

The present techniques solve this issue by providing for the management of food services associated with food-associated events within the context of a calendar application. In other words, the present techniques enable food services to be managed as part of the food-associated event functionality provided by the calendar application, without separately navigating to the websites and/or applications associated with such food services. According to embodiments described herein, this is accomplished via an event user interface (UI) that is provided by the calendar application to enable one or more users of one or more corresponding computing systems to select one or more food services (or types of food services) and to connect with the food service(s) through corresponding application programming interface(s) (API(s)). The food-associated event UI further enables the user(s) to input information for interacting with the food service(s) through the API(s), as provided within the context of the calendar application. In various embodiments, the user interaction(s) with the food service(s) include selection(s) of desired food for the event. Moreover, in various embodiments, the user interaction(s) with the food service(s) are guided and/or limited by predefined parameters for the food-associated event, such as a specified budget for ordering food (e.g., as defined on a per-user basis). Any information input by the user(s) is then automatically reconciled with the food-associated event information within the calendar application such that the food service(s) are directly associated with the food-associated event itself. As a result, the user(s) are able to access and utilize the food service(s) within the context of the food-associated event view provided by the calendar application without having to separately manage the food service(s). Accordingly, the present techniques simplify the process of planning and/or attending the food-associated event by deeply integrating relevant food-service websites and/or applications with the calendar application such that the corresponding food services can be seamlessly managed within the context of the calendar application.

Furthermore, the present techniques provide for the automatic generation of expense reports for food-associated events, also within the context of the calendar application. In some embodiments, this expense reporting functionality is provided by the calendar application itself, while, in other embodiments, it is provided by a separate expense reporting service that is integrated with the calendar application. In either case, the expense report is generated using the reconciled food-associated event information that includes the information regarding the user interaction(s) with the food service(s) for the event.

As a preliminary matter, some of the figures describe concepts in the context of one or more structural components, referred to as functionalities, modules, features, elements, etc. The various components shown in the figures can be implemented in any manner, for example, by software, hardware (e.g., discrete logic components, etc.), firmware, and so on, or any combination of these implementations. In one embodiment, the various components may reflect the use of corresponding components in an actual implementation. In other embodiments, any single component illustrated in the figures may be implemented by a number of actual components. The depiction of any two or more separate components in the figures may reflect different functions performed by a single actual component.

Other figures describe the concepts in flowchart form. In this form, certain operations are described as constituting distinct blocks performed in a certain order. Such implementations are exemplary and non-limiting. Certain blocks described herein can be grouped together and performed in a single operation, certain blocks can be broken apart into plural component blocks, and certain blocks can be performed in an order that differs from that which is illustrated herein, including a parallel manner of performing the blocks. The blocks shown in the flowcharts can be implemented by software, hardware, firmware, and the like, or any combination of these implementations. As used herein, hardware may include computing systems, discrete logic components, such as application specific integrated circuits (ASICs), and the like, as well as any combinations thereof.

As for terminology, the phrase "configured to" encompasses any way that any kind of structural component can be constructed to perform an identified operation. The structural component can be configured to perform an operation using software, hardware, firmware and the like, or any combinations thereof. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware.

The term "logic" encompasses any functionality for performing a task. For instance, each operation illustrated in the flowcharts corresponds to logic for performing that operation. An operation can be performed using software, hardware, firmware, etc., or any combinations thereof.

As utilized herein, the terms "component," "system," "client," and the like are intended to refer to a computer-related entity, either hardware, software (e.g., in execution), and/or firmware, or a combination thereof. For example, a component can be a process running on a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any tangible, computer-readable storage medium.

Moreover, as used herein, the term "computer-readable storage medium" refers to an article of manufacture. In general, computer-readable storage media are used to host, store and/or reproduce computer-executable instructions and data for later retrieval and/or execution. When the computer-executable instructions that are hosted or stored on the computer-readable storage media are executed by a processor of a computing system, the execution thereof causes, configures and/or adapts the executing computing system to carry out various steps, processes, routines, methods and/or functionalities, including the steps, processes, routines, methods, and/or functionalities described herein. Examples of computer-readable storage media include, but are not limited to, optical storage media (such as Blu-ray discs, digital video discs (DVDs), compact discs (CDs), optical disc cartridges, and the like), magnetic storage media (such as hard disk drives, floppy disks, magnetic tape, and the like), memory storage devices (such as random access memory (RAM), read-only memory (ROM), memory cards, thumb drives, and the like), and cloud storage (such as online storage services). Computer-readable storage media may deliver computer-executable instructions to a computing system for execution via various transmission means and mediums, including carrier waves and/or propagated signals. However, for purposes of this disclosure, the term "computer-readable storage medium (or media)" refers specifically to non-transitory forms of computer-readable storage media and expressly excludes carrier waves and/or propagated signals.

Exemplary Methods for Food Service Management for Event within Context of Calendar Application The following is a description of several exemplary methods for implementing the food service management techniques described herein. Specifically, FIG. 1 is a process flow diagram of an exemplary method 100 for enabling food service management for a food-associated event within the context of a calendar application according to embodiments described herein. According to embodiments described herein, the calendar application may include any application that includes calendar, scheduling, and/or time management functionalities, even if the application also provides other, non-calendar-related functionalities. Non-limiting examples of such calendar applications include the Microsoft Outlook application and the Microsoft Teams application provided by Microsoft Corporation. Moreover, according to the embodiment described with respect to FIG. 1, the calendar application (or at least a portion thereof) is provided by a calendar application server, such as the calendar application server described with respect to FIG. 5, as a web-based application. However, those skilled in the art will appreciate that, in other embodiments, the calendar application (or at least a portion thereof) may be provided as a computer-based application residing on remote computing systems, as described herein.

In various embodiments, the method 100 is executed by the calendar application server in conjunction with two or more remote computing systems that are communicably coupled to the calendar application server via a network. In some embodiments, such remote computing systems include a remote computing system that is operated by an event organizer (where the term "event organizer" refers to a user who schedules and/or manages a food-associated event within the calendar application), as well as one or more remote computing systems operated by one or more event attendees (where the term "event attendee" refers to a user who is invited to attend the food-associated event and consequently accepts the food-associated event invitation). In various embodiments, the remote computing systems operated by the event organizer and the event attendee(s) may include any types of computing systems that are currently executing (or running) the calendar application and are signed into a corresponding user profile or calendar account. Moreover, in various embodiments, the calendar application server includes one or more processors and one or more computer-readable storage media including computer-executable instructions that, when executed by the processor(s), cause the processor(s) to perform the blocks of the method 100.

Turning now to the details of the method 100, the method 100 begins at block 102, at which food services are associated with a food-associated event within the calendar application in response to first user commands received via an event user interface functionality provided by the calendar application, where at least one of the first user commands includes an authorization to interact with the food services according to a specified budget to select desired food for the food-associated event. In various embodiments, data relating to the first user commands are received from the remote computing system operated by the event organizer. Furthermore, in various embodiments, the event organizer specifies the budget as a predefined amount for each user who is authorized to interact with the food services or, in other words, for each event attendee.

According to embodiments described herein, the term "food-associated event" may include any type of meeting, party, appointment, conference, or other scheduling item within a calendar that includes a food-related component, whether such meeting, party, appointment, conference, or other scheduling item is virtual or in-person. Moreover, according to embodiments described herein, the term "food" includes any edible substance, including both solids, liquids (e.g., beverages), and any combination thereof.

Furthermore, according to embodiments described herein, the term "event user interface" refers to a machine-user interface (such as, for example, a graphical user interface) including an interactive visualization that enables a user of a computing system to visualize and interact with food-associated event data corresponding to the food-associated event through graphical elements, icons, and the like rendered on the display of the computing system. Moreover, the event user interface described herein includes additional functionalities for enabling the user of the computing system to interact with one or more food services without switching contexts or, in other words, without navigating away from the calendar application, as described further herein.

At block 104, one or more connections are established with any of the food services via corresponding application programming interfaces (APIs) in response to second user commands received via the event user interface functionality provided by the calendar application, where the corresponding application programming interfaces are provided within the context of the calendar application. At block 106, food service data are generated for the food-associated event in response to user interaction(s) with any of the food services via corresponding application programming interface(s) provided within the context of the calendar application, where the user interaction(s) include selection(s) of the desired food for the food-associated event, and where the selection(s) comply with the specified budget for interacting with the food services. In various embodiments, data relating to the second user commands and the user interaction(s) with the food service(s) are received from one or more remote computing systems operated by the event attendee(s). In addition, in some embodiments, a portion of the data relating to the second user commands and the user interaction(s) with the food service(s) are received from the remote computing system operated by the event organizer, particularly for embodiments in which the event organizer also desires to order food for the food-associated event.

In various embodiments, the food services include one or more food delivery services and/or one or more restaurants, although those skilled in the art will appreciate that other types of food services can also be utilized. For example, in some embodiments, the food services also include one or more food-related donation services that enable event attendees to donate food and/or available funds (e.g., as determined by the specified budget) to one or more charities in lieu of (or in addition to) ordering their own food for the food-associated event. As an example, an event attendee may order their own food from a food delivery service and then donate any funds remaining in the budget to a food-related donation service.

At block 108, the food service data are reconciled with food-associated event data corresponding to the food-associated event within the calendar application. In various embodiments, the reconciled food-associated event data are then provided to the remote computing system operated by the event organizer such that the food service data generated as a result of the user interaction(s) with the food service(s) are presented via the event user interface functionality.

In addition, in various embodiments, an expense report may be provided to the remote computing system operated by the event organizer. The expense report may include expenses associated with the user interaction(s) with the food service(s). In some embodiments, this expense report functionality is provided by the calendar application server itself. In such embodiments, the method 100 may further include analyzing the reconciled food-associated event data including the food service data to determine costs associated with the user interaction(s) with the food service(s), generating an expense report based on the determined costs, and linking the expense report with the food-associated event within the calendar application. In other embodiments, this expense report functionality is provided by a separate expense reporting service that is integrated with the food service management functionality of the calendar application. In such embodiments, the method 100 may further include enabling the expense reporting service to access the reconciled food-associated event data including the food service data to determine costs associated with the user interaction(s) with the food service(s), where the expense reporting service generates an expense report based on the determined costs, as well as linking the resulting expense report with the food-associated event within the calendar application.

The block diagram of FIG. 1 is not intended to indicate that the blocks of the method 100 are to be executed in any particular order, or that all of the blocks of the method 100 are to be included in every case. Moreover, any number of additional blocks may be included within the method 100, depending on the details of the specific implementation. As an example, in some embodiments, the method 100 also includes using one or more machine learning techniques to enrich the user interaction(s) with the food service(s) by, for example, predicting particular food services, food categories, and/or meal types that are likely to be of interest to the user, as described further herein. As another example, in some embodiments, the method 100 also includes transmitting one or more reminders to access the food service(s) prior to the food-associated event. In such embodiments, the reminder(s) may be provided to the remote computing system(s) in the form of calendar notifications and/or email or chat-based messages. As an example, such reminders may be sent 48 hours and/or 24 hours before the scheduled time for the food-associated event.

Figure 2:
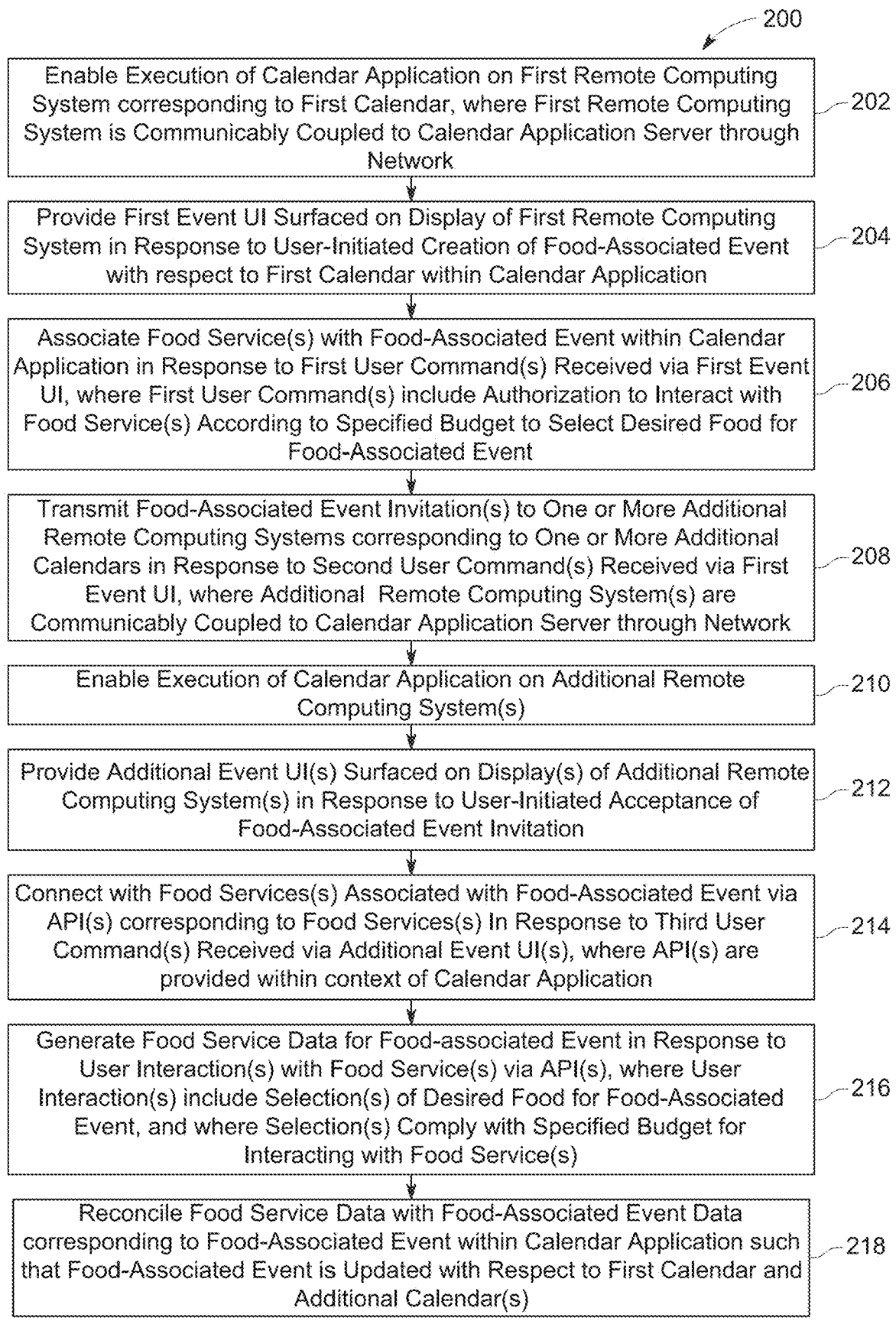
FIG. 2 is a process flow diagram of another exemplary method for enabling food service management for a food-associated event within the context of a calendar application according to embodiments described herein.

FIG. 2 is a process flow diagram of another exemplary method 200 for enabling food service management for a food-associated event within the context of a calendar application according to embodiments described herein. In various embodiments, the method 200 is executed by the calendar application server described herein, where the calendar application server is communicably coupled to two or more remote computing systems via a network. According to the embodiment described with respect to FIG. 2, such remote computing systems include a first remote computing system that is operated by the event organizer, a second remote computing system that is operated by an event attendee, and (optionally) any number of additional remote computing systems operated by additional event attendees. Moreover, in various embodiments, the calendar application server includes one or more processors and one or more computer-readable storage media including computer-executable instructions that, when executed by the processor(s), cause the processor(s) to perform the blocks of the method 200.

The method 200 begins at block 202, at which execution of a calendar application is enabled on a first remote computing system corresponding to a first calendar. At block 204, a first event user interface is provided surfaced on a display of the first remote computing system in response to a user-initiated creation of a food-associated event with respect to a first calendar within the calendar application. It should be noted that the terms "first" and "second", when used herein in reference to the event user interface and other aspects or elements of the techniques described herein, are generally used to describe the event user interface and other aspects/elements from the perspective of different users. For example, the terms "first event user interface" and "second event user interface" are generally used to refer to differing views of the event user interface based on the role of the user operating the computing system. For example, the first event user interface surfaced on the display of the first computing system may be operated by the event organizer, while the second event user interface surfaced on the display of the second computing system may be operated by an event attendee. In addition, those skilled in the art will appreciate the event user interface described herein can take various forms depending on the manner in which it is provided. In particular, in some embodiments, the event user interface may be provided by the calendar application within the context of the overall calendar user interface. However, in other embodiments, the event user interface (or some portion thereof) may be provided by the calendar application within the context of a messaging user interface (such as, for example, an email or chat-based messaging user interface, as described further herein).

At block 206, food service(s) are associated with the food-associated event within the calendar application in response to first user command(s) received via the first event user interface. The first user command(s) include an authorization to interact with the food service(s) according to a specified budget (e.g., as defined on a per user basis) to select desired food for the food-associated event.

At block 208, a food-associated event invitation is transmitted to one or more additional remote computing systems corresponding to one or more additional calendars (e.g., including a second remote computing system corresponding to a second calendar) in response to second user command(s) received via the first event user interface. In various embodiments, the second user commands include the input of the electronic contact information (e.g., email addresses) of the desired event attendee(s) by the event organizer operating the first remote computing system, as well as the sending of the food-associated event invitation to such event attendee(s) via electronic means (e.g., via the email or messaging functionality provided by the calendar application itself or another integrated application). Moreover, in various embodiments, the event attendee(s) may receive the food-associated event invitation in various forms, such as, for example, as a calendar notification and/or as an email or chat-based message.

At block 210, execution of the calendar application is enabled on the additional remote computing system(s) (e.g., including the second remote computing system). In some embodiments, the execution of the calendar application is initiated on each additional remote computing system in response to user input including an opening of the food-associated event invitation by the event attendee operating the remote computing system. For example, if the event attendee receives the food-associated event invitation as an email message within their email inbox, the calendar application may be executed in response to the event attendee clicking on a user interface element embedded within the email message.

At block 212, one or more additional event user interfaces (e.g., including the second event user interface) are provided surfaced on display(s) of the additional remote computing system(s) in response to a user-initiated acceptance of the food-associated event invitation. In various embodiments, the user-initiated acceptance of the food-associated event invitation is in the form of a user input via a user interface element that indicates an intention to attend the food-associated event. Moreover, in various embodiments, the acceptance of the food-associated event invitation causes the calendar application to associate the food-associated event with the corresponding user calendar by integrating the food-associated event data into the calendar data for the calendar.

At block 214, one or more connections are established with one or more of the food services associated with the food-associated event via application programming interface(s) corresponding to the food service(s), where the application programming interface(s) are provided within the context of the calendar application. In various embodiments, each of the third user commands includes a user input indicating a desire to access one of the food services. Such user input may be received in the form of a user selection of (or interaction with) a toggle, button, dropdown menu, or other user interface element provided by the event user interface. Moreover, in response to such user input, the calendar application may automatically establish the connection with the food service via the corresponding application programming interface. Specifically, in various embodiments, the application programming interface enables the calendar application server (and/or the remote computing system executing the calendar application) to communicate with the food service over the network. Furthermore, in various embodiments, the connection with the food service may be visually presented in the form of an overlay of information corresponding to the food service within the event user interface surfaced on the display of the corresponding remote computing system. Such visually-overlaid information may include, but is not limited to, options for ordering food from the food service. Moreover, in various embodiments, connections with multiple food services may be simultaneously presented in the form of an overlay of information corresponding to all the food services within the event user interface surfaced on the display of the corresponding remote computing system, such that the food options offered by the different food services can be easily viewed and/or compared.

At block 216, food service data are generated for the food-associated event in response to user interaction(s) with the food service(s) via the corresponding application programming interface(s). Such user interaction(s) include one or more selections of desired food for the food-associated event, where such selection(s) comply with the specified budget for interacting with the food service(s). In various embodiments, the generated food service data include data corresponding to the selection(s) of the desired food, as well as expense information corresponding to such selection(s).

At block 218, the food service data are reconciled with food-associated event data corresponding to the food-associated event within the calendar application such that the food-associated event is updated with respect to the first calendar and the additional calendar(s) (e.g., including the second calendar). In various embodiments, the reconciled food-associated event data are then provided to the first remote computing system operated by the event organizer such that the food service data generated as a result of the user interaction(s) with the food service(s) are presented via the first event user interface surfaced on the display of the first remote computing system.

In addition, in various embodiments, an expense report may be provided to the first remote computing system corresponding to the first calendar (e.g., the calendar of the event organizer). The expense report may include expenses associated with the user interaction(s) with the food service(s). In some embodiments, this expense report functionality is provided by the calendar application server itself. In such embodiments, the method 200 may further include analyzing the reconciled food-associated event data including the food service data to determine costs associated with the user interaction(s) with the food service(s) via the additional remote computing system(s) corresponding to the additional calendar(s) (e.g., including the second remote computing system corresponding to the second calendar), generating an expense report based on the determined costs, and providing the expense report to the first remote computing system corresponding to the first calendar. In other embodiments, this expense report functionality is provided by a separate expense reporting service that is integrated with the food service management functionality of the calendar application. In such embodiments, the method 200 may further include enabling the expense reporting service to access the reconciled food-associated event data including the food service data to determine costs associated with the user interaction(s) with the food service(s) via the additional remote computing system(s) corresponding to the additional calendar(s) (e.g., including the second remote computing system corresponding to the second calendar), where the expense reporting service generates an expense report based on the determined costs, as well as providing the expense report to the first remote computing system corresponding to the first calendar. As an example of this expense reporting functionality, if the food-associated event is a virtual team meeting in the morning, the event organizer may utilize the event user interface provided by the calendar application to enable each event attendee to spend a specified amount of money ordering their preferred coffee beverage from a particular coffee shop (or from their own preferred or local coffee shop), and the event organizer may then receive a consolidated expense report including the total food-related costs for the food-associated event.

Moreover, in various embodiments, the calendar application may enable any number of additional food services to access the reconciled food-associated event data (or some portion thereof) to coordinate other food-related tasks and/or to provide other types of food-related goods and/or services for the food-associated event. As an example, if the reconciled food-associated event data include information regarding a meal that is being provided for the food-associated event, the calendar application may enable a food service offering beverages to view the reconciled food-associated event data including the meal information to determine suitable beverages for the food-associated event.

The block diagram of FIG. 2 is not intended to indicate that the blocks of the method 200 are to be executed in any particular order, or that all of the blocks of the method 200 are to be included in every case. Moreover, any number of additional blocks may be included within the method 200, depending on the details of the specific implementation. For example, in some embodiments, the method 200 also includes enabling the event organizer operating the first remote computing system to directly interact with any of the food service(s) associated with the food-associated event. In such embodiments, the method 200 may include connecting with the food service(s) via corresponding application programming interface(s) in response to fourth user command(s) received via the first event user interface surfaced on the display of the first remote computing system. In such embodiments, the method 200 may also include generating additional food service data for the food-associated event in response to one or more additional user interactions with the food service(s) via the corresponding application programming interface(s), as well as reconciling the additional food service data with the food-associated event data corresponding to the food-associated event within the calendar application such that the food-associated event is further updated with respect to the first calendar and the additional calendar(s). As an example of such embodiments, if the food-associated event is a lunch meeting, the event organizer may utilize the event user interface to order their own preferred lunch for the meeting, in addition to enabling other team members to order their own preferred lunches for the meeting, all within the context of the calendar application.

Furthermore, in some embodiments, the term "event" may encompass multiple food-associated events that are linked together within the calendar application. For example, if an event organizer is planning multiple, back-to-back meetings with the same event attendees, the event organizer may want to associate one or more food services with both meetings such that the event attendees have a specified budget for ordering food for both meetings. Accordingly, the event user interface may include a linking option by which the event organizer can provide input (e.g., via a toggle, toggle, button, dropdown menu, or other user interface element) indicating an intention to link the two meetings together such that they are treated as one event with respect to the food service management techniques described herein.

In addition, while the food service management techniques provided herein are primarily described with reference to managing food services for newly-created food-associated events, those skilled in the art will appreciate that such techniques can be easily extended to managing food services for existing food-associated events. In particular, the techniques described herein may enable the user to associate food services with a food-associated event at any time before the occurrence of the food-associated event.

In some embodiments, the food service management functionality described herein is provided as part of a third-party resource management functionality of the calendar application. In such embodiments, the calendar application enables users to manage, not only one or more food services for the food-associated event, but also one or more other third-party resources, such as one or more third-party services and/or applications offering suitable goods and/or services for the food-associated event. However, in other embodiments, the food service management functionality described herein is provided as an independent, stand-alone feature of the calendar application. Thus, the techniques described herein may be suitable for implementation within highly-food-specific applications that include calendar, scheduling, and/or time management functionalities.

Figure 3:
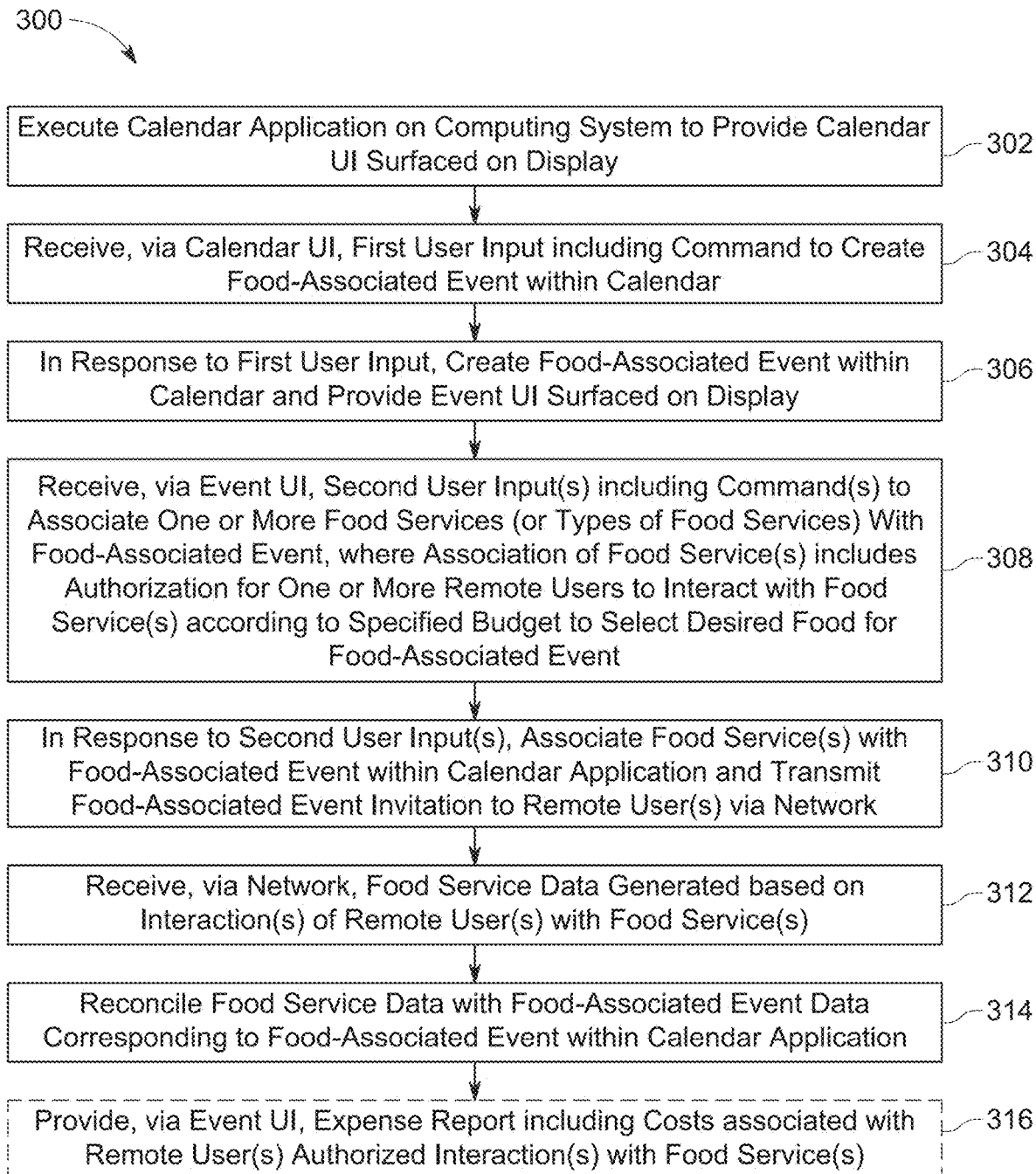
FIG. 3 is a process flow diagram of an exemplary method for managing food services for a food-associated event within the context of a calendar application according to embodiments described herein.

FIG. 3 is a process flow diagram of an exemplary method 300 for managing food services for a food-associated event within the context of a calendar application according to embodiments described herein. The method 300 is executed via a computing system including a processor and a display operatively coupled to each other, such as, for example, the computing system described with respect to FIG. 4, where the computing system is operated by the event organizer. Moreover, in various embodiments, the method 300 of FIG. 3 is similar to the methods 100 and 200 of FIGS. 1 and 2, respectively. However, the method 300 is implemented from the perspective of the computing system operated by the event organizer (or other user who is managing the food-associated event), rather than from the perspective of the calendar application server. Furthermore, according to the embodiment described with respect to FIG. 3, the calendar application (or at least a portion thereof) may be a computer-based application residing within the memory and/or storage of the computing system.

The method 300 begins at block 302, at which a calendar application is executed on the computing system to provide a calendar user interface surfaced on the display. At block 304, a first user input including a command to create a food-associated event within a calendar is received via the calendar user interface. At block 306, the food-associated event is created within the calendar and an event user interface is provided surfaced on the display in response to the first user input.

At block 308, one or more second user inputs including one or more commands to associate one or more food services (or types of food services) with the food-associated event are received via the event user interface. The association of the food service(s) with the food-associated event includes an authorization to interact with the food service(s) according to a specified budget to select desired food for the food-associated event. In various embodiments, such authorization is directed to one or more desired event attendees, and the specified budget may include a predefined amount that each event attendee is authorized to spend ordering food for the food-associated event. In addition, at block 310, the food service(s) are associated with the food-associated event within the calendar application and a food-associated event invitation is transmitted to one or more remote user(s) (e.g., the desired event attendees) in response to one or more second user inputs.

At block 312, food service data generated based on the interaction(s) of the remote user(s) with the food service(s) are received via the network. At block 314, the food service data are then reconciled with the food-associated event data corresponding to the food-associated event within the calendar application. At optional block 316, an expense report including the costs associated with the remote users' authorized interaction(s) with the food service(s) may be provided (e.g., visually presented) via the event user interface.

The block diagram of FIG. 3 is not intended to indicate that the blocks of the method 300 are to be executed in any particular order, or that all of the blocks of the method 300 are to be included in every case. Moreover, any number of additional blocks may be included within the method 300, depending on the details of the specific implementation.

Figure 4:
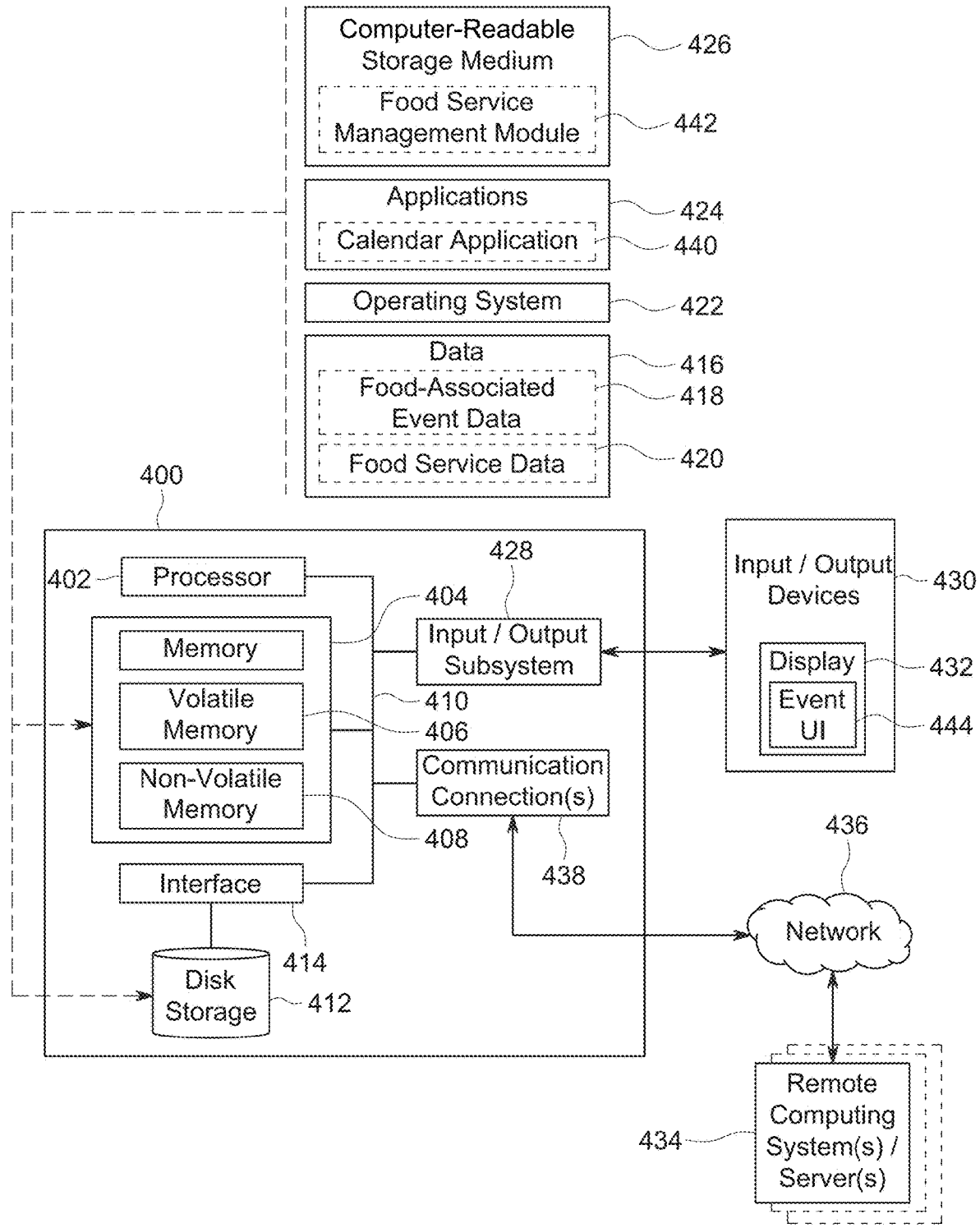
FIG. 4 is a block diagram of an exemplary computing system for implementing the food service management techniques described herein.

Exemplary Computing System and Network Environment for Implementing Food Service Management Techniques Described Herein FIG. 4 is a block diagram of an exemplary computing system 400 for implementing the food service management techniques described herein. In various embodiments, the computing system 400 is operated by a user, where such user may be an event organizer or an event attendee, as described herein. The exemplary computing system 400 includes a processor 402 and a memory 404. The processor 402 may include any suitable type of processing unit or device, such as, for example, a single-core processor, a multi-core processor, a computing cluster, or any number of other configurations. Moreover, the processor 402 may include an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combinations thereof, designed to perform the functions described herein.

The memory 404 typically (but not always) includes both volatile memory 406 and non-volatile memory 408. The volatile memory 406 retains or stores information so long as the memory is supplied with power. By contrast, the non-volatile memory 408 is capable of storing (or persisting) information even when a power supply is not available. The volatile memory 406 may include, for example, RAM (e.g., synchronous RAM (SRAM), dynamic RAM (DRAM), synchronous dynamic RAM (SDRAM), and the like) and CPU cache memory. The nonvolatile memory 408 may include, for example, read-only memory (ROM) (e.g., programmable ROM (PROM), electrically programmable ROM (EPROM), electrically erasable ROM (EEROM) or the like), flash memory, nonvolatile random-access memory (RAM), solid-state memory devices, memory storage devices, and/or memory cards.

The processor 402 and the memory 404, as well as other components of the computing system 400, are interconnected by way of a system bus 410. The system bus 410 can be implemented using any suitable bus architecture known to those skilled in the art.

According to the embodiment shown in FIG. 4, the computing system 400 also includes a disk storage 412. The disk storage 412 may include any suitable removable/non-removable, volatile/non-volatile storage component or device. For example, the disk storage 412 may include, but is not limited to, a magnetic disk drive, floppy disk drive, tape drive, Jaz drive, Zip drive, LS-210 drive, flash memory card, memory stick, or the like. In addition, the disk storage 412 may include storage media separately from (or in combination with) other storage media including, but not limited to, an optical disk drive, such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 412 to the system bus 410, a removable or non-removable interface is typically used, such as interface 414 shown in FIG. 4.

In various embodiments, the disk storage 412 and/or the memory 404 are used to store data 416 relating to the techniques described herein. Such data may include, for example, food-associated event data 418 relating to one or more food-associated events scheduled with respect to a calendar application, as well as food service data 420 that are associated with the one or more food-associated events and may be reconciled with the food-associated event data, as described herein.

Those skilled in the art will appreciate that FIG. 4 describes software that acts as an intermediary between a user of the computing system 400 and the basic computing resources described with respect to the operating environment of the computing system 400. Such software includes an operating system 422. The operating system 422, which may be stored on the disk storage 412, acts to control and allocate the computing resources of the computing system 400. Moreover, system applications 424 take advantage of the management of the computing resources by the operating system 422 through one or more program modules stored within a computer-readable storage medium (or media) 426, as described further herein.

The computing system 400 also includes an input/output (I/O) subsystem 428. The I/O subsystem 428 includes a set of hardware, software, and/or firmware components that enable or facilitate inter-communication between the user of the computing system 400 and the processor 402 of the computing system 400. During operation of the computing system 400, the I/O subsystem 428 enables the user to interact with the computing system 400 through various input/output (I/O) devices 430. Such I/O devices 430 may include any number of input devices or channels, such as, for example, one or more touchscreen/haptic input devices, one or more buttons, one or more pointing devices, one or more accessories, one or more audio input devices, and/or one or more video input devices, such as a camera. As an example, in some embodiments, such input devices or channels include one or more Natural User Interface (NUI) devices, where the term "Natural User Interface (NUI)" refers to any interface technology that enables a user to interact with a device in a "natural" manner, free from artificial constraints imposed by input devices such as mice, keyboards, remote controls, and the like. In some examples, NUI devices include devices relying on speech recognition, touch and stylus recognition, gesture recognition both on screen and adjacent to the screen, air gestures, head and eye tracking, voice and speech, vision, touch, gestures, and machine intelligence. For example, NUI devices can include touch-sensitive displays, voice and speech recognition, intention and goal understanding, and motion gesture detection using depth cameras such as stereoscopic camera systems, infrared camera systems, RGB camera systems, and combinations of these. NUI devices can also include motion gesture detection using accelerometers or gyroscopes, facial recognition, three-dimensional (3D) displays, head, eye, and gaze tracking, immersive augmented-reality and virtual-reality systems, all of which provide a more natural interface. Furthermore, in some embodiments the one or more input devices or channels connect to the processor 402 through the system bus 410 via one or more interface ports (not shown) integrated within the I/O subsystem 428. Such interface ports may include, for example, a serial port, a parallel port, a game port, and/or a universal serial bus (USB).

In addition, such I/O devices 430 may include any number of output devices or channels, such as, for example, one or more audio output devices, one or more haptic feedback devices, and/or one or more display devices, such as display 432. Such output devices or channels may use some of the same types of ports as the input devices or channels. Thus, for example, a USB port may be used to both provide input to the computing system 400 and to output information from the computing system 400 to a corresponding output device. Moreover, in some embodiments, the one or more output devices or channels are accessible via one or more adapters (not shown) integrated within the I/O subsystem 428.

In some embodiments, the display 432 is a built-in display screen of the computing system 400. In other embodiments, the display 432 is an external display screen. Moreover, in various embodiments, the display 432 is a touchscreen that serves as both an input and an output device.

In various embodiments, the computing system 400 is communicably coupled to one or more remote computing systems 434. As an example, for embodiments in which the computing system 400 is operated by an event organizer, the remote computing system(s) 434 may be operated by corresponding event attendee(s). As another example, for embodiments in which the computing system 400 is operated by an event attendee, the remote computing system(s) 434 may be operated by a corresponding event organizer and (optionally) one or more additional event attendees.

As another example, in some embodiments, the computing system 400 (or a portion thereof) is a server hosting various software applications in a networked environment using logical connections to the remote computing systems 434. In such embodiments, any number of the components shown in FIG. 4 (such as, for example, the computer-readable storage medium 426 including the food service management module, the calendar application, and at least a portion of the data) may be hosted on the server, while any number of the other components shown in FIG. 4 (such as, for example, the display 432 surfacing the event user interface) may be implemented with respect to one or more of the remote computing systems 434, which may be operated by the end users of the calendar application. Such embodiments are described further with respect to the exemplary network environment 500 of FIG. 5.

The one or more remote computing systems 434 may be, for example, client systems configured with web browsers, PC applications, mobile phone applications, and the like. In addition, the remote computing systems 434 may include, for example, one or more personal computers, one or more servers, one or more routers, one or more network PCs, one or more workstations, one or more microprocessor-based appliances, one or more mobile phones, and/or one or more peer devices or other common network nodes.

In various embodiments, the remote computing devices 434 are logically connected to the computing system 400 through a network 436 and then connected via a communication connection 438, which may be wireless. The network 436 encompasses wireless communication networks, such as local-area networks (LAN) and wide-area networks (WAN). LAN technologies include Fiber Distributed Data Interface (FDDI), Copper Distributed Data Interface (CDDI), Ethernet, Token Ring, and the like. WAN technologies include, but are not limited to, point-to-point links, circuit switching networks like Integrated Services Digital Networks (ISDN) and variations thereon, packet switching networks, and Digital Subscriber Lines (DSL).

The communication connection 438 includes the hardware/software employed to connect the network 436 to the bus 410. While communication connection 438 is shown for illustrative clarity as residing inside the computing system 400, it can also be external to the computing system 400. The hardware/software for connection to the network 436 may include, for example, internal and external technologies, such as mobile phone switches, modems including regular telephone grade modems, cable modems and DSL modems, ISDN adapters, and/or Ethernet cards.

As described above, system applications 424, such as the calendar application 440 described herein, take advantage of the management of the computing resources by the operating system 422 through one or more program modules stored within the computer-readable storage medium (or media) 426. In some embodiments, the computer-readable storage medium 426 is integral to the computing system 400, in which case it may form part of the memory 404 and/or the disk storage 412. In other embodiments, the computer-readable storage medium 426 is an external device that is connected to the computing system 400 when in use.

In various embodiments, the one or more program modules stored within the computer-readable storage medium 426 include program instructions or code that may be executed by the processor 402 to perform various operations, including the food service management techniques described herein. In various embodiments, such program modules include, but are not limited to, a food service management module 442 that causes the processor 402 to perform operations that result in the execution of the techniques described herein for managing food services for food-associated events within the context of the calendar application 440, as described herein with respect to the methods 100, 200, and 300 of FIGS. 1, 2, and 3, respectively.

Furthermore, as shown in FIG. 4, execution of the calendar application 440 in conjunction with the food service management module 442 results in the surfacing of an event user interface (UI) 444 on the display 432 of the computing system 400. As described herein, the surfaced event user interface 444 includes a machine-user interface (such as, for example, a graphical user interface) including an interactive visualization that enables the user of the computing system 400 (e.g., the event organizer or event attendee) to visualize and interact with the food-associated event data 418 corresponding to a food-associated event scheduled with respect to the calendar application 440 through graphical elements, icons, and the like rendered on the display 432. Moreover, as also described herein, the event user interface 444 includes additional functionalities that enable the user of the computing system 400 to interact with one or more food services without switching contexts or, in other words, without closing or navigating away from the calendar application 440. This results in the generation of the food service data 420, which are reconciled with the food-associated event data 418 to enable the user to seamlessly manage the food service(s) associated with the food-associated event from the event user interface 444 provided by the calendar application 440.

It is to be understood that the block diagram of FIG. 4 is not intended to indicate that the computing system 400 is to include all of the components shown in FIG. 4. Rather, the computing system 400 can include fewer or additional components not illustrated in FIG. 4 (e.g., additional applications, additional modules, additional memory devices, additional network interfaces, etc.). Furthermore, any of the functionalities of the one or more program modules/sub-modules may be partially, or entirely, implemented in hardware and/or in the processor 402. For example, the functionality may be implemented with an application specific integrated circuit, in logic implemented in the processor 402, or in any other device.

Figure 5:
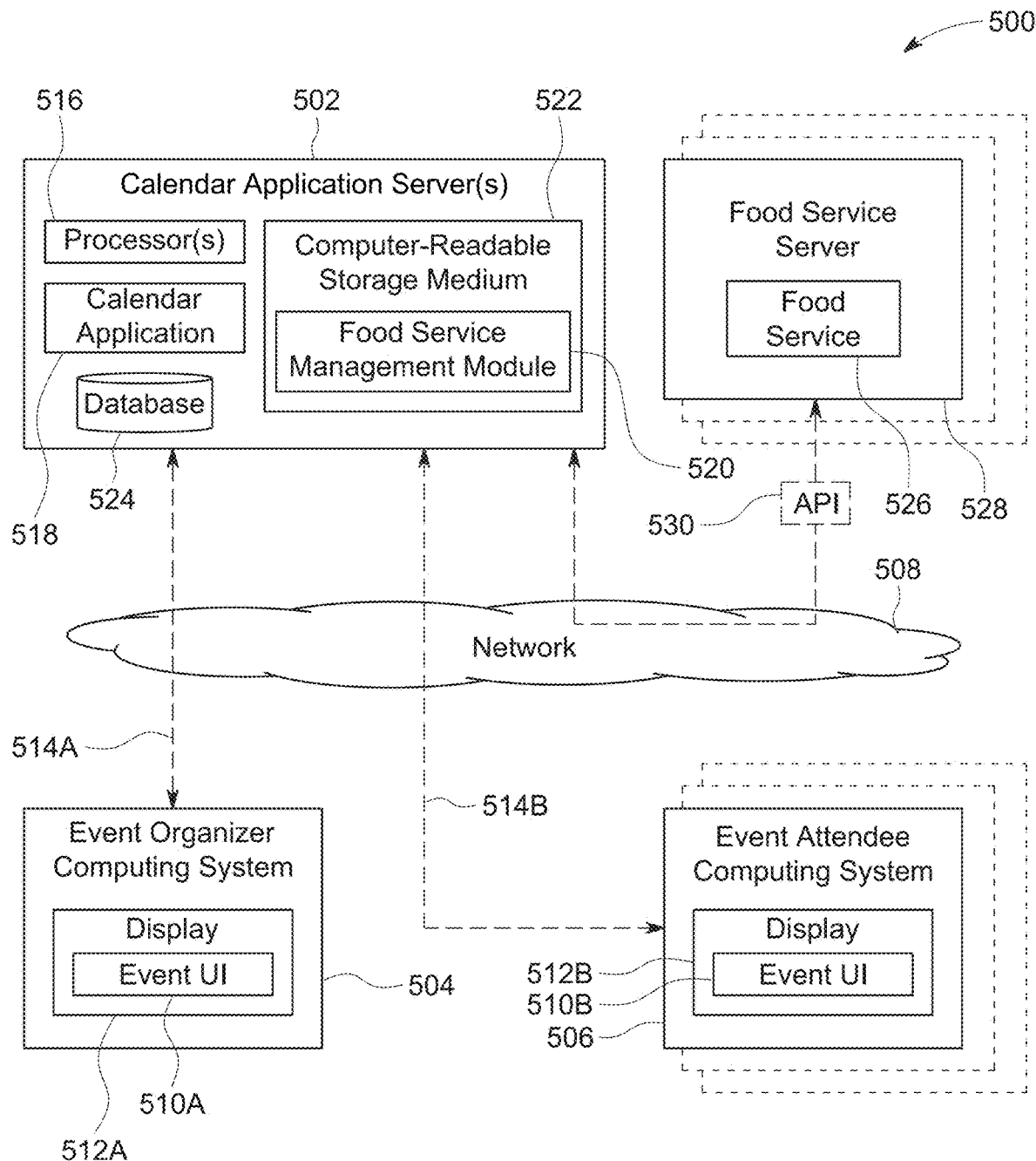
FIG. 5 is a block diagram of an exemplary network environment for implementing the food service management techniques described herein.

FIG. 5 is a block diagram of an exemplary network environment 500 for implementing the food service management techniques described herein. As shown in FIG. 5, the network environment 500 includes a calendar application server 502 that provides calendar, scheduling, and/or time management functionalities to various remote computing systems. As described with reference to a single event within the calendar application, such remote computing systems may include, for example, an event organizer computing system 504 and one or more event attendee computing systems 506. Moreover, the calendar, scheduling, and/or time management functionalities may be provided to the event organizer computing system 504 and the event attendee computing system(s) 506 via a network 508, which provides a communications link for facilitating the transfer of electronic content between the calendar application server 502 and the remote computing systems 504 and 506. The network 508 may include, but is not limited to, a cellular network, a point-to-point dial up connection, a satellite network, the Internet, a local area network (LAN), a wide area network (WAN), and/or a Wi-Fi network. Such networks are widely used to connect various types of network elements, such as routers, servers, and gateways. Moreover, those skilled in the art will appreciate that the present techniques may also be practiced in a multi-network environment having various connected public and/or private networks. Furthermore, those skilled in the art will appreciate that communication networks can take several different forms and use several different communication protocols. For example, in some embodiments, the present techniques may be practiced in a distributed computing environment in which tasks are performed by remote processing devices that are linked through a communications network. In a distributed computing environment, program modules can be located in both local and remote computer-readable storage media.

In various embodiments, the event organizer computing system 504 and the event attendee computing systems 506 each include a processor, memory, disk storage, and input/output subsystem that operatively couple one or more input/output devices to the processor, as described with respect to the computing system 400 of FIG. 4. Moreover, each remote computing system 504 and 506 may include any suitable type of computing device, including, but not limited to, a desktop computer, laptop computer, tablet, mobile phone, gaming system, television, or the like. Generally speaking, each remote computing system 504 and 506 may include any type of computing device that provides its user with the ability to load and execute software programs, as well as the ability to access the network 508 to communicate with the calendar application server 502.

In various embodiments, the calendar application server 502 hosts an event user interface 510A and 5108 on a display 512A and 5128 of each remote computing system 504 and 506, as indicated by arrow 514A and 514B, respectively. In various embodiments, this is accomplished by executing, via a processor 516 of the calendar application server 502, a calendar application 518 in conjunction with a food service management module 520 stored within a computer-readable storage medium 522 of the calendar application server 502, as described further with respect to FIG. 6. In addition, the calendar application server 502 may include a database 524 that functions as a repository for the data used by the components of the calendar application server 502 to enable execution of the calendar application 518 on the remote computing systems 504 and 506. In various embodiments, such data include at least a portion of the food-associated event data and the food service data described herein.

In various embodiments, the calendar application server 502 further enables one or more food services 526 to be associated with food-associated events within the calendar application 518. For example, the calendar application server 502 may associate the food-associated event corresponding to the event user interface 510A with the food service(s) 526 corresponding to food service server(s) 528, for example, in response to one or more user inputs or commands received via the event user interface 510A surfaced on the display 512A of the event organizer computing system 504. In addition, the calendar application 502 may connect with each food service 526 via a corresponding application programming interface (API) 530 in response to a user input or command received via the event user interface 5108 surfaced on the display 5128 of the event attendee computing system 506. Furthermore, the calendar application 502 may then interact with the food service(s) 526 via the corresponding application programming interface(s) 530 in response to additional user inputs or commands received via the event user interface 5108, where such user inputs or commands may relate to, for example, the ordering of food from the food service(s) 526.

It is to be understood that the block diagram of FIG. 5 is not intended to indicate that the network environment 500 is to include all of the components shown in FIG. 5. Rather, the network environment 500 can include fewer or additional components not illustrated in FIG. 5. For example, in practice, the calendar application server 502 and the remote computing systems 504 and 506 will include a number of additional components not depicted in the simplified block diagram of FIG. 5, as described with respect to the computing system 400 of FIG. 4, for example.

Figure 6:
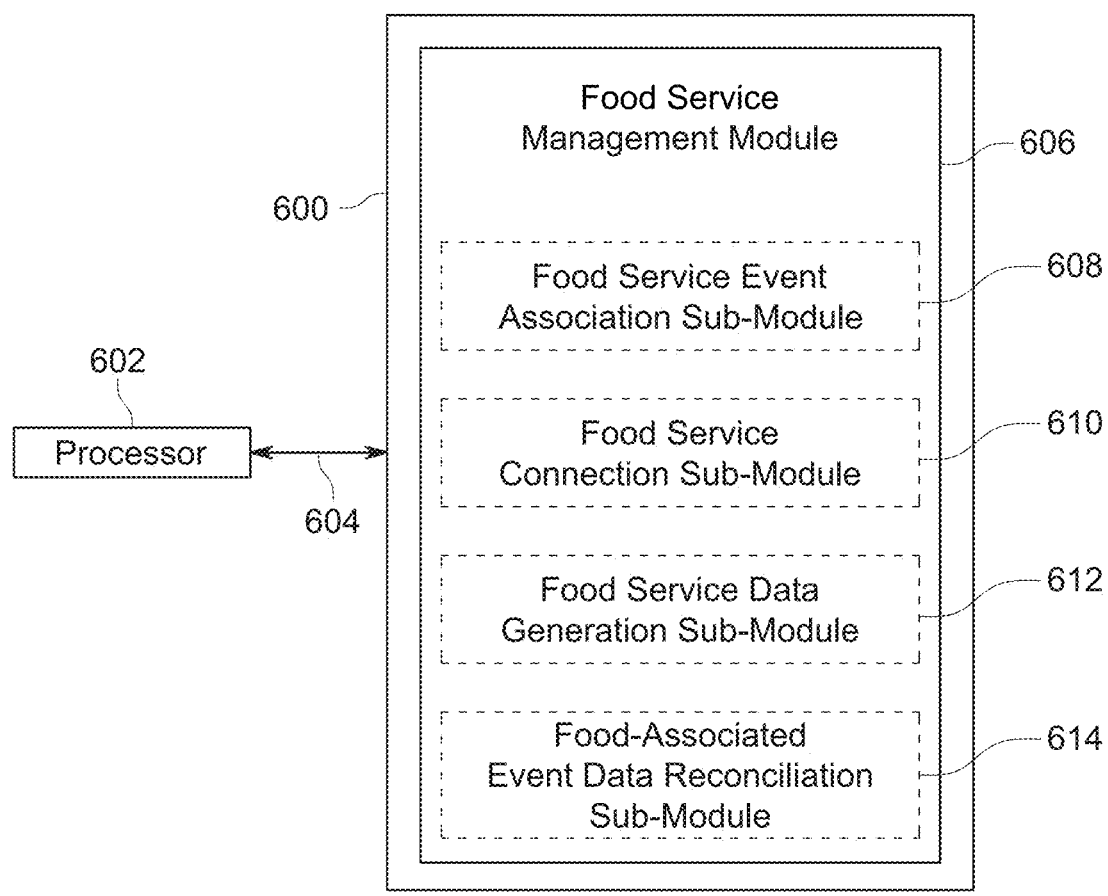
FIG. 6 is a block diagram of an exemplary computer-readable storage medium for implementing the food service management techniques described herein.

FIG. 6 is a block diagram of an exemplary computer-readable storage medium 600 for implementing the food service management techniques described herein. In various embodiments, the computer-readable storage medium 600 is accessed by a processor 602 over a computer interconnect 604. For example, in some embodiments, the computer-readable storage medium 600 is the same as, or similar to, the computer-readable storage medium described with respect to the computing system 400 of FIG. 4 and/or the network environment 500 of FIG. 5.

In various embodiments, the computer-readable storage medium 600 includes code (i.e., computer-executable instructions) to direct the processor 602 to perform the operations of the present techniques. Such code may be stored within the computer-readable storage medium 600 in the form of program modules, where each module includes a set of computer-executable instructions that, when executed by the processor 602, cause the processor 602 to perform a corresponding set of operations. In particular, in various embodiments, the computer-readable storage medium 600 includes a food service management module 606 that directs the processor 602 to perform the techniques described herein (or any suitable variation thereof). Such techniques include, but are not limited to, the methods 100, 200, and 300 described with respect to FIGS. 1, 2, and 3, respectively.

Furthermore, in various embodiments, the food service management module 606 accomplishes this via a number of sub-modules. Such sub-modules may include, but are not limited to, a food service event association sub-module 608 for associating one or more food services with a food-associated event within a calendar application in response to one or more user commands received via an event user interface functionality provided by the calendar application, a food service connection sub-module 610 for connecting with the food service(s) via corresponding application programming interface(s) in response to one or more additional user commands received via the event user interface functionality provided by the calendar application (where the application programming interface(s) are provided within the context of the calendar application), a food service data generation sub-module 612 for generating food service data for the food-associated event in response to one or more user interaction(s) with the food service(s) via the corresponding application programming interface(s) provided within the context of the calendar application, and a food-associated event data reconciliation sub-module 614 for reconciling the generated food service data with food-associated event data corresponding to the food-associated event within the calendar application.

Those skilled in the art will appreciate that any suitable number of the modules/sub-modules shown in FIG. 6 may be included within the computer-readable storage medium 600. Moreover, any number of additional modules/sub-modules not shown in FIG. 6 may be included within the computer-readable storage medium 600, depending on the details of the specific implementation. Furthermore, in some embodiments, the food service management module 606 itself is a sub-module, such as, in particular, a sub-module of a third-party resource management module that enables users to manage, not only one or more food services for the food-associated event, but also one or more other third-party resources, such as one or more third-party services and/or applications offering other suitable goods and/or services for the food-associated event.

Exemplary Embodiments of Food service Management Techniques Described Herein

The following is a description of several exemplary implementations of the food service management techniques described herein for particular use-case scenarios. Those skilled in the art will appreciate that such exemplary implementations are for illustrative purposes only. In practice, the food service management techniques described herein may be implemented in any other suitable manner to achieve any other suitable results, depending on the details of the particular implementation.

Moreover, while the following description provides for the implementation of the food service management functionality described herein as part of an overall third-party resource management functionality of the calendar application, those skilled in the art will appreciate that the food service management techniques described herein are not limited to this particular implementation. As an example, the food service management functionality described herein may alternatively be implemented as an independent or stand-alone feature of the calendar application. As another example, the food service management functionality described herein may be integrated into any other feature or functionality of the calendar application to advantageously provide users with the option to manage food services for food-associated events within the context of the calendar application.

Figure 7B:
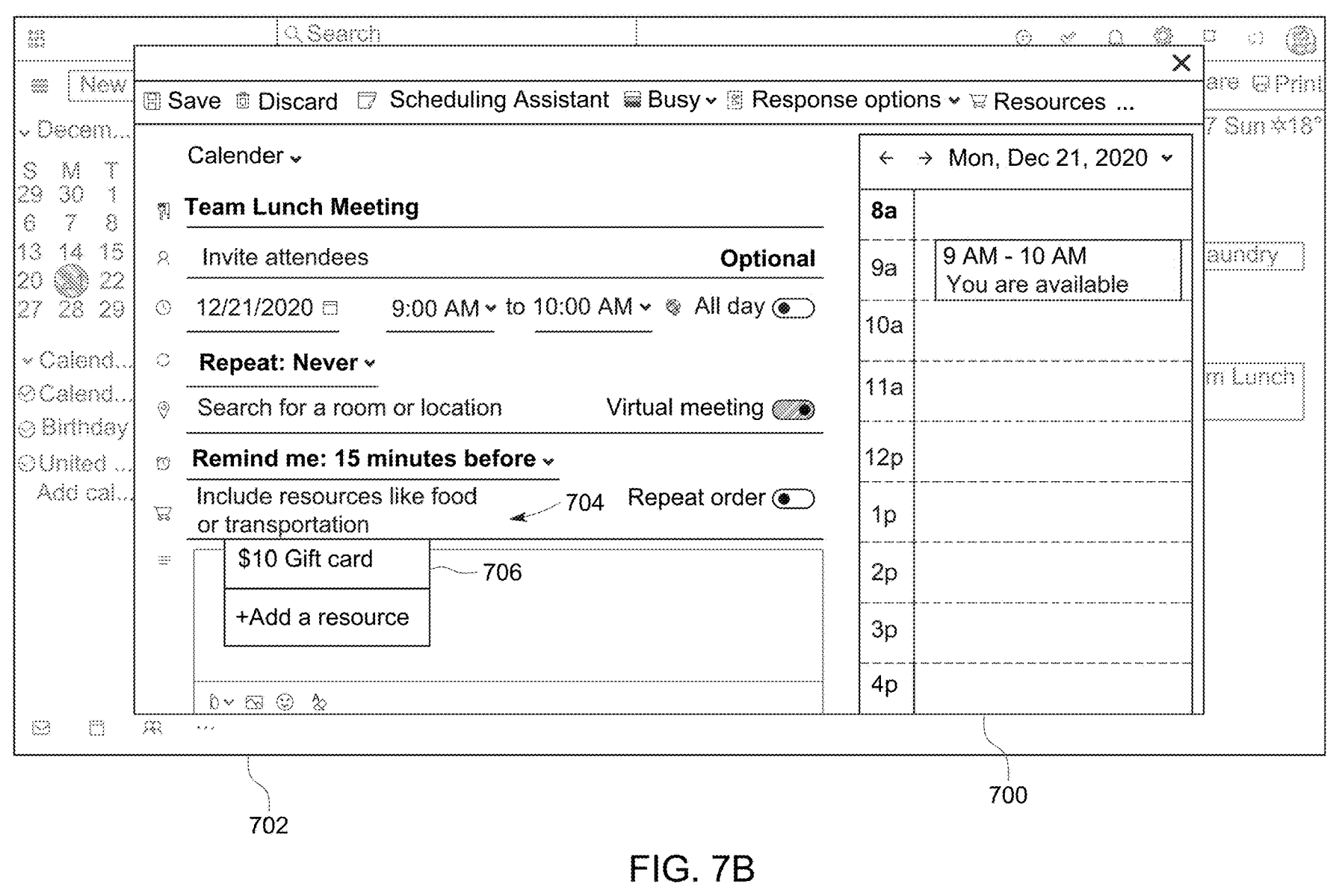
Figure 7C:
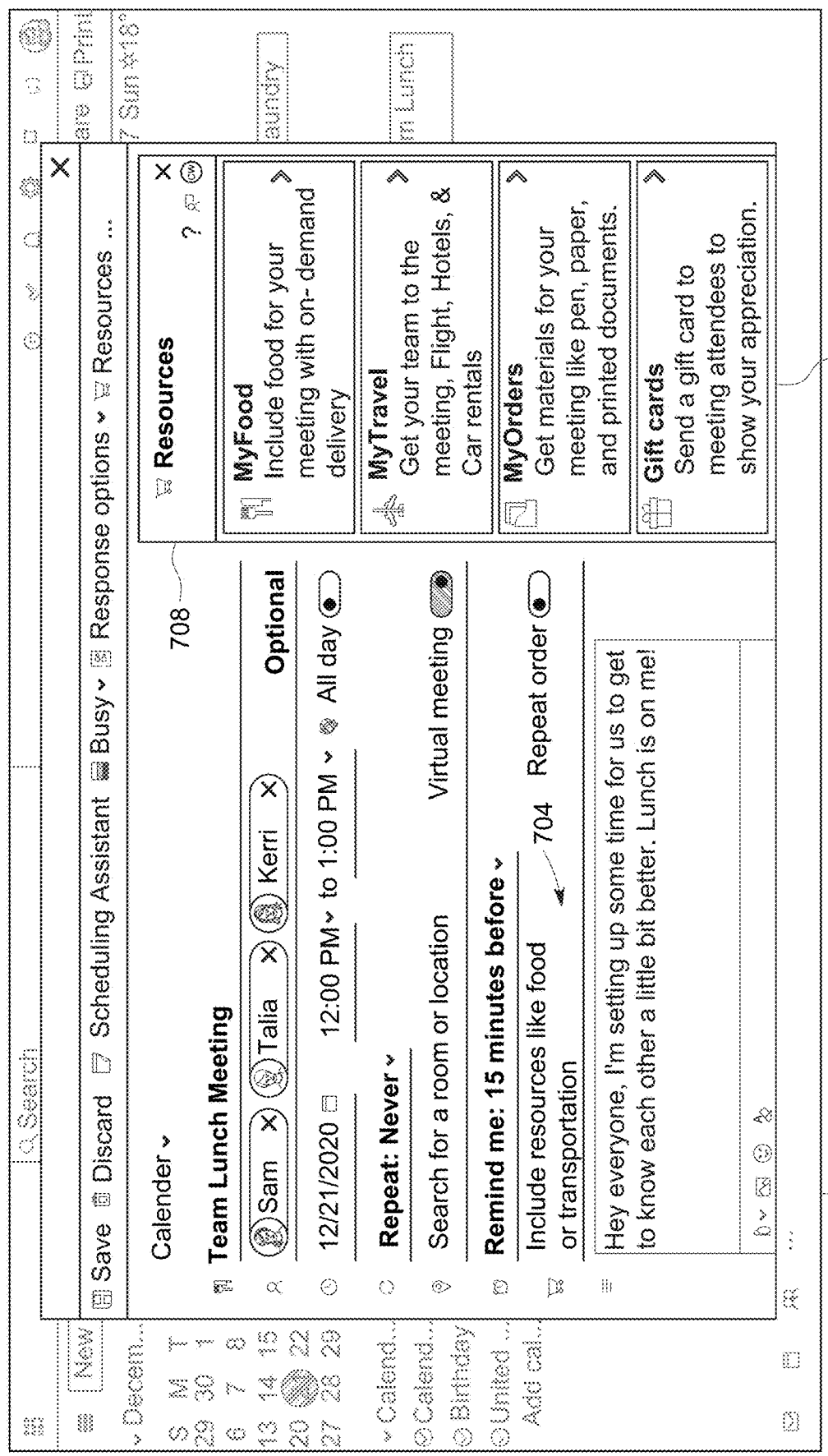
FIG. 7C is a schematic view depicting a third-party resource panel that may open within the first event user interface in response to the event organizer selecting the option to add the resource (e.g., the food service) to the food-associated event via the dropdown menu.

Turning now to the details of the first exemplary implementation, FIGS. 7A-K provide an example of the manner in which the food service management techniques described herein can be used to order food for a food-associated event. Specifically, FIG. 7A is a schematic view of a first event user interface 700 that is overlaid on top of a first calendar user interface 702 within the context of a calendar application, as viewed from the perspective of the event organizer. In various embodiments, the first event user interface 700 may be provided in response to the event organizer indicating, via the first calendar user interface 702, an intention to schedule a food-associated event within the event organizer's calendar. As shown in FIG. 7A, the first event user interface 700 may include various user interface elements that enable the event organizer to specify details for the food-associated event. Such details may include, for example, the title of the food-associated event, the desired attendees for the food-associated event, the date and time of the food-associated event, whether the food-associated event is repeating or non-repeating, the location of the food-associated event (or whether the food-associated event is a virtual event), any desired reminders for the food-associated event, and a typed description of the food-associated event. For example, according to the embodiment of FIG. 7A, the food-associated event is a virtual meeting, titled "Team Lunch Meeting," that is scheduled to occur on Dec. 21, 2020, from 12:00 μm to 1:00 pm, with a reminder set for 15 minutes before the meeting. In addition, according to embodiments described herein, the first event user interface 700 includes an option to associate one or more third-party resources, such as, in particular, one or more food services, with the food-associated event via interaction with a user interface element 704. According to the exemplary embodiment of FIG. 7A, the user interface element 704 is titled "Include resources like food or transportation."

FIG. 7B is a schematic view depicting the manner in which the event organizer may click on the user interface element 704 to reveal a corresponding dropdown menu 706 for associating one or more third-party resources, such as, in particular, one or more food services, with the food-associated event. As shown in FIG. 7B, the dropdown menu 706 may include one or more previous third-party resource (e.g., food service) selections of the event organizer, such as, for example, a "$10 Gift card" selection. In addition, the dropdown menu 706 may include an option to add a resource, such as, in particular, a food service, to the food-associated event. Moreover, those skilled in the art will appreciate that, while a dropdown menu is shown in FIG. 7B, a different type of user interface element may alternatively be used to achieve the same technical effect.

FIG. 7C is a schematic view depicting a third-party resource panel 708 that may open within the first event user interface 700 in response to the event organizer selecting the option to add the resource (e.g., the food service) to the food-associated event via the dropdown menu 706. As shown in FIG. 7C, the third-party resource panel 708 may enable the event organizer to associate one or more different types of third-party resources with the food-associated event. For example, the event organizer may utilize the third-party resource panel 708 to select one or more food services that are capable of providing food for the food-associated event, as well as (optionally) one or more other third-party resources that are capable of providing travel, office supplies, and/or gift cards, for example, with the food-associated event. In addition, as also shown in FIG. 7C, the event organizer may specify the desired event attendees (e.g., in this example, users named "Sam," "Talia," and "Kerri") who will be able to interact with the third-party resource(s) associated with the food-associated event.

Figure 7D:
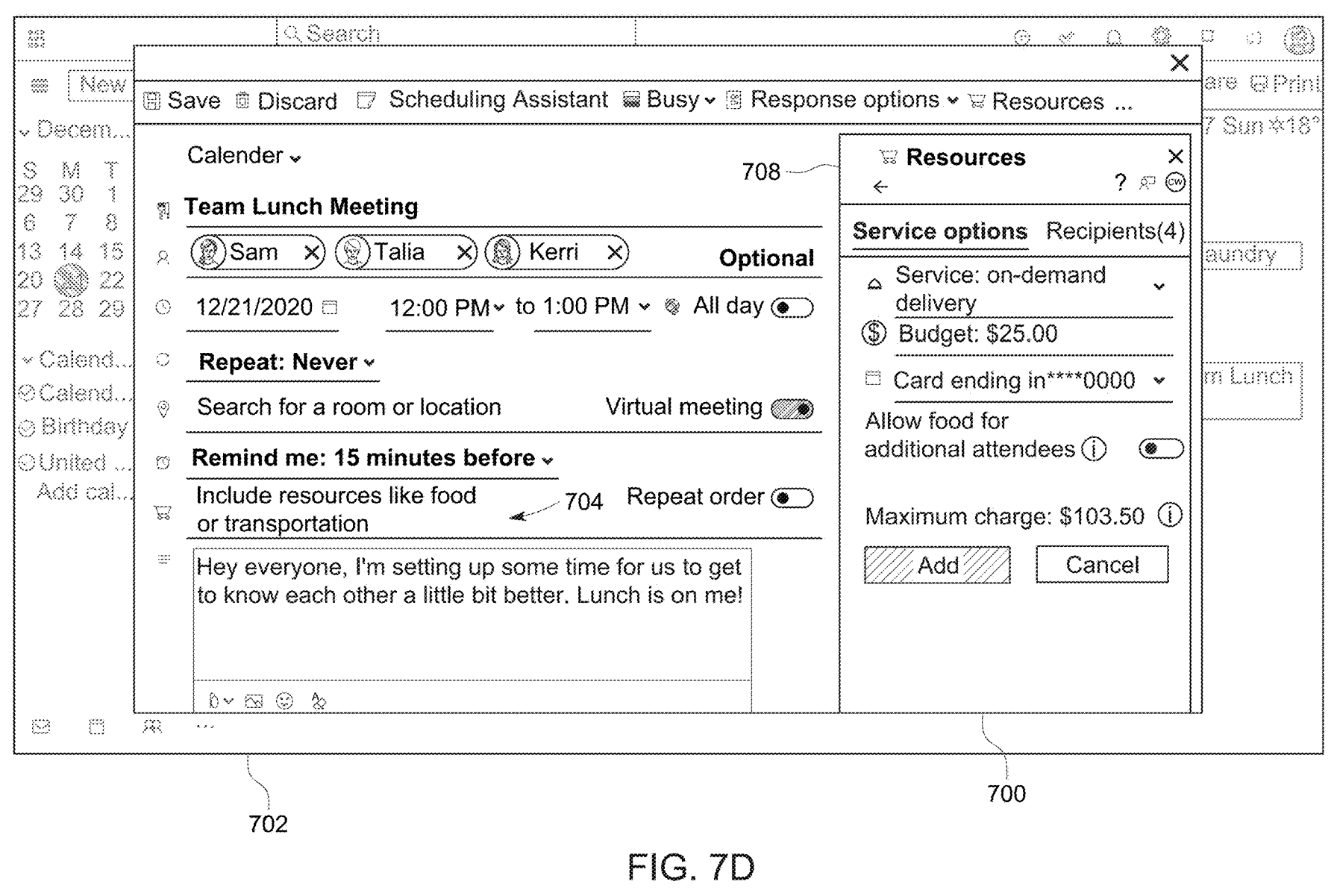

FIG. 7D is a schematic view depicting the various user interface elements provided by the third-party resource panel 708 in response to the event organizer choosing one or more food services (or one or more types of food services) to associate with the food-associated event. In various embodiments, once the event organizer has selected the desired food service(s), the third-party resource panel 708 provides the user interface elements to enable the event organizer to set the parameters for interacting with the food service(s) with respect to the food-associated event. Such parameters may include, for example, the food service options, the event attendees' budget for interacting with the food service(s), and the payment method for completing the food service interaction. In some embodiments, the event organizer may also utilize the third-party resource panel 708 to enable the event attendees to individually select and order their food from any of the food services and to have such food delivered to their home, as indicated by the "Service: On-demand delivery" selection shown in FIG. 7D.

In addition, the third-party resource panel 708 may display the maximum charge for interacting with the food services, as determined based on the number of desired event attendees and the specified budget of each event attendee. For example, according to the embodiment shown in FIG. 7D, because there are three desired event attendees in addition to the event organizer, and each event attendee (and the event organizer) is given a budget of $25.00, the maximum charge may be $103.50 (after accounting for service fees).

Figure 7E:
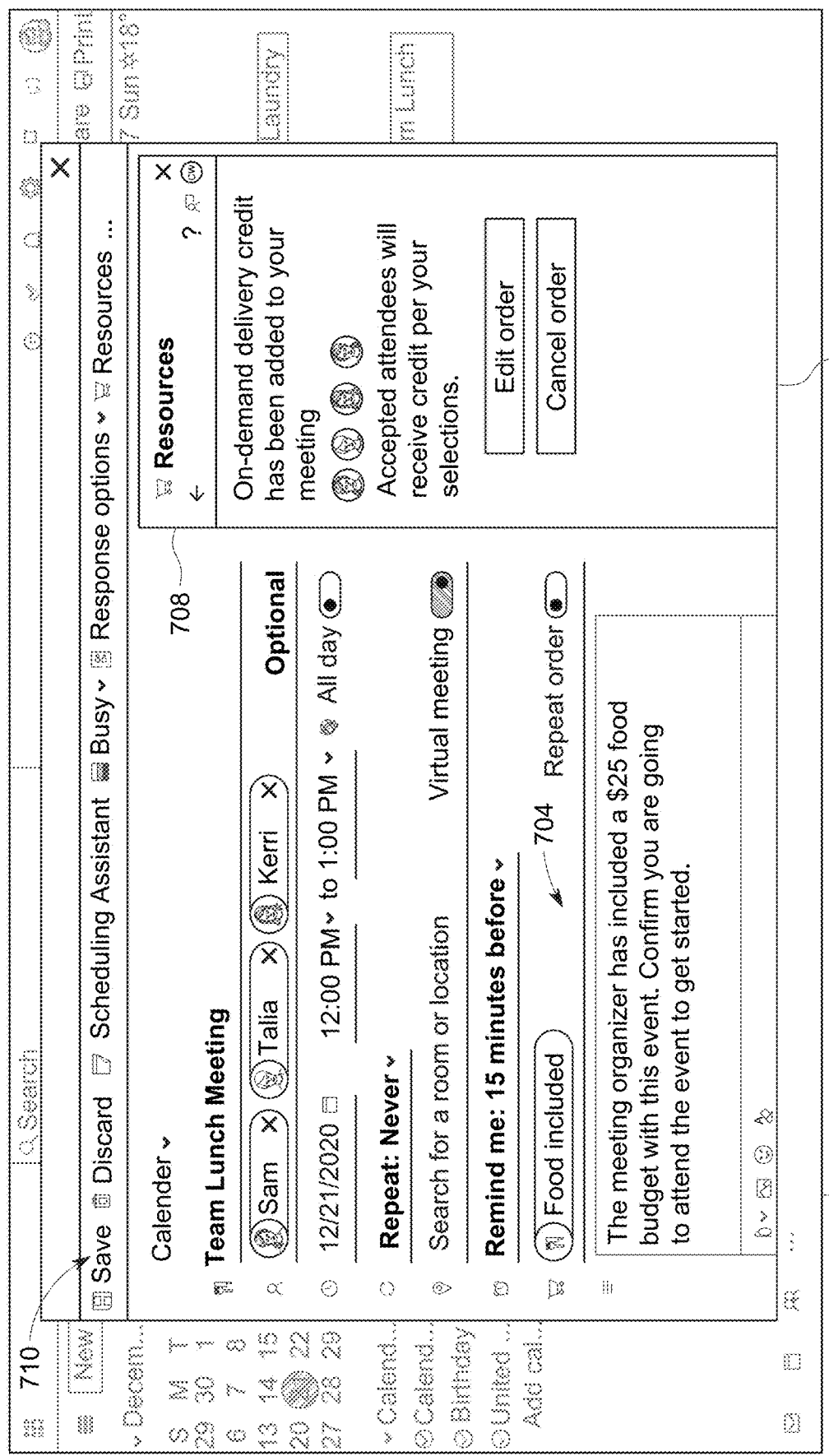
FIG. 7E is a schematic view depicting the event user interface and the corresponding third-party resource panel once the event organizer has finished associating the food service(s) with the food-associated event.

FIG. 7E is a schematic view depicting the event user interface 700 and the corresponding third-party resource panel 708 once the event organizer has finished associating the food service(s) with the food-associated event. In various embodiments, the calendar application then transmits a food-associated event invitation including all the details of the food-associated event to the event attendees (e.g., in this example, the users named "Sam," "Talia," and "Kerri") in response to the event organizer (e.g., in this example, a user named "Chandra") clicking a "Save" button 710 within the first event user interface 700.

Figure 7F:
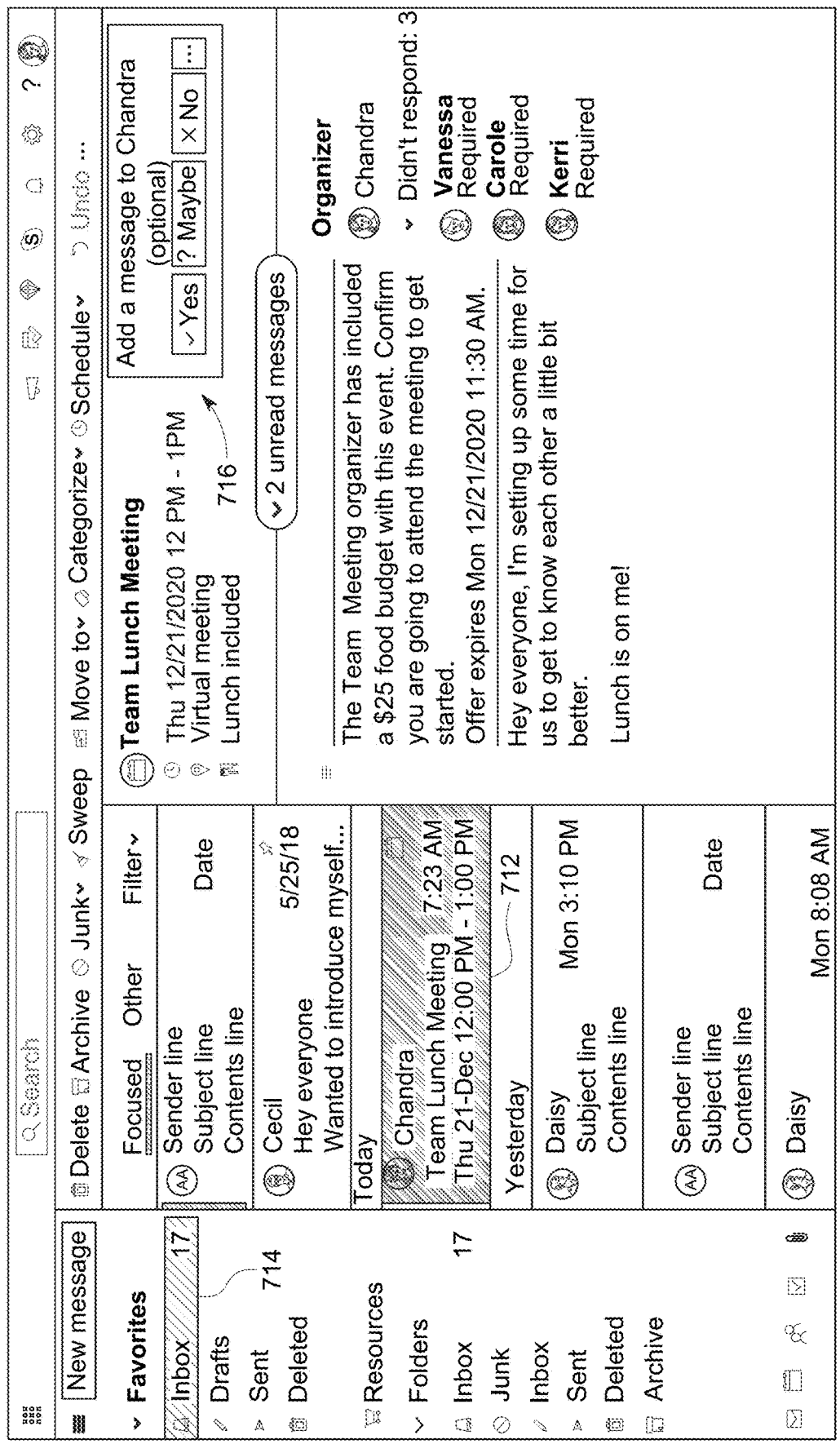
FIG. 7F is a schematic view depicting a food-associated event invitation that is received at a remote computing system that is operated by one of the event attendees.

FIG. 7F is a schematic view depicting a food-associated event invitation 712 that is received at a remote computing system that is operated by one of the event attendees (e.g., in this example, the user named "Sam"). As shown in FIG. 7F, the food-associated event invitation 712 may be received as an email message within an email inbox folder 714 of the calendar application. Additionally or alternatively, the food-associated event invitation (or some variation thereof) may be received as a chat-based message and/or a calendar notification, for example. Moreover, in some embodiments, the food-associated event invitation may be received as an email or chat-based message with respect to a separate application other than the calendar application. In such embodiments, the message includes one or more links to the calendar application for enabling the seamless execution of the food service management techniques described herein.

As shown in FIG. 7F, in response to the user clicking on (or navigating to) the email message 712 including the food-associated event invitation, a second event user interface 716 may be displayed within the email message 712. The second event user interface 716 may include information about the food-associated event, as well as one or more user interface elements for providing user input regarding the food-associated event invitation. In particular, the second event user interface 716 may include user interface elements that provide an option to communicate an intention to attend the food-associated event (i.e., a "Yes" response), an intention to not attend the food-associated event (i.e., a "No" response), or an intention to determine whether to attend the food-associated event at some later point in time (i.e., a "Maybe" response).

Figure 7G:
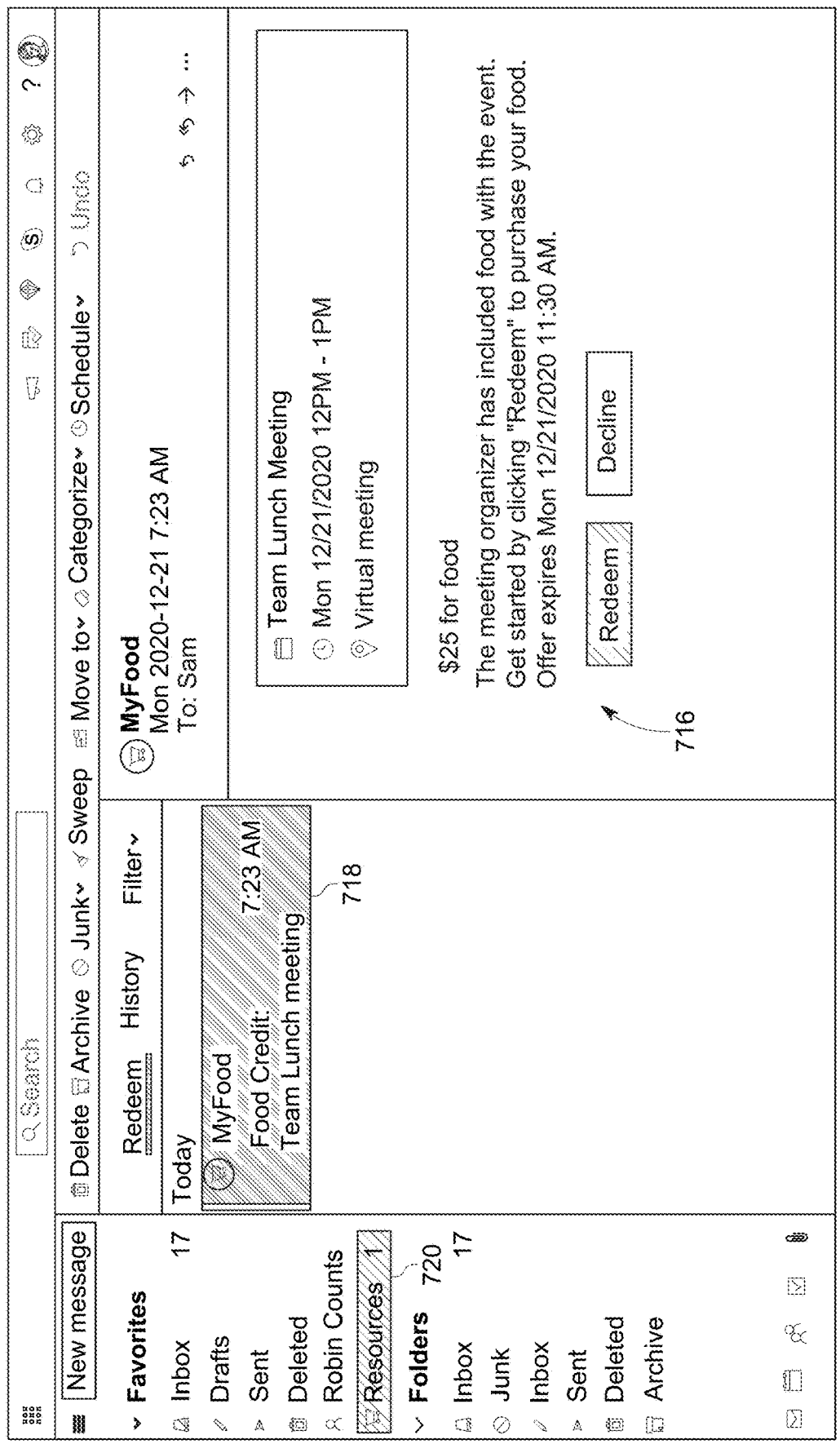
FIG. 7G is a schematic view depicting the manner in which the second event user interface may provide the event attendee with the option to interact with the food service(s) associated with the food-associated event.

FIG. 7G is a schematic view depicting the manner in which the second event user interface 716 may provide the event attendee with the option to interact with the food service(s) associated with the food-associated event. For example, according to the embodiment shown in FIG. 7G, the option to interact with the food service(s) is provided in the form of a second email message 718 within a resources email folder 720 of the calendar application. However, those skilled in the art will appreciate that the option to interact with the food service(s) may also be provided in any other suitable manner, such as in the form of the second event user interface overlaid onto the calendar user interface corresponding to the event attendee's calendar. Moreover, according to the embodiment shown in FIG. 7G, the option to interact with the food service(s) is provided as a "Redeem" button and a "Decline" button, where user input consisting of clicking on the "Redeem" button enables the event attendee to interact with the food service(s) to order food, and user input consisting of clicking on the "Decline" button prevents the event attendee from interacting with the food service(s) to order food.

Figure 7H:
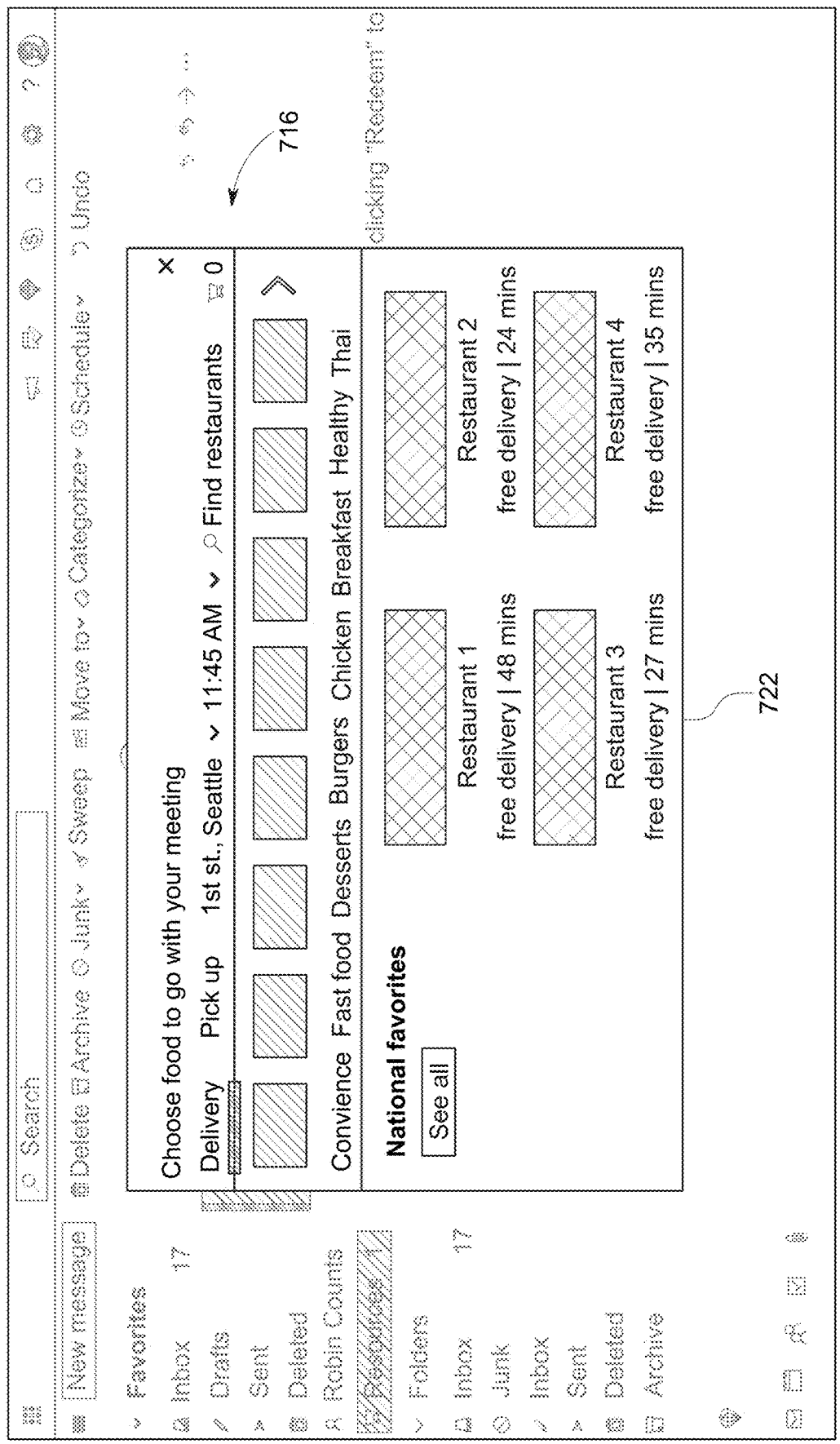
FIG. 7H is a schematic view depicting the manner in which the calendar application connects with the food service(s) via a food service connection panel that is provided by (or overlaid onto) the event user interface of the calendar application in response to connection with the food service(s) via corresponding application programming interface(s)

FIG. 7H is a schematic view depicting the manner in which the calendar application connects with the food service(s) via a food service connection panel 722 (in this embodiment, more generally referred to as a "third-party resource connection panel") that is provided by (or overlaid onto) the event user interface 716 of the calendar application in response to connection with the food service(s) via corresponding application programming interface(s) (API(s)). As shown in FIG. 7H, the food service connection panel 722 includes several user interface elements that enable the event attendee to provide inputs or commands that define the event attendee's interaction with the food service(s) with respect to the food-associated event. For example, according to the embodiment shown in FIG. 7H, the event attendee may provide the delivery address and delivery time via the food service connection panel 722. In addition, the event attendee may select the restaurant from which they wish to order food.

Figure 7I:
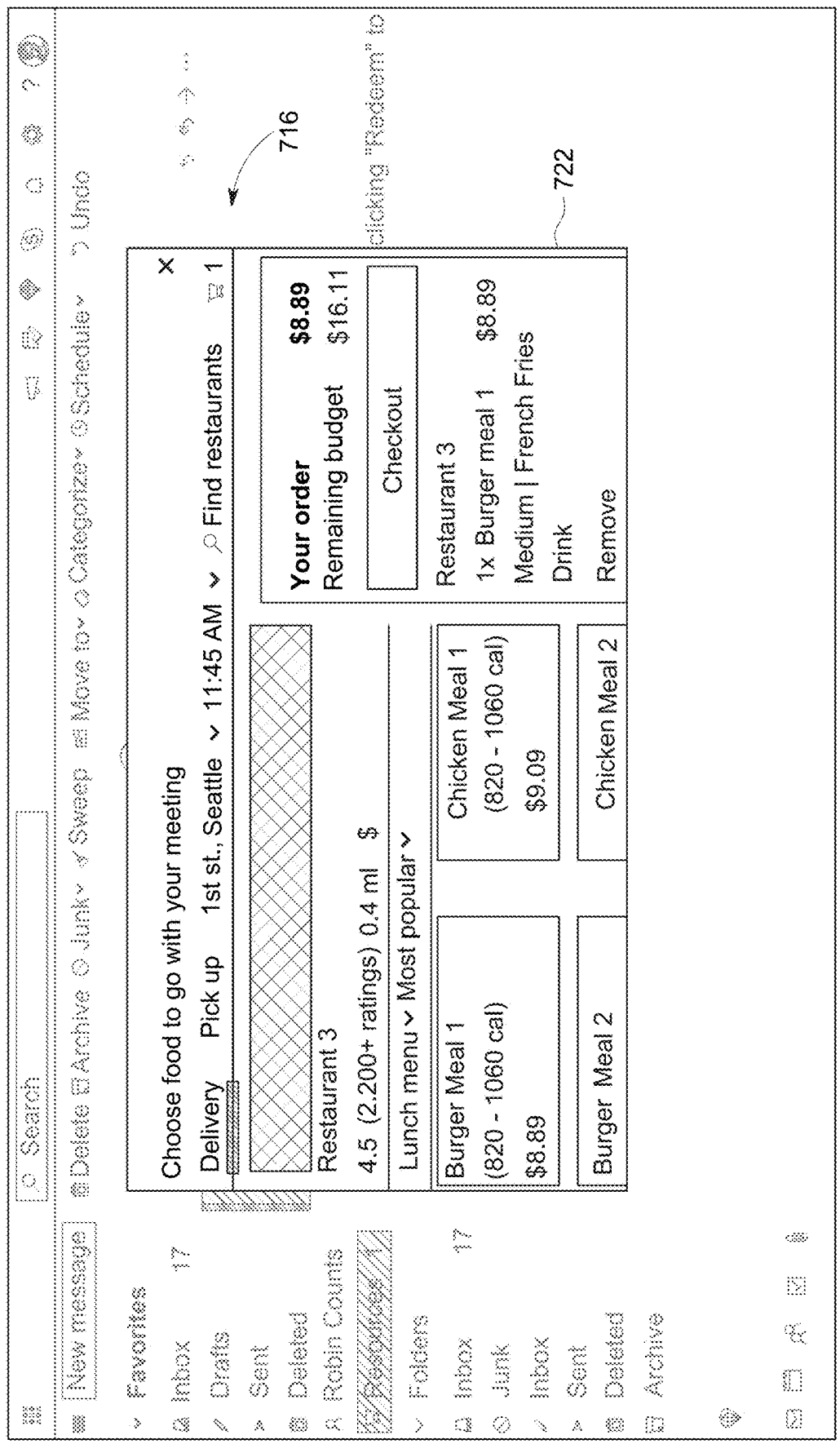
FIG. 7I is a schematic view depicting the manner in which the food service connection panel may display options for selecting food to order from the food service that is selected by the event attendee.

FIG. 7I is a schematic view depicting the manner in which the food service connection panel 722 may display options for selecting food to order from the food service that is selected by the event attendee. More specifically, according to the embodiment shown in FIG. 7I, the food service connection panel 722 displays meal options provided by "Restaurant 3" in response to the event attendee selecting "Restaurant 3" as the restaurant from which they wish to order food. In addition, the food service connection panel 722 may provide additional details regarding the selected food service (e.g., restaurant), such as, for example, user reviews/ratings and/or the distance between the user's location and the food service location (if the food service has a physical location).

Figure 7J:
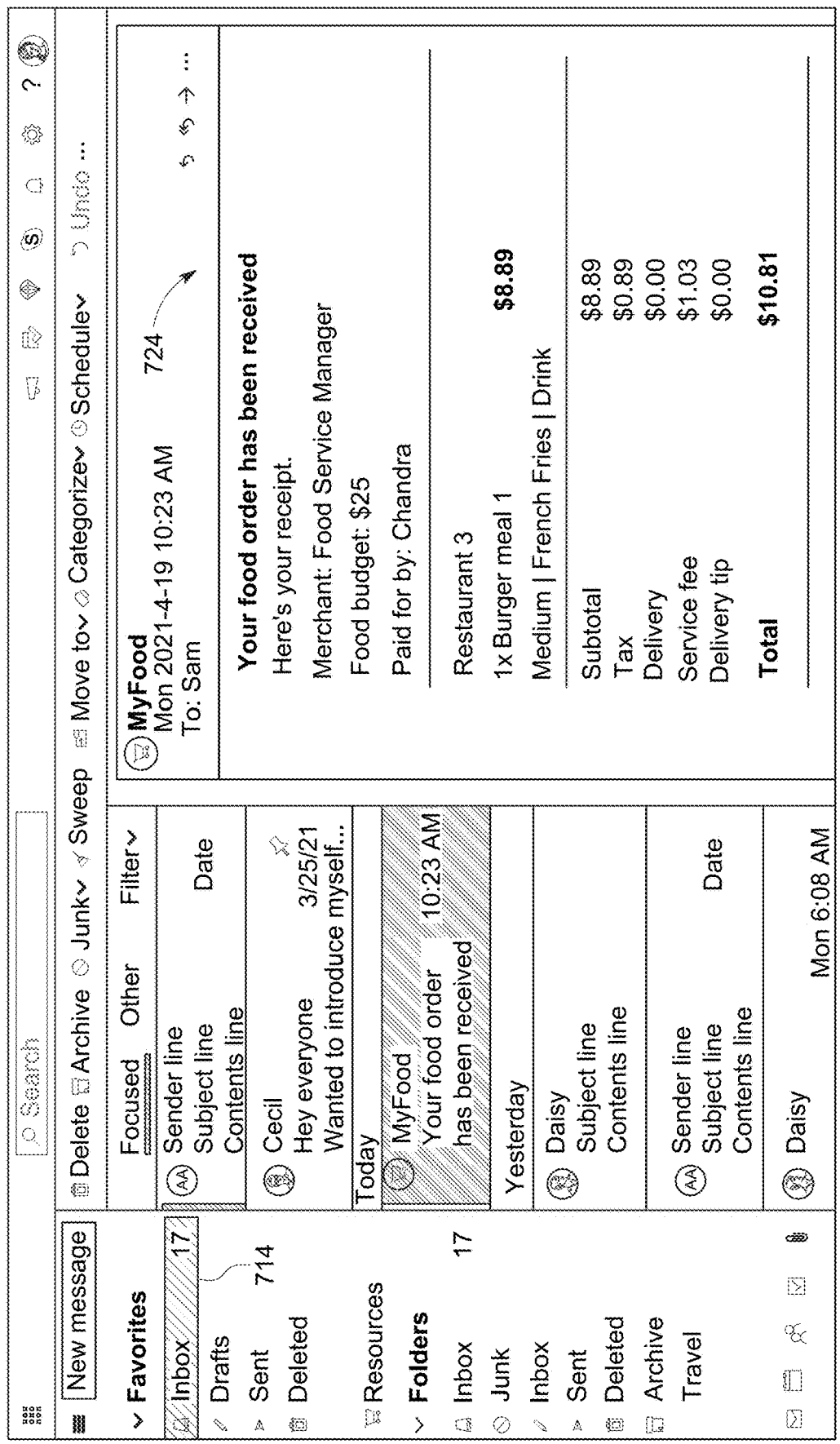
FIG. 7J is a schematic view depicting a food service confirmation message that may be received by the event attendee in response to the event attendee's interaction with the food service.

FIG. 7J is a schematic view depicting a food service confirmation message 724 (in this embodiment, more generally referred to as a "third-party resource confirmation message") that may be received by the event attendee in response to the event attendee's interaction with the food service. As shown in FIG. 7J, the food service confirmation message 724 may be provided as an email message within the email inbox folder 714 of the calendar application. Additionally or alternatively, the food service confirmation message 724 may be provided as a chat-based message and/or a calendar notification, for example. Moreover, in some embodiments, the food service confirmation message 724 may be provided as an email or chat-based message with respect to a separate application other than the calendar application.

Moreover, in various embodiments, the food service confirmation message 724 includes details regarding the event attendee's interaction with the food service, such as, for example, the budget, the selected food service, and the total cost associated with the interaction. For example, according to the embodiment shown in FIG. 7J, the food service confirmation message 724 provides information regarding the restaurant that was chosen by the event attendee, as well as the meal that was ordered and the total cost of such meal.

In various embodiments, the food service confirmation message 724 further serves as confirmation that the food service data generated as a result of the event attendee's interaction with the food service has been reconciled with the food-associated event data corresponding to the food-associated event. In this manner, the food-associated event is updated within the calendar application such that information relating to the food service is directly associated with the food-associated event.

Figure 7K:
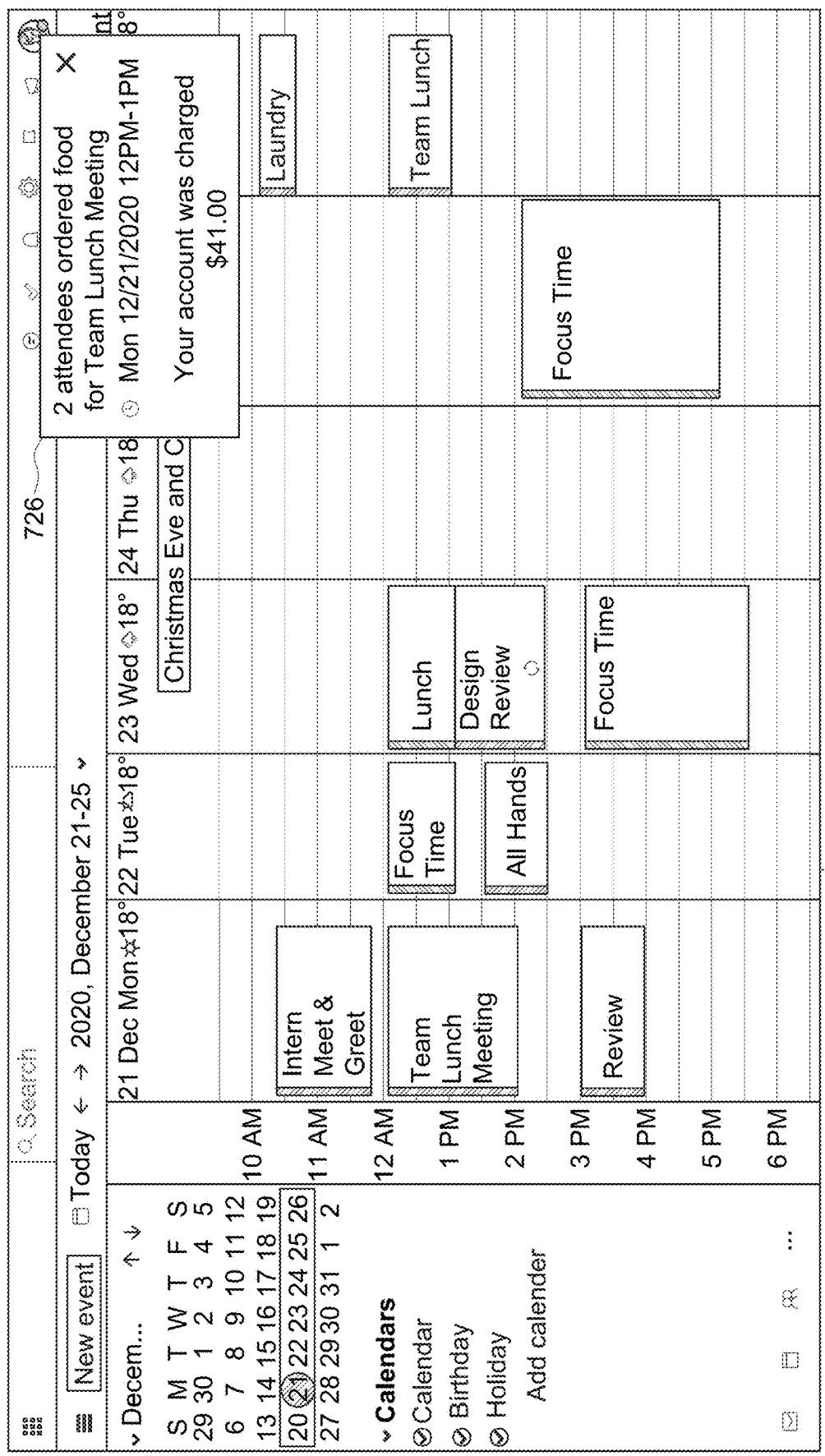
FIG. 7K is a schematic view of a food service interaction notification that may be received by the event organizer via the first calendar user interface.

FIG. 7K is a schematic view of a food service interaction notification 726 (in this embodiment, more generally referred to as a "third-party resource interaction notification") that may be received by the event organizer via the first calendar user interface 702. In particular, the food service interaction notification 726 may provide information regarding the interaction of one or more event attendees with one or more food services associated with the food-associated event. For example, according to the embodiment shown in FIG. 7K, the food service interaction notification 726 informs the event organizer that two event attendees have ordered food for the Team Lunch Meeting and also provides the total cost of the food orders.

Figure 8A:
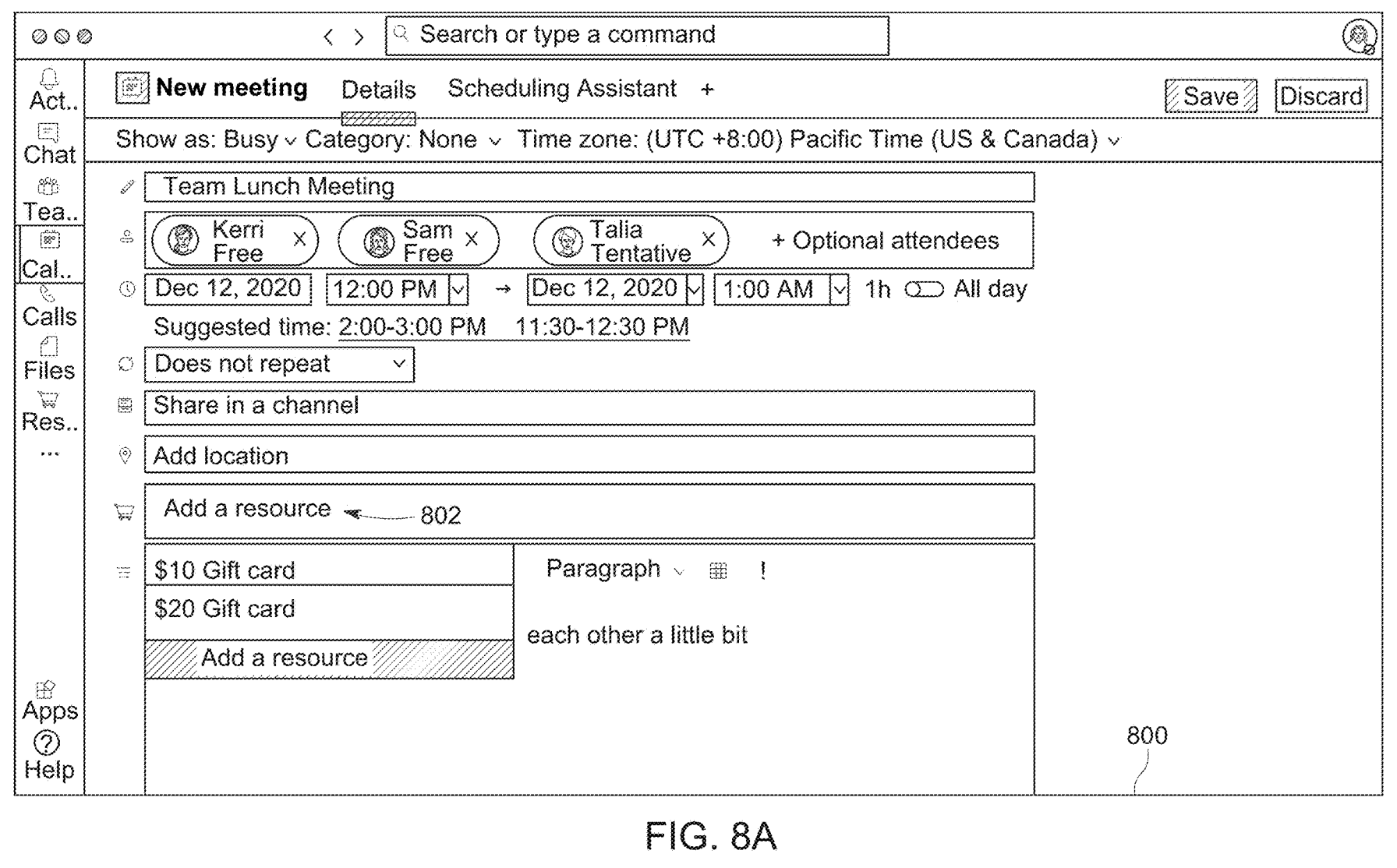
Figure 8B:
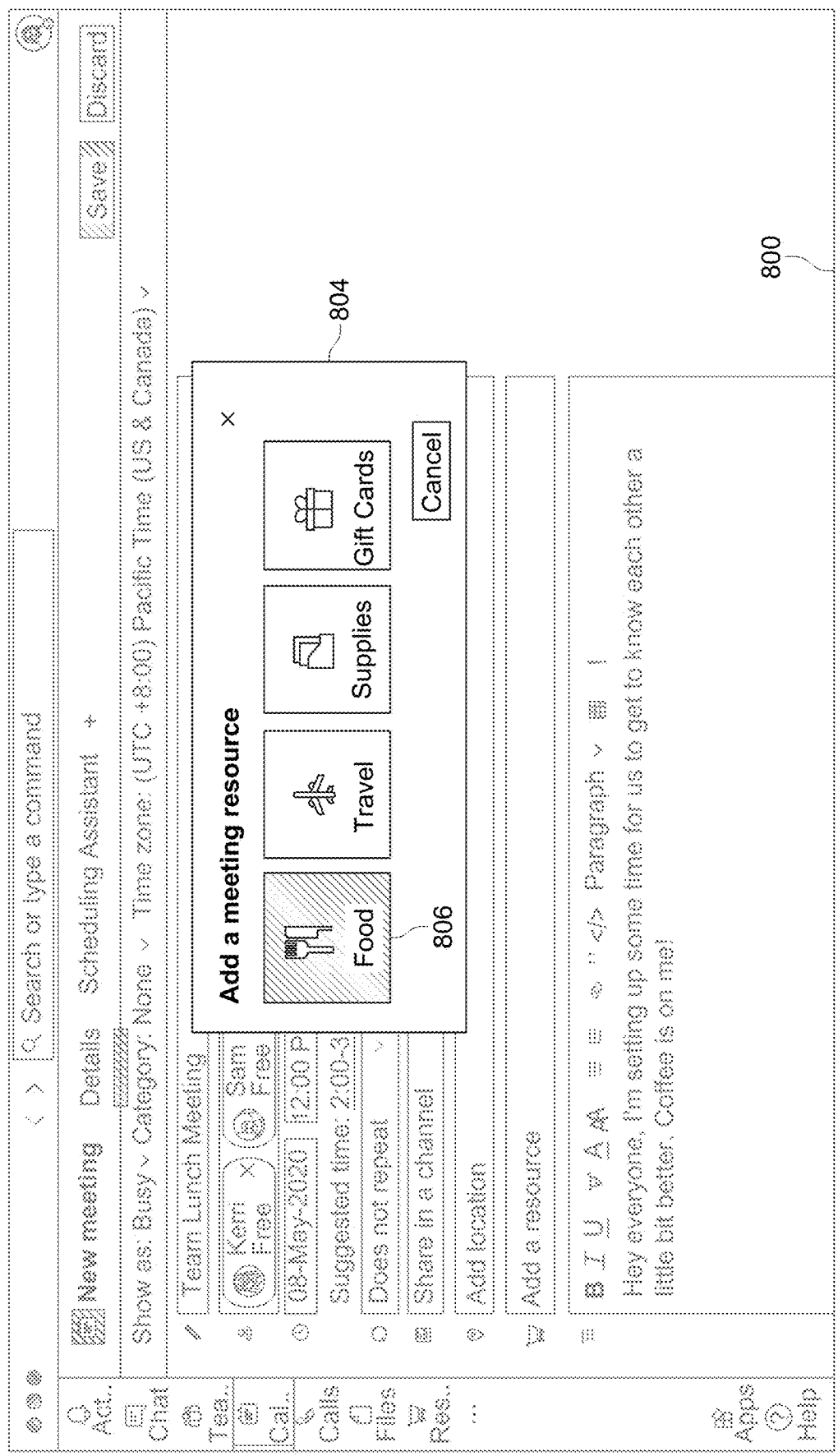
FIG. 8B is a schematic view depicting a third-party resource panel that may open within the first event user interface in response to the event organizer selecting the option to add a new resource to the food-associated event via the dropdown menu.

Turning now to the details of the second exemplary implementation, FIGS. 8A-H provide another example of the manner in which the food service management techniques described herein can be used to order food for a food-associated event. Specifically, FIG. 8A is a schematic view of a first event user interface 800 that is provided within the context of a calendar application, as viewed from the perspective of the event organizer. In various embodiments, the first event user interface 800 is overlaid on top of a first calendar user interface (not shown) of the calendar application. In addition, in various embodiments, the first event user interface 800 may be provided in response to the event organizer indicating, via the first calendar user interface, an intention to schedule a food-associated event within the event organizer's calendar. As shown in FIG. 8A, the first event user interface 800 may include various user interface elements that enable the event organizer to specify details for the food-associated event. Such details may include, for example, the title of the food-associated event, the desired attendees for the food-associated event, the date and time of the food-associated event, whether the food-associated event is repeating or non-repeating, the location of the food-associated event, and a typed description of the food-associated event. For example, according to the embodiment of FIG. 8A, the food-associated event is a meeting, titled "Team Meeting," that is scheduled to occur on May 8, 2020, at 10:30 am. In addition, the first event user interface 800 includes an option to associate one or more third-party resources, such as, in particular, one or more food services, with the food-associated event via interaction with a user interface element 802. Moreover, the user interface element 802 may include a dropdown menu for selecting one or more resources (e.g., one or more food services) to associate with the food-associated event.

FIG. 8B is a schematic view depicting a third-party resource panel 804 that may open within the first event user interface 800 in response to the event organizer selecting the option to add a new resource to the food-associated event via the dropdown menu. In various embodiments, the third-party resource panel 804 enables the event organizer to associate one or more third-party resources, such as, in particular, one or more food services, with the food-associated event. For example, according to the embodiment shown in FIG. 8B, the event organizer may select a "Food" button 806, which enables the event organizer to select one or more food services that can provide food for the food-associated event.

Figure 8C:
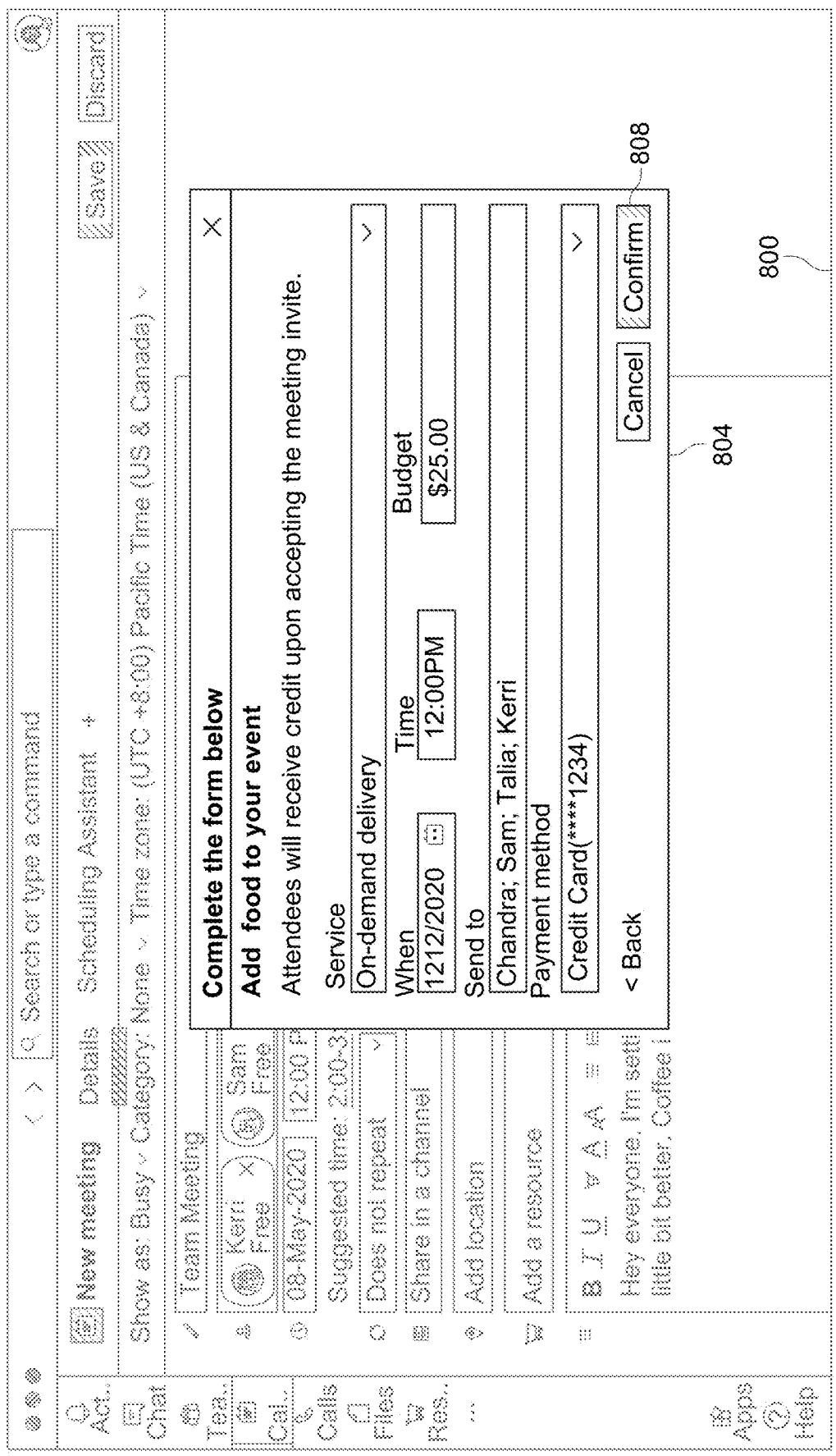
FIG. 8C is a schematic view depicting various user interface elements provided by the third-party resource panel in response to the event organizer selecting the "Food" button to associate one or more food services with the food-associated event.

FIG. 8C is a schematic view depicting various user interface elements provided by the third-party resource panel 804 in response to the event organizer selecting the "Food" button 806 to associate one or more food services with the food-associated event. In particular, according to the embodiment shown in FIG. 8C, the user interface elements enable the event organizer to input information relating to the desired type(s) of food service(s) (e.g., for the embodiment shown in FIG. 8C, the selected type is "On-demand delivery," meaning that the event attendees can individually select one or more desired food services from which to order food), the delivery date and time, the recipients (e.g., the event attendees and, optionally, the event organizer), the budget for each recipient, and the desired payment method. Moreover, once the event organizer has entered the relevant information for the food service interaction, the event organizer may click a "Confirm" button 808. This, in turn, may cause the calendar application to reconcile the food service data generated as a result of the third-party resource interaction with the food-associated event data corresponding to the food-associated event, as described herein.

Figure 8D:
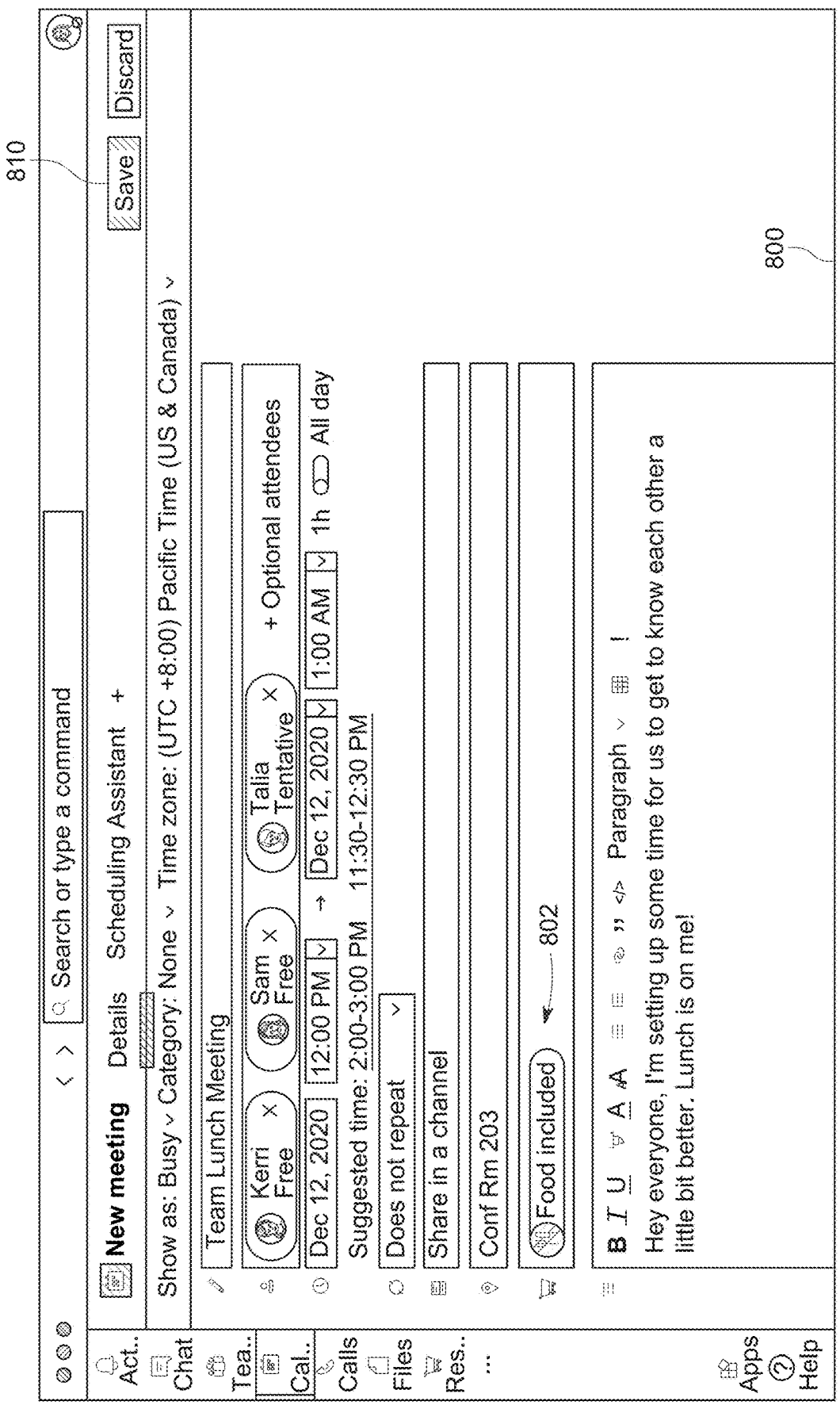
FIG. 8D is a schematic view depicting the first event user interface once the event organizer has finished associating the food service(s) with the food-associated event.

FIG. 8D is a schematic view depicting the first event user interface 800 once the event organizer has finished associating the food service(s) with the food-associated event. In various embodiments, the calendar application then transmits a food-associated event invitation including all the details of the food-associated event to the event attendees (e.g., in this example, the users named "Sam," "Talia," and "Kerri") in response to the event organizer clicking a "Save" button 810 within the first event user interface 800.

Figure 8E:
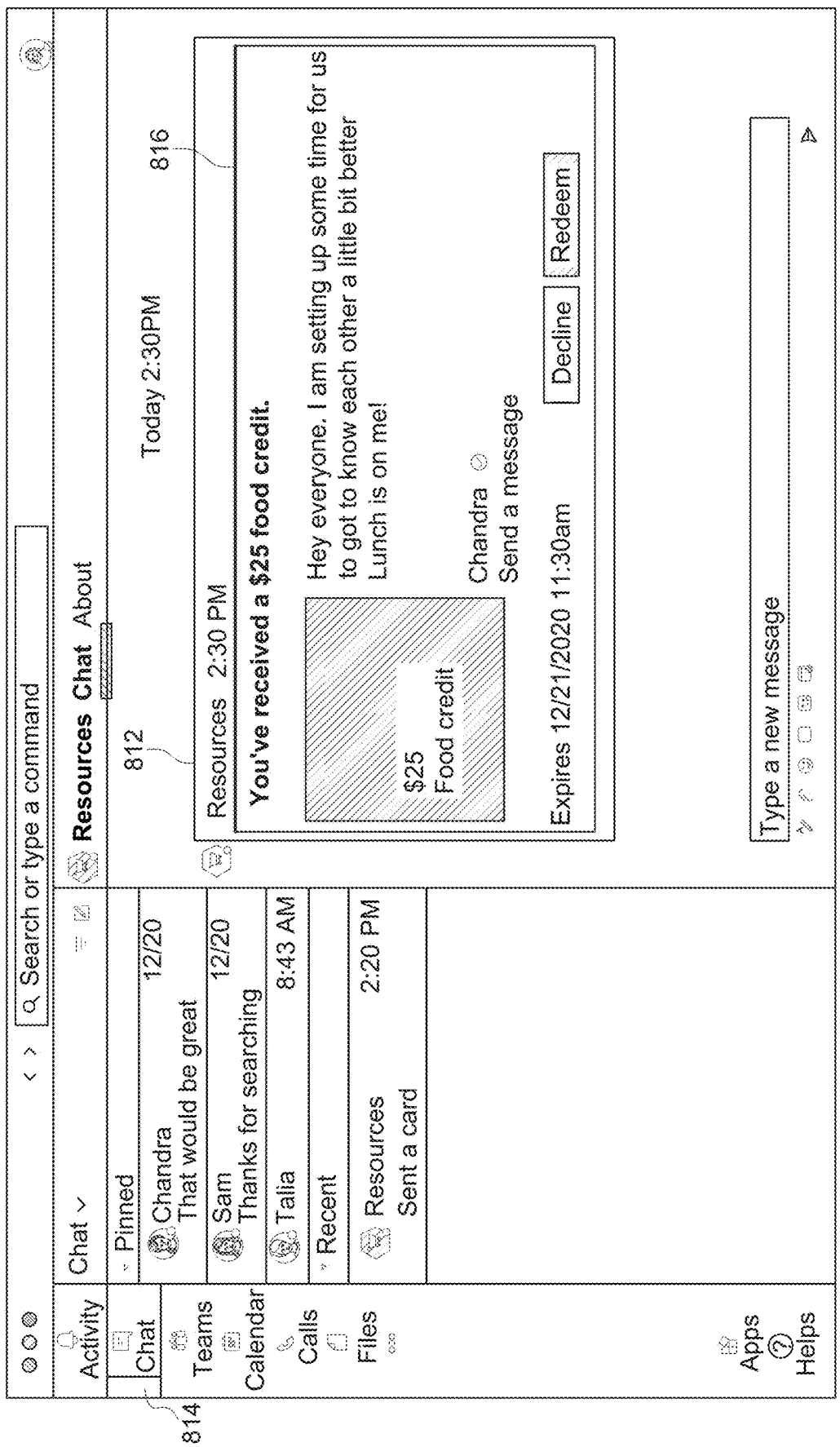
FIG. 8E is a schematic view depicting a food-associated event invitation that is received at a remote computing system that is operated by one of the event attendees.

FIG. 8E is a schematic view depicting a food-associated event invitation 812 that is received at a remote computing system that is operated by one of the event attendees (e.g., in this example, the user named "Sam"). As shown in FIG. 8E, the food-associated event invitation 812 may be received as a chat-based message within a "Chat" folder or section 814 of the calendar application. The food-associated event invitation 812 may also include a second event user interface 816 that includes information about the food-associated event, as well as one or more user interface elements for providing user input regarding the food-associated event invitation. In particular, the second event user interface 816 may include user interface elements that provide an option to communicate an intention to interact with the food service(s) associated with the food-associated event (i.e., a "Redeem" response) or an intention to not interact with the food service(s) associated with the food-associated event (i.e., a "Decline" response).

Figure 8F:
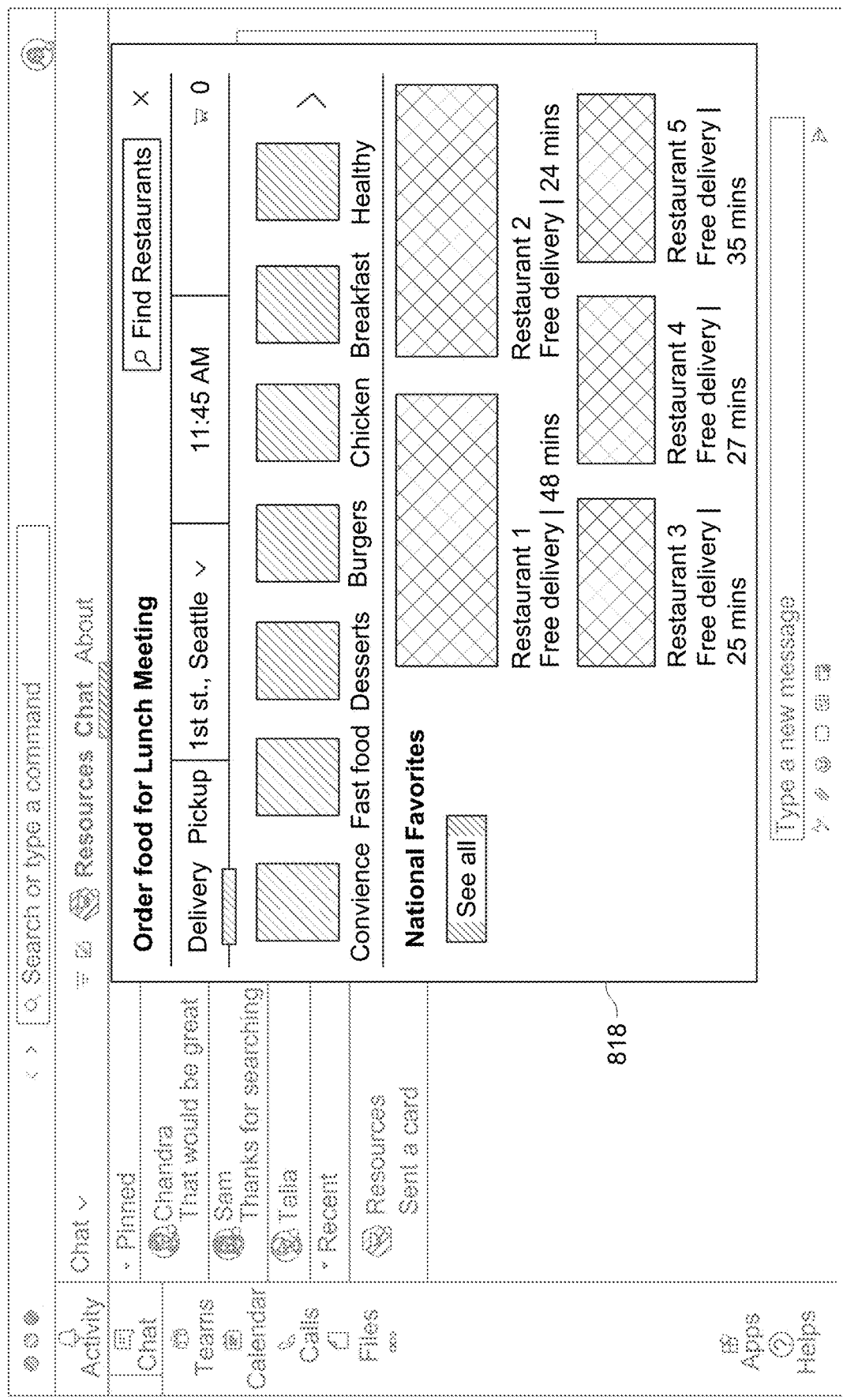
FIG. 8F is a schematic view depicting the manner in which the calendar application connects with the food service(s) via a food service connection panel that is provided by (or overlaid onto) the second event user interface of the calendar application in response to connection with the food service(s) via corresponding application programming interface(s)

FIG. 8F is a schematic view depicting the manner in which the calendar application connects with the food service(s) via a food service connection panel 816 (in this embodiment, more generally referred to as a "third-party resource connection panel") that is provided by (or overlaid onto) the second event user interface 816 of the calendar application in response to connection with the food service(s) via corresponding application programming interface(s) (API(s)). As shown in FIG. 8F, the food service connection panel 818 includes several user interface elements that enable the event attendee to provide inputs or commands that define the event attendee's interaction with the food service(s) with respect to the food-associated event. For example, according to the embodiment shown in FIG. 8F, the event attendee may provide the delivery address and delivery time via the food service connection panel 722. In addition, the event attendee may select the restaurant from which they wish to order food.

Figure 8G:
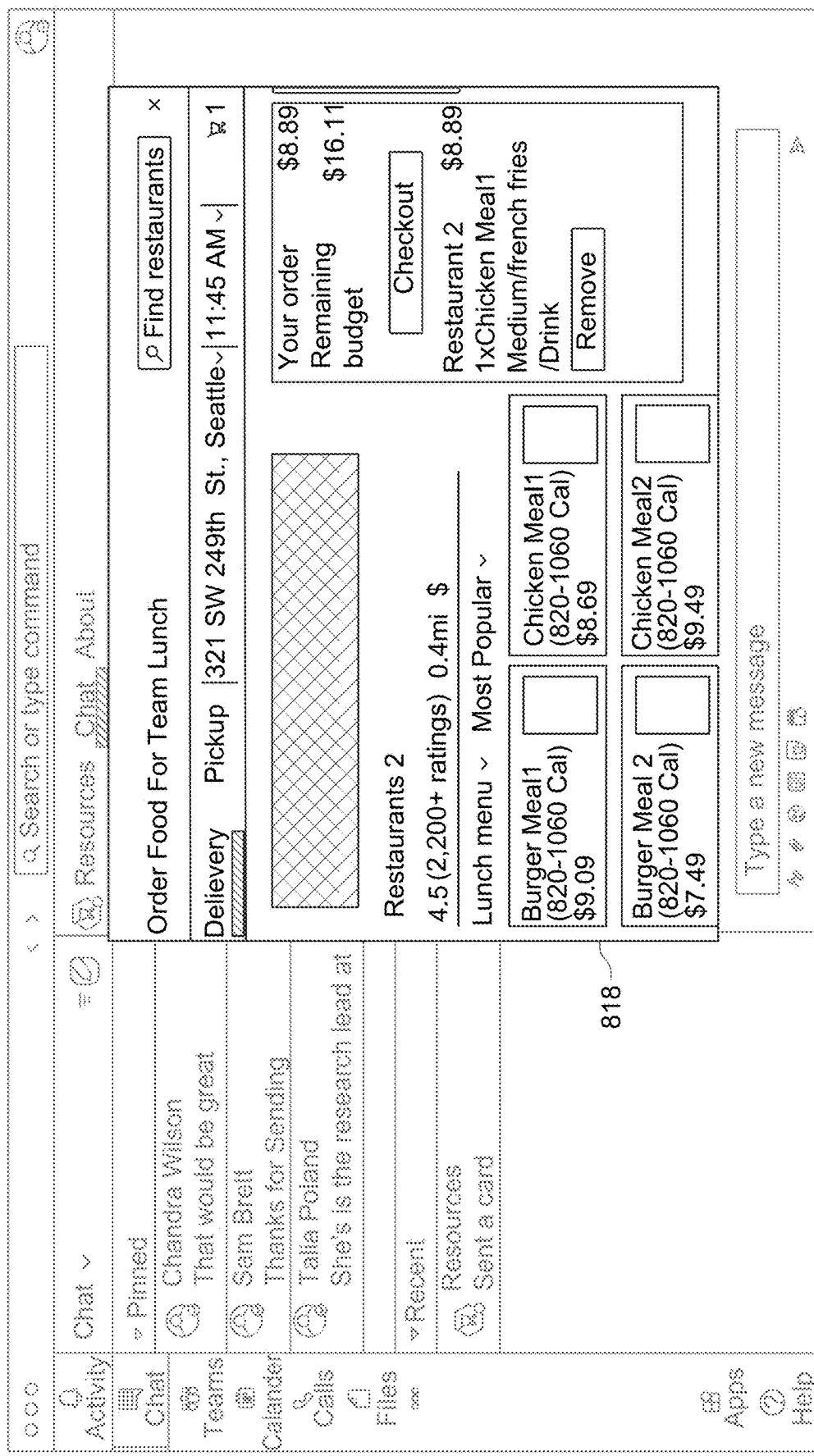
FIG. 8G is a schematic view depicting the manner in which the food service connection panel may display options for selecting food to order from the food service that is selected by the event attendee.

FIG. 8G is a schematic view depicting the manner in which the food service connection panel 818 may display options for selecting food to order from the food service that is selected by the event attendee. More specifically, according to the embodiment shown in FIG. 8G, the food service connection panel 818 displays meal options provided by "Restaurant 2" in response to the event attendee selecting "Restaurant 2" as the restaurant from which they wish to order food. In addition, the food service connection panel 818 may provide additional details regarding the selected food service (e.g., restaurant), such as, for example, user reviews/ratings and/or the distance between the user's location and the food service location (if the food service has a physical location).

Figure 8H:
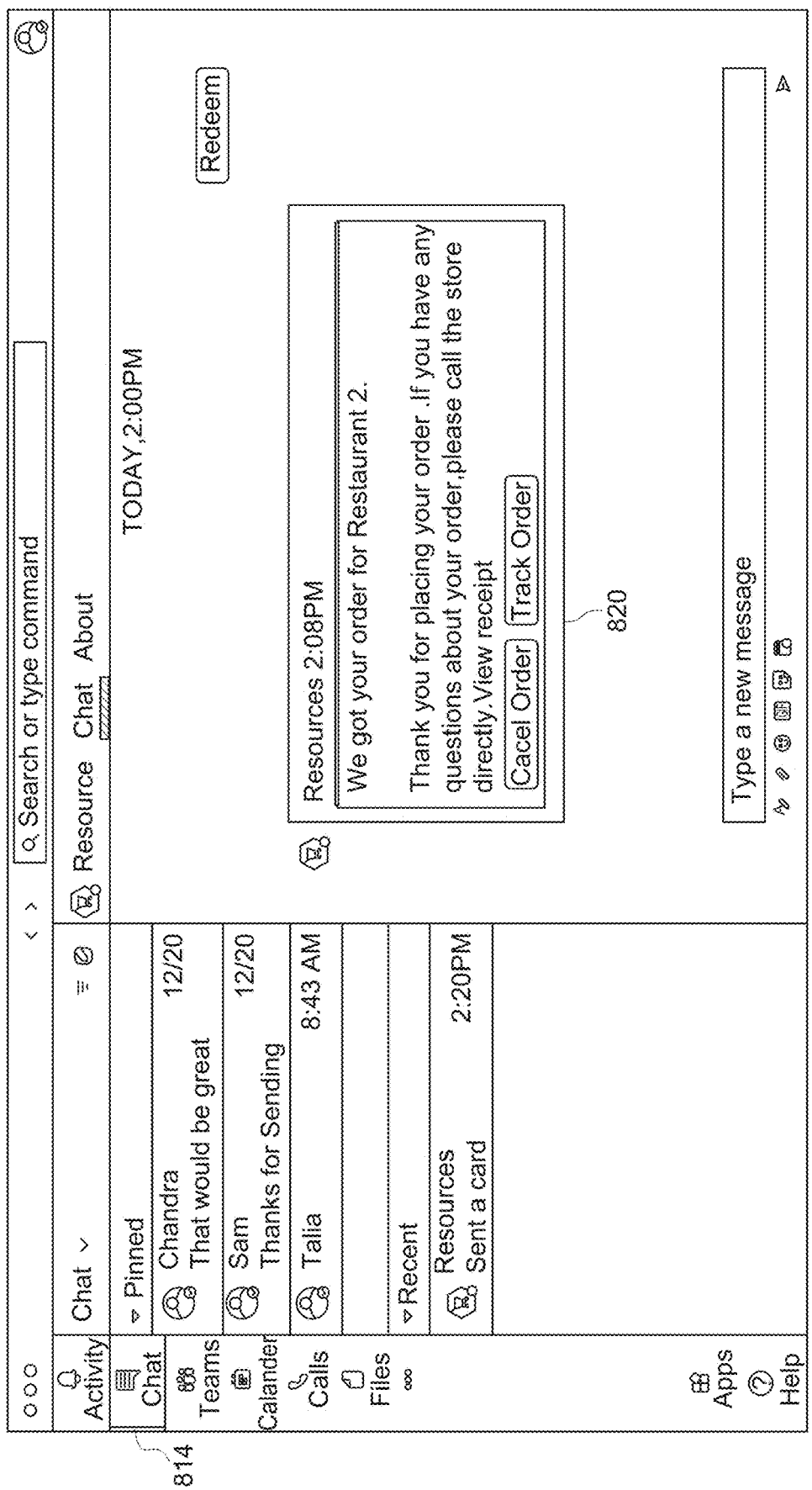
FIG. 8H is a schematic view depicting a food service confirmation message that may be received by the event attendee in response to the event attendee's interaction with the food service.

FIG. 8H is a schematic view depicting a food service confirmation message 820 (in this embodiment, more generally referred to as a "third-party resource confirmation message") that may be received by the event attendee in response to the event attendee's interaction with the food service. As shown in FIG. 8H, the food service confirmation message 820 may be provided as a chat-based message within the "Chat" folder or section 814 of the calendar application. In addition, in some embodiments, the food service confirmation message 820 includes user interface elements for modifying the interaction with the food service. For example, the food service confirmation message 820 may include user interface elements for canceling the order and/or tracking the order, as shown in FIG. 8H.

In various embodiments, the food service confirmation message 820 further serves as confirmation that the food service data generated as a result of the event attendee's interaction with the food service has been reconciled with the food-associated event data corresponding to the food-associated event. In this manner, the food-associated event is updated within the calendar application such that information relating to the food service is directly associated with the food-associated event.

Figure 9:
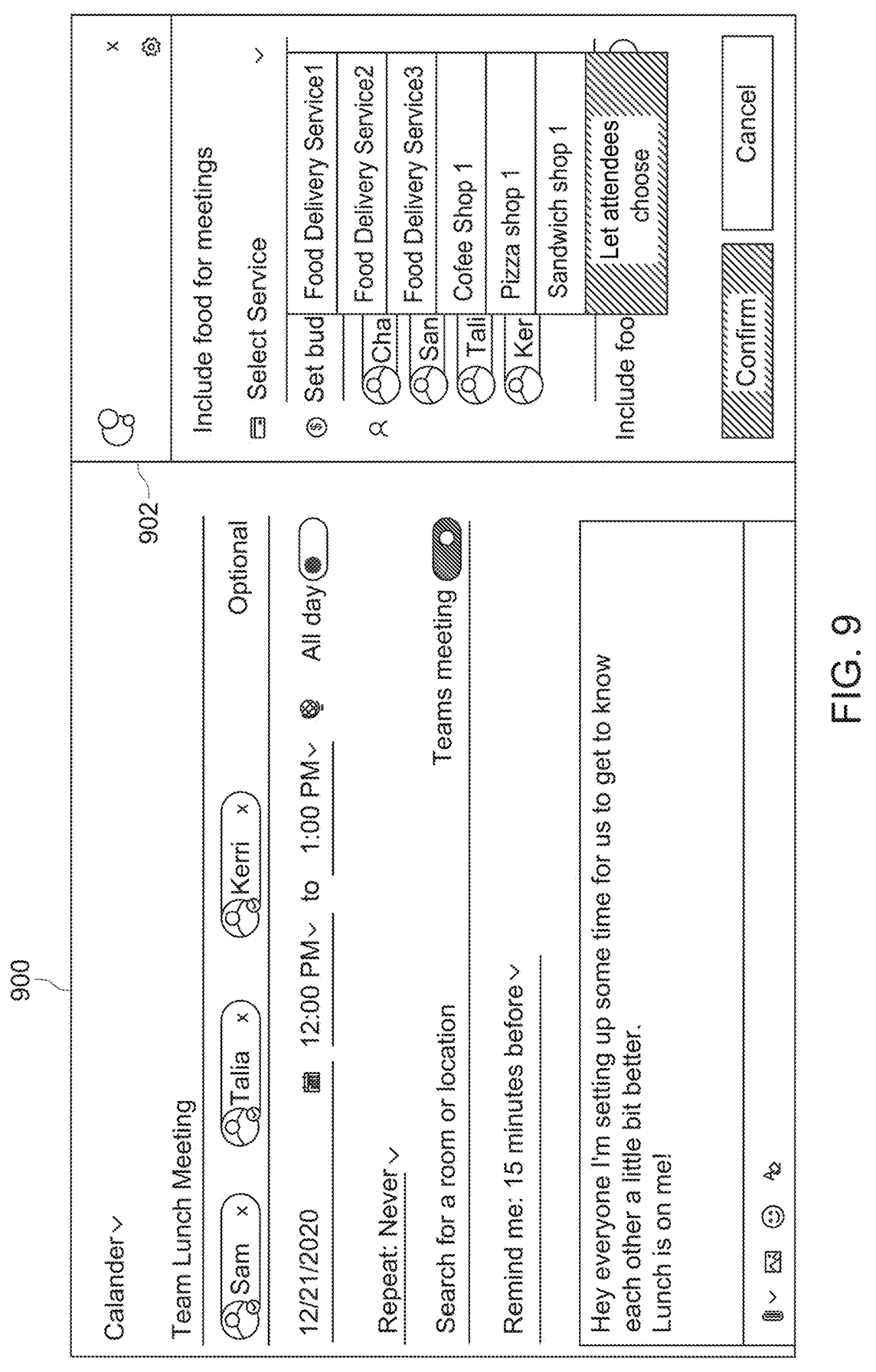

Turning now to the details of the third exemplary implementation, FIG. 9 is a schematic view depicting another exemplary event user interface 900 including a food service panel 902 that enables an event organizer to select one or more food services to associate with a food-associated event. For example, as shown in FIG. 9, the food service panel 902 may include user interface elements for selecting from any number of food delivery services (e.g., "Food Delivery Service 1", "Food Delivery Service 2", etc.) and/or any number of specific restaurants (e.g., "Coffee Shop 1", "Pizza Shop 1", "Sandwich Shop 1", etc.). In addition, the food service panel 902 may include an option to "Let attendees choose", in which case the individual event attendees are able to not only choose their food for the food-associated event, but also to select the food service(s) from which they wish to order such food.

Figure 10:
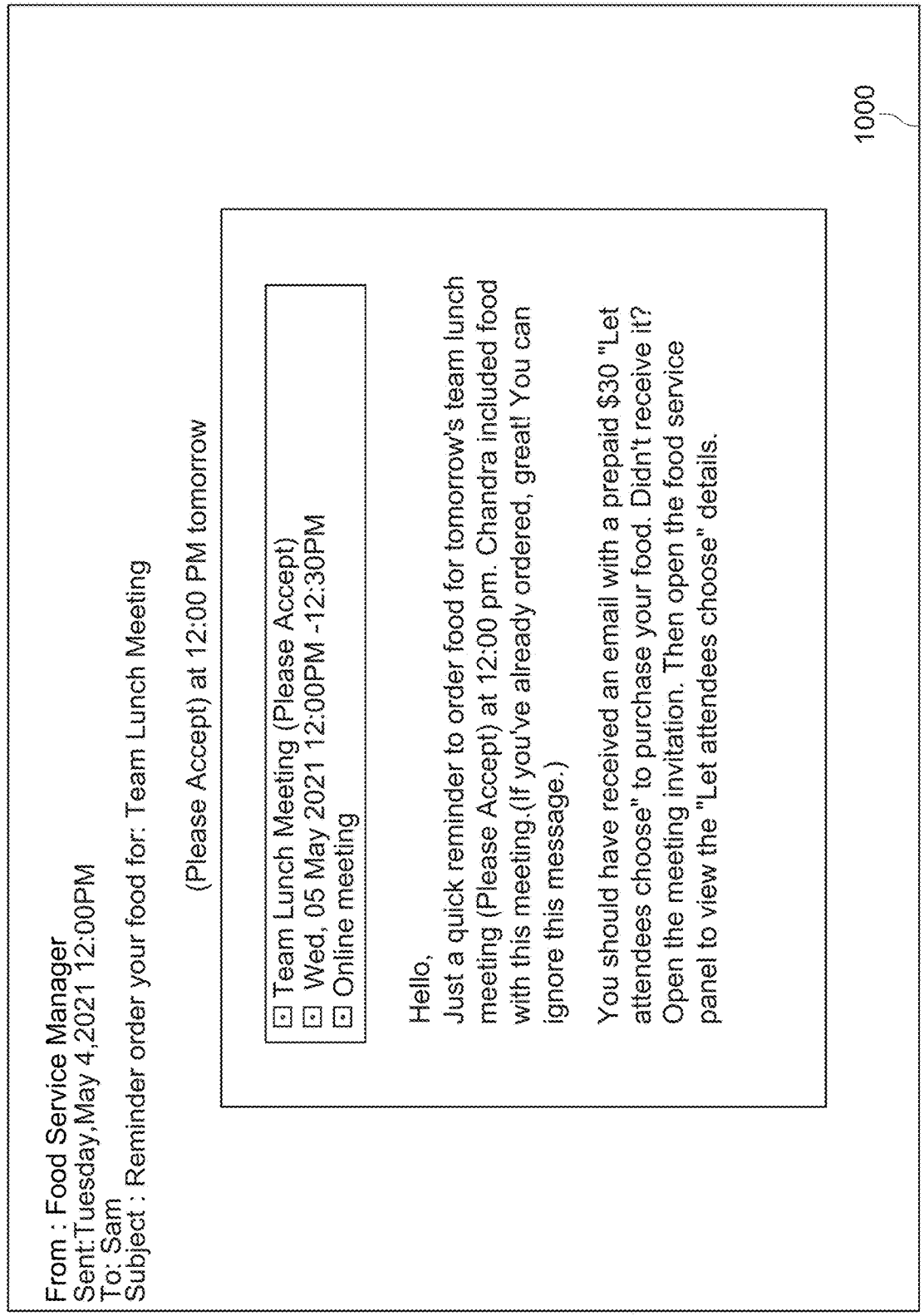
FIG. 10 is a schematic view of an exemplary reminder message that may be received by an event attendee in advance of a food-associated event.

Turning now to the details of the fourth exemplary implementation, FIG. 10 is a schematic view of an exemplary reminder message 1000 that may be received by an event attendee in advance of a food-associated event. The reminder message 1000 may be provided in the form of, for example, an email message, a chat-based message, and/or a calendar notification. Moreover, the reminder message 1000 may be provided by the calendar application (and received by the event attendee) at any number of predetermined times or intervals preceding the food-associated event. As an example, the reminder message 1000 may be provided 24 hours and/or 48 hours before the scheduled time for the food-associated event. As another example, the reminder message 1000 may be provided every day within the week leading up to the food-associated event.

Figure 11A:
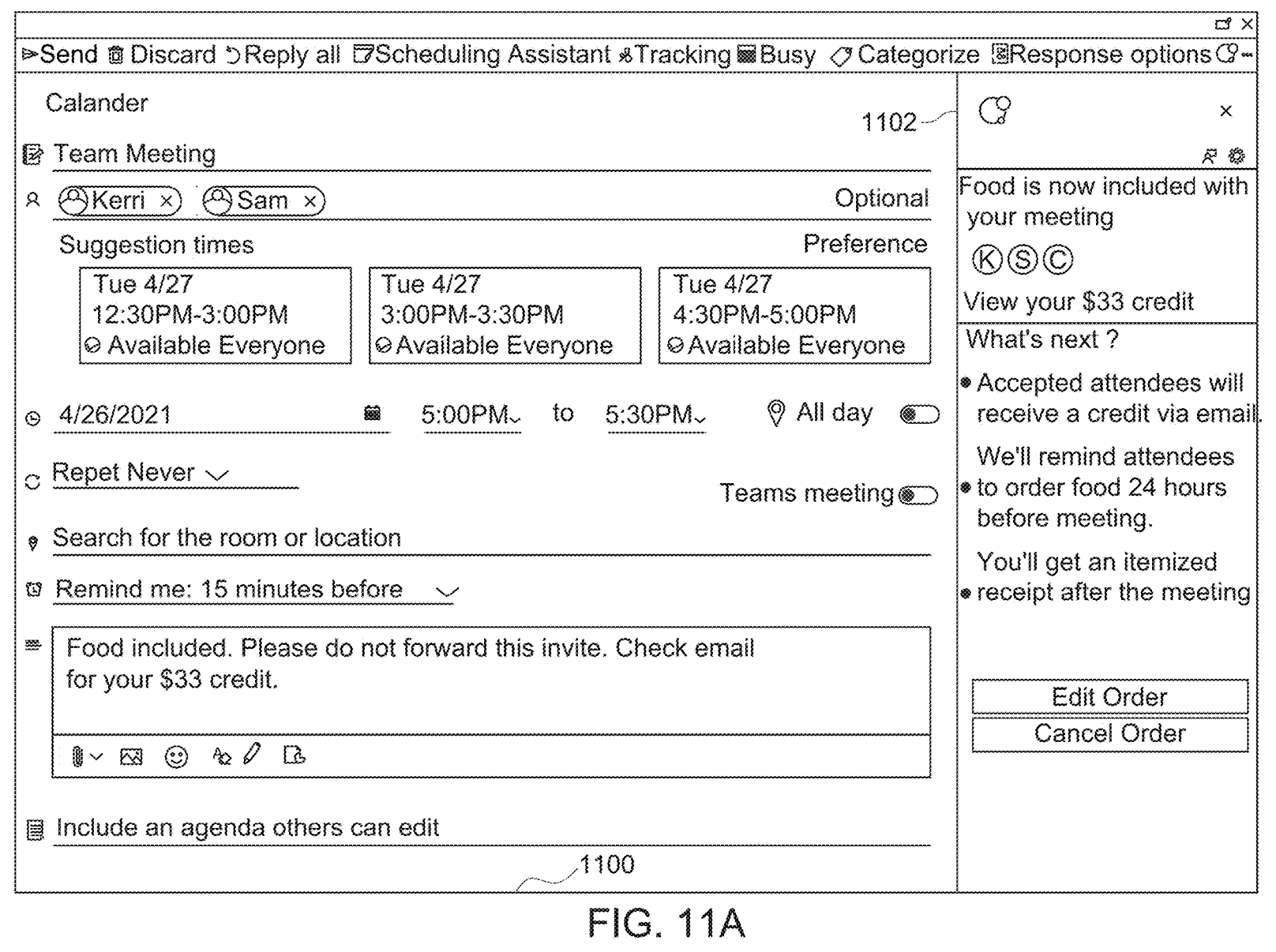
Figure 11B:
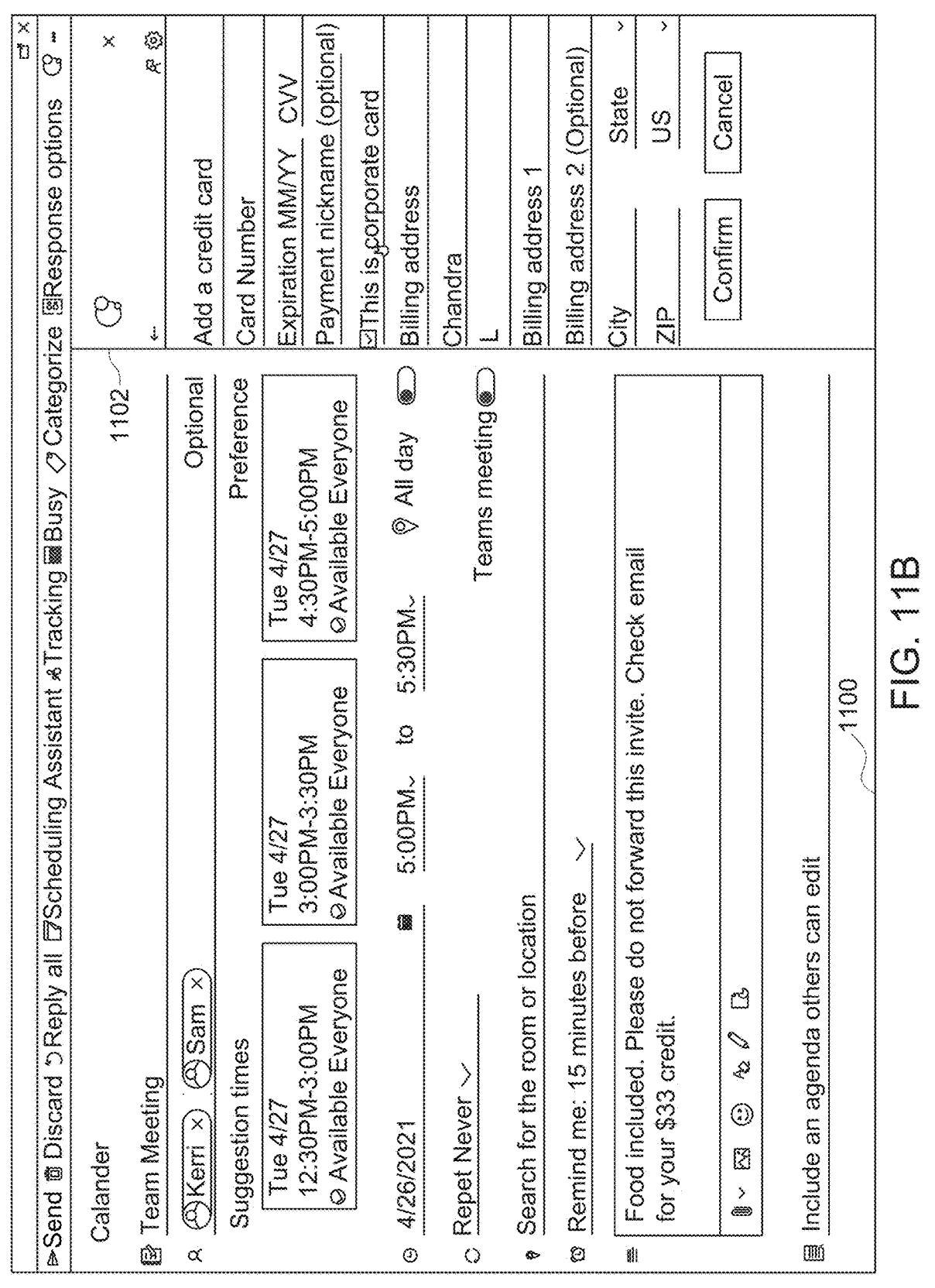

Turning now to the details of the fifth exemplary implementation, FIGS. 11A-11D provide an example of the manner in which the food service management techniques described herein can be used to provide integrated expense reporting for a food-associated event within the context of the calendar application. In particular, FIG. 11A is a schematic view depicting an exemplary event user interface 1100 and corresponding food service panel 1102 after an event organizer has associated one or more food services with a food-associated event. As shown in FIG. 11A, the event user interface 1100 includes information related to the food-associated event, as described herein. In addition, the food service panel 1102 includes information regarding the association of the food service(s) with the food-associated event via the food service management functionality of the calendar application. Moreover, FIG. 11B is a schematic view of the event user interface 1100 and the corresponding food service panel 1102 of FIG. 11A, in which the food service panel 1102 includes information regarding the payment method for interacting with the food service(s) associated with the event.

FIG. 11C is a schematic view of a receipt message 1104 that may be received by the event organizer after the food-associated event is over. As shown in FIG. 11C, the receipt message 1104 may be received as an email message within an email inbox folder of the calendar application. Additionally or alternatively, the receipt message 1104 (or some variation thereof) may be received as a chat-based message and/or a calendar notification, for example. Moreover, in some embodiments, the receipt message 1104 may be received as an email or chat-based message with respect to a separate application other than the calendar application.

In various embodiments, the receipt message 1104 includes information relating to the food-associated event. Most notably, the receipt message 1104 includes information regarding the total costs (or expenses) incurred as a result of the user interactions with the food service(s) associated with the food-associated event. Moreover, as shown in FIG. 11C, such costs may be itemized on a per-user basis according to each user's budget for ordering food from the food service(s).

FIG. 11D is a schematic view of an expense reporting message 1106 that may be received by the event organizer after the food-associated event is over. As shown in FIG. 11D, the expense reporting message 1106 may be received as an email message within an email inbox folder of the calendar application. Additionally or alternatively, the expense reporting message 1106 (or some variation thereof) may be received as a chat-based message and/or a calendar notification, for example. Moreover, in some embodiments, the expense reporting message 1106 may be received as an email or chat-based message with respect to a separate application other than the calendar application.

As shown in FIG. 11D, the expense reporting message 1106 includes relevant information for reporting expenses for the food-associated event. This expense reporting functionality is particularly useful for scheduling and managing work events for which the event organizer is entitled to reimbursement. According to embodiments described herein, this expense reporting functionality provides the event organizer with an automatic, seamless, and virtually effortless means of reporting expenses for all the food the event attendee(s) ordered for the food-associated event, all within the context of the calendar application.

In some embodiments, the expense reporting message 1106 is generated as part of an expense reporting functionality of the calendar application itself, as described herein. In other embodiments, the expense reporting message 1106 is generated by a separate expense reporting service that is integrated with the calendar application, as also described herein. In either case, the expense reporting message 1106 is generated using the reconciled food-associated event information that includes the information regarding the user interaction(s) with the food service(s) for the food-associated event.

Figure 12A:
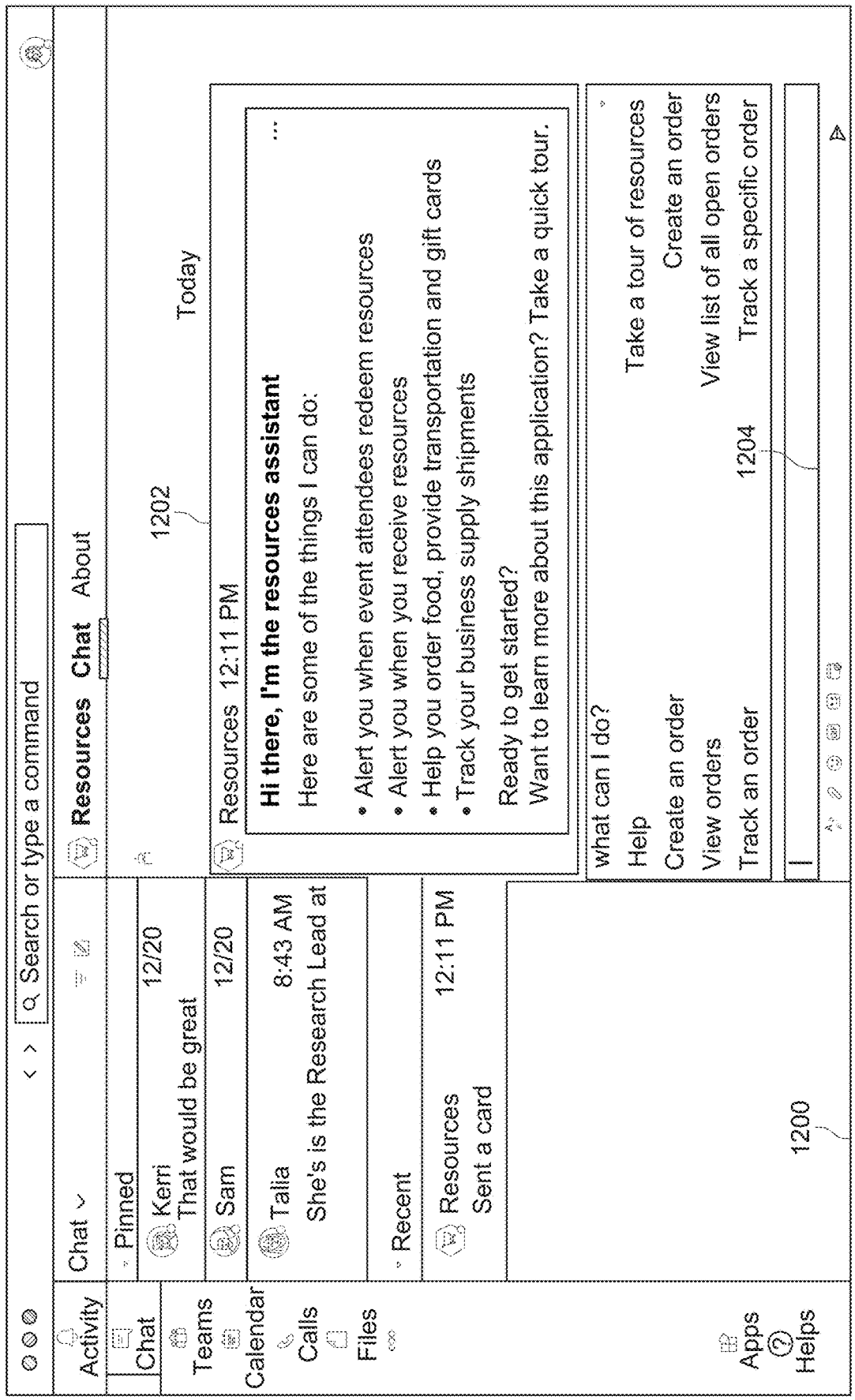
FIG. 12A is a schematic view of a chat-based messaging user interface of the calendar application including an event user interface according to embodiments described herein, as viewed from the perspective of the event organizer.

Turning now to the details of the sixth exemplary implementation, FIGS. 12A-12D provide an example of the manner in which the food service management techniques described herein can be implemented as part of a chat-based messaging functionality of the calendar application. In particular, FIG. 12A is a schematic view of a chat-based messaging user interface 1200 of the calendar application including an event user interface 1202 according to embodiments described herein, as viewed from the perspective of the event organizer. The chat-based messaging user interface 1200 may include, for example, the "Chat" user interface provided by Microsoft Teams. In various embodiments, the user may utilize the event user interface 1202 to invoke the food service management functionality described herein on demand from the chat-based messaging user interface 1200, such as via user interaction with a user interface element 1204 corresponding to the food service management techniques (e.g., via the input of textual and/or voice commands indicating a desire to utilize the food service management techniques).

Figure 12B:
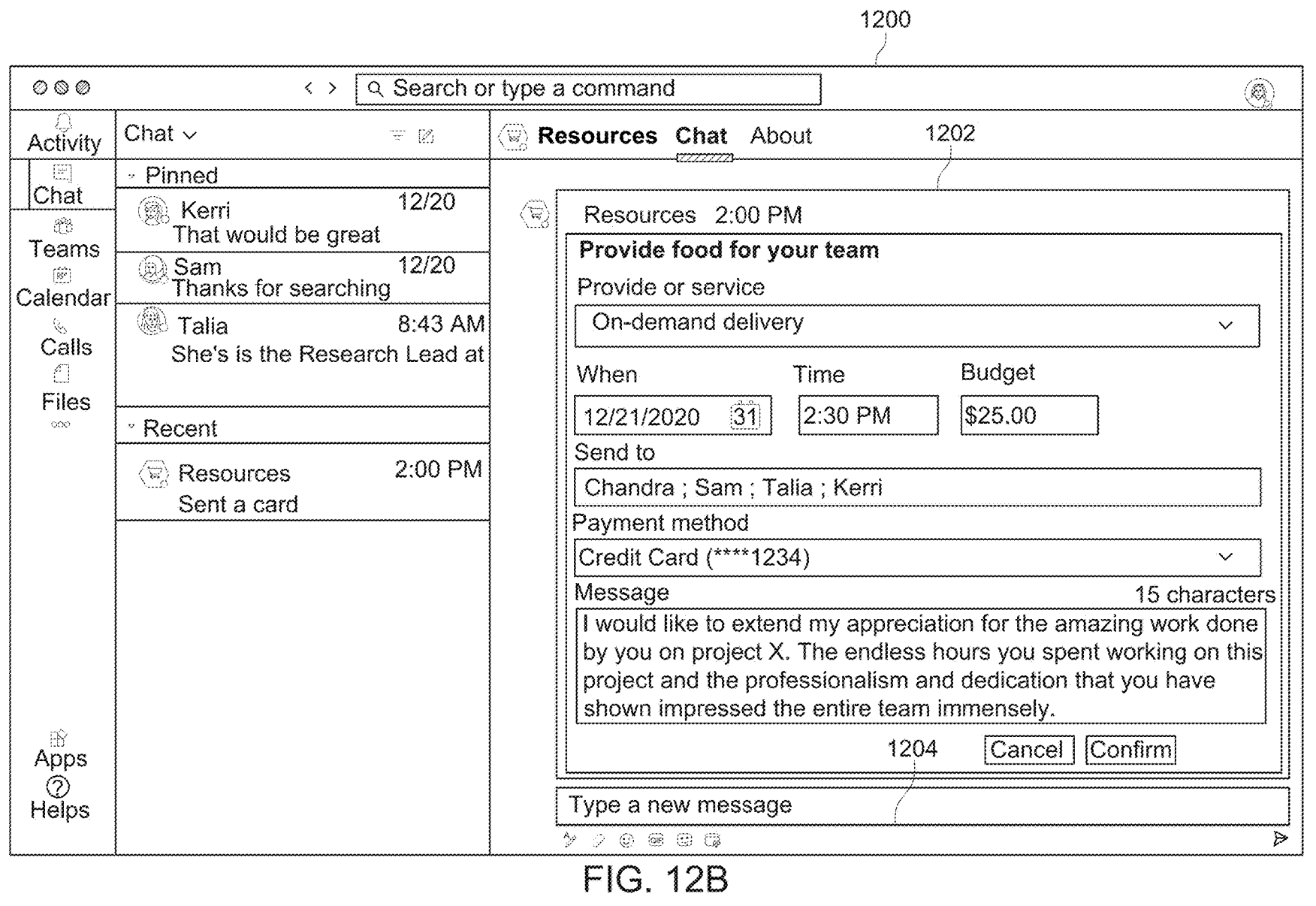

FIG. 12B is a schematic view of the chat-based messaging user interface 1200 of FIG. 12A, showing the manner in which the event user interface 1202 provides information regarding the food-associated event and any food service(s) that have been associated with the event. In particular, according to the embodiment shown in FIG. 12B, the event user interface 1202 shows that the event organizer has selected "On-demand delivery" is the type of food service to associate with the event, meaning that the event organizer has authorized the event attendees to select the food services from which they wish to order food for the event. In addition, the event organizer has specified a $25 budget for each event attendee and has entered a desired payment method for the resulting food service interactions.

Figure 12C:
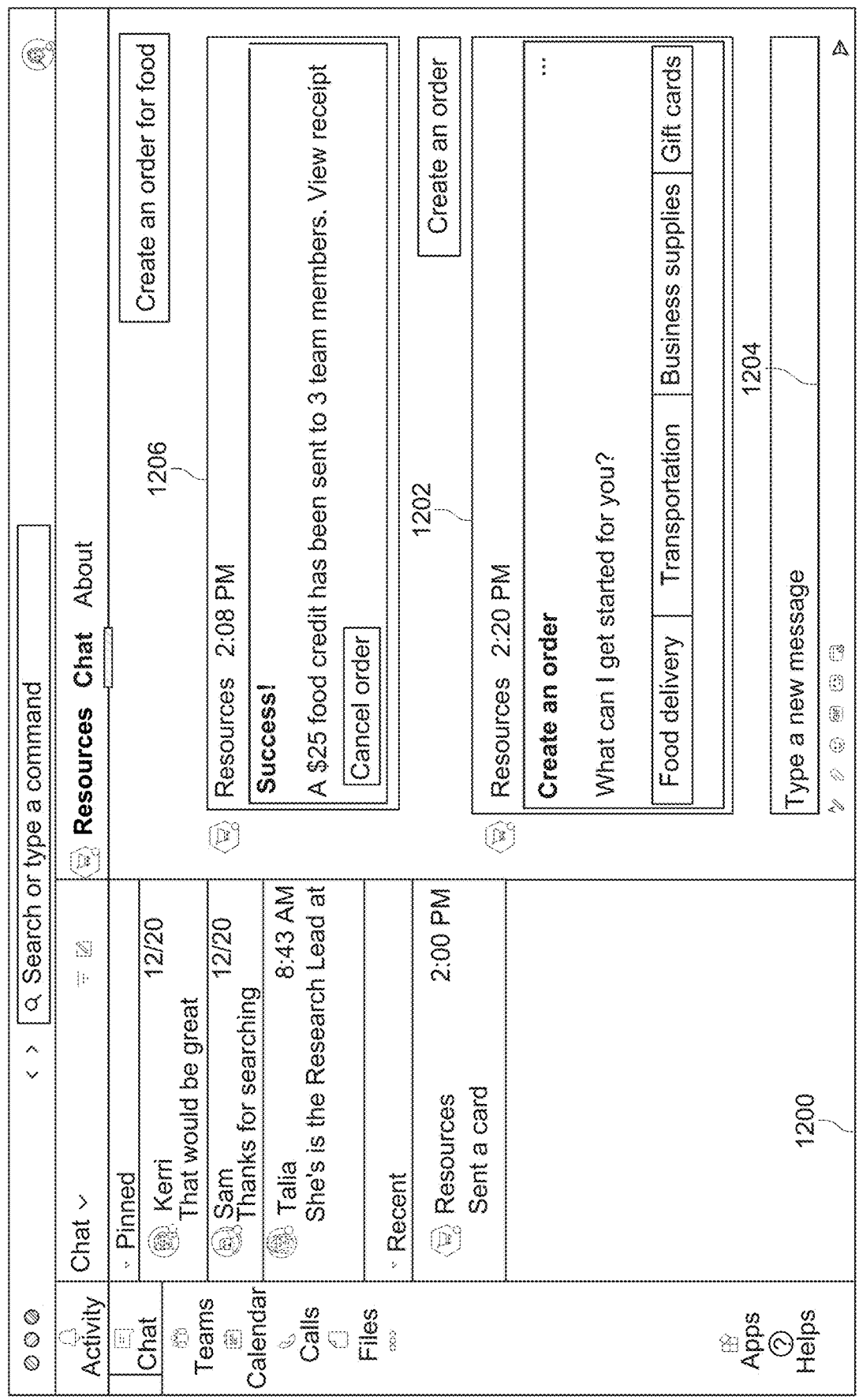
FIG. 12C is a schematic view of the chat-based messaging user interface of FIG. 12A, showing a food service confirmation message that may be displayed after the event organizer has successfully associated the food service(s) with the food-associated event.

FIG. 12C is a schematic view of the chat-based messaging user interface 1200 of FIG. 12A, showing a food service confirmation message 1206 (in this embodiment, more generally referred to as a "third-party resource confirmation message") that may be displayed after the event organizer has successfully associated the food service(s) with the food-associated event. As shown in FIG. 12C, the food service confirmation message 1206 may include information relating to the food services that have been associated with the event, such, as, for example, the type(s) of food service(s) that have been associated with the event, the specified budget, and a link to a resulting receipt.

Figure 12D:
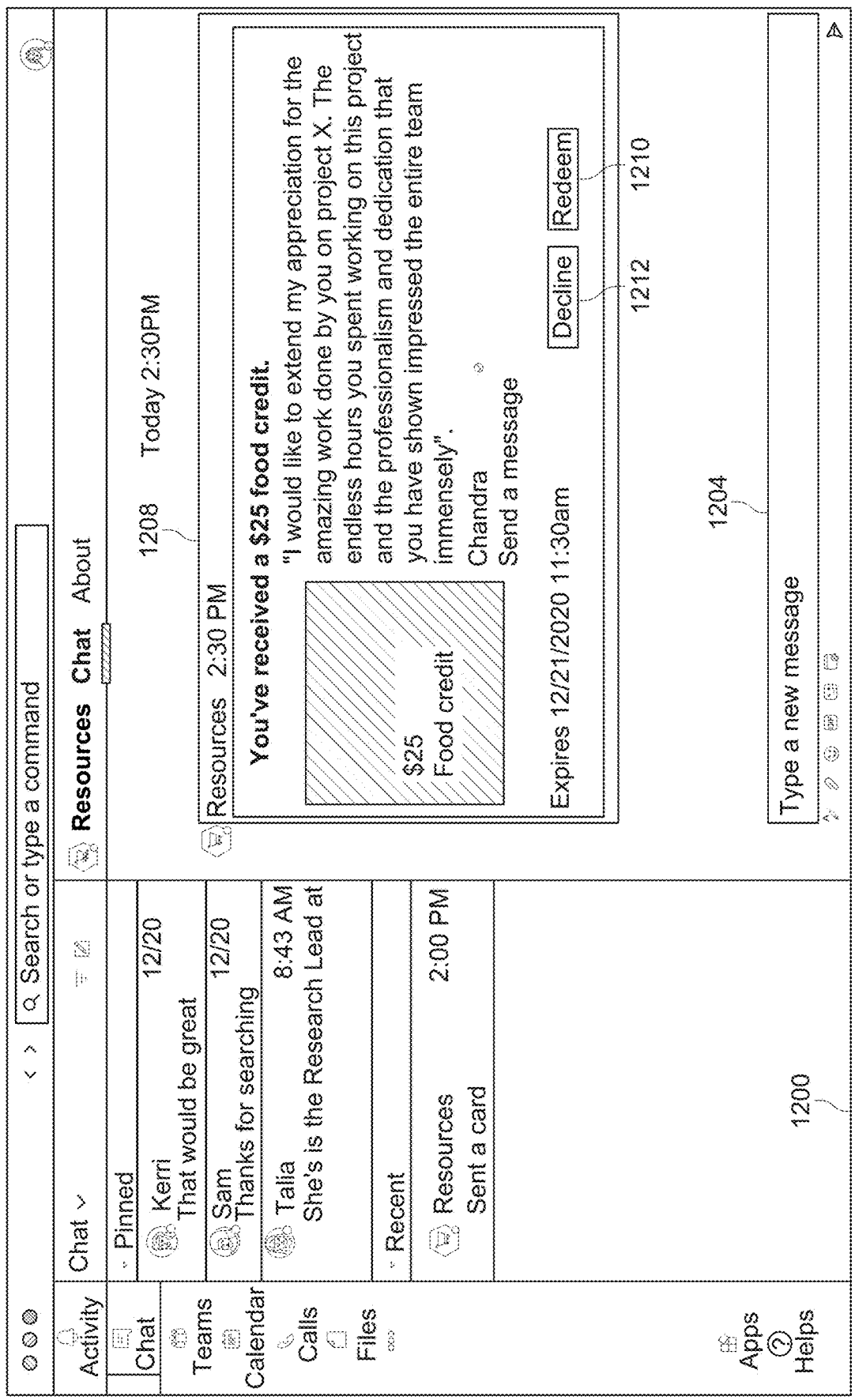
FIG. 12D is a schematic view of the chat-based messaging user interface including another event user interface, as viewed from the perspective of an event attendee.

FIG. 12D is a schematic view of the chat-based messaging user interface 1200 including another event user interface 1208, as viewed from the perspective of an event attendee. As shown in FIG. 12D, the event user interface 1208 may automatically pop up within the "Chat" window of the calendar application and may include information regarding the food-associated event, as well as the food service(s) that have been associated with the event. In addition, the event user interface 1208 may provide the event attendee with the option to interact with the food service(s) associated with the event. For example, according to the embodiment shown in FIG. 12D, the option to interact with the food service(s) is provided in the form of multiple user interface elements. Such user interface elements may include, for example, a "Redeem" button 1210 and a "Decline" button 1212, where user input consisting of clicking on the "Redeem" button 1210 enables the event attendee to interact with the food service(s) to order food, and user input consisting of clicking on the "Decline" button 1212 prevents the event attendee from interacting with the food service(s) to order food.

As will be appreciated by those skilled in the art, the techniques described herein may enhance users' experiences with respect to food-associated events in various ways, both from the perspective of event organizers and event attendees. In particular, the techniques described herein may increase the productivity of users by deeply integrating food service management capabilities into the calendar application, as well as enabling various food services to be directly associated with particular calendar events. In this manner, the user is able to seamlessly manage any number of food services for events within the context of the calendar application, without having to continuously switch between different applications and/or websites.

The techniques described herein may also enable the social constructs of in-person meetings to be effectively extended to virtual meetings, such as meetings that occur via videoconference. This is particularly beneficial for hybrid work meetings in which some colleagues attend the meeting in person, while other colleagues attend the meeting virtually. In particular, the ability to easily provide food to all colleagues attending the meeting, whether in person or virtually, may increase the sense of togetherness or social connection between colleagues.

In general, the techniques described herein may improve the experience of everyone attending a particular event. For example, from the perspective of the event organizer, the techniques described herein simplify and streamline the planning process by enabling food services to be quickly and efficiently linked to the food-associated event in a manner that enables input from the event attendees, as well as by automatically calculating all costs associated with such food services and allowing such costs to be expensed using one receipt that consolidates the responses from all the event attendees. From the perspective of the event attendees, the techniques described herein provide a seamless and customized event experience by enabling the event attendees to make their own choices regarding the food-associated event within minimal input (e.g., with only a few clicks) and, thus, with minimal hassle.

In various embodiments, machine learning methods can be used to extend the food service management techniques described herein. For example, in some embodiments, the food service management module may utilize one or more types of machine learning models, such as, for example, supervised machine learning models, unsupervised machine learning models, and/or reinforcement learning models, to effectively learn (or predict) the particular food services, food categories, and/or meal types that are mostly likely to be of interest to the user. As an example, the food service management module may utilize such machine learning models to predict that a user may be interested in ordering food from a particular restaurant if the user is located proximate to the restaurant and the user's history (e.g., the user's email history, chat history, browser history, and/or calendar history) shows that the user has previously ordered the type of food offered by the restaurant. As another example, the food service management module may utilize such machine learning models to make broad predictions about similarities between users, such as, for example, predictions based on different types of food that are typically ordered at the same time and/or by the same users. This may then be provided to the user via the event user interface in the form of a message saying that users who order from a particular food service typically also like another particular food service.

Moreover, in various embodiments, the food service management module described herein is integrated into the calendar application in the form of a software add-in that can be invoked during the execution of the calendar application. As an example, for embodiments in which the food service management module is installed as an add-in for a chat-based application that includes scheduling functionalities (such as, for example, Microsoft Teams), the user may invoke the food service management module on demand from the chat-based messaging user interface and/or the calendar user interface provided by the application. In this manner, the food service management module enables the user to quickly and efficiently manage food services for food-associated events at any time.

Furthermore, it should be noted that, while the methods and processes described herein are generally expressed in regard to discrete steps, these steps should be viewed as being logical in nature and may or may not correspond to any specific actual and/or discrete steps of a given implementation. In addition, the order in which these steps are presented in the various methods and processes, unless otherwise indicated, should not be construed as the only order in which the steps may be carried out. Moreover, in some instances, some of these steps may be combined and/or omitted. Those skilled in the art will recognize that the logical presentation of steps is sufficiently instructive to carry out aspects of the claimed subject matter irrespective of any particular development or coding language in which the logical instructions/steps are encoded.

Of course, while the methods and processes described herein include various novel features of the disclosed subject matter, other steps (not listed) may also be carried out in the execution of the subject matter set forth in these methods and processes. Those skilled in the art will appreciate that the logical steps of these methods and processes may be combined together or split into additional steps. Steps of the above-described methods and processes may be carried out in parallel or in series. Often, but not exclusively, the functionality of a particular method or process is embodied in software (e.g., applications, system services, libraries, and the like) that is executed on one or more processors of computing systems. Additionally, in various embodiments, all or some of the various methods and processes may also be embodied in executable hardware modules including, but not limited to, system on chips (SoC's), codecs, specially designed processors and/or logic circuits, and the like, on a computing system.

As suggested above, each method or process described herein is typically embodied within computer-executable instruction (or code) modules including individual routines, functions, looping structures, selectors and switches (such as if-then and if-then-else statements), assignments, arithmetic computations, and the like, that, in execution, configure a computing system to operate in accordance with the particular method or process However, as suggested above, the exact implementation in executable statement of each of the methods or processes is based on various implementation configurations and decisions, including programming languages, compilers, target processors, operating environments, and the linking or binding operation. Those skilled in the art will readily appreciate that the logical steps identified in these methods and processes may be implemented in any number of ways and, thus, the logical descriptions set forth above are sufficiently enabling to achieve similar results.

While various novel aspects of the disclosed subject matter have been described, it should be appreciated that these aspects are exemplary and should not be construed as limiting. Variations and alterations to the various aspects may be made without departing from the scope of the disclosed subject matter.

Examples

Example 1 is a computer-readable storage medium including computer-executable instructions that, when executed by at least one processor, cause the at least one processor to: associate food services with a food-associated event within a calendar application in response to first user commands received via an event user interface functionality provided by the calendar application, wherein at least one of the first user commands includes an authorization to interact with the food services according to a specified budget to select desired food for the food-associated event; connect with any of the food services via corresponding application programming interfaces in response to second user commands received via the event user interface functionality provided by the calendar application, wherein the corresponding application programming interfaces are provided within a context of the calendar application; generate food service data for the food-associated event in response to at least one user interaction with at least one of the food services via at least one corresponding application programming interface provided within the context of the calendar application, wherein the at least one user interaction includes at least one selection of the desired food for the food-associated event, and wherein the at least one selection complies with the specified budget for interacting with the food services; and reconcile the food service data with food-associated event data corresponding to the food-associated event within the calendar application.

Example 2 includes the computer-readable storage medium of example 1, including or excluding optional features. In this example, the computer-executable instructions, when executed by the at least one processor, cause the at least one processor to: analyze the reconciled food-associated event data including the food service data to determine costs associated with the at least one user interaction with the at least one of the food services; generate an expense report based on the determined costs; and link the expense report with the food-associated event within the calendar application.

Example 3 includes the computer-readable storage medium of example 1, including or excluding optional features. In this example, the computer-executable instructions, when executed by the at least one processor, cause the at least one processor to: enable an expense reporting service to access the reconciled food-associated event data including the food service data to determine costs associated with the at least one user interaction with the at least one of the food services, wherein the expense reporting service generates an expense report based on the determined costs; and link the expense report with the food-associated event within the calendar application.

Example 4 includes the computer-readable storage medium of any one of examples 1 to 3, including or excluding optional features. In this example, the computer-executable instructions, when executed by the at least one processor, cause the at least one processor to: receive data relating to the first user commands from a remote computing system corresponding to a calendar; and receive data relating to the second user commands and the at least one user interaction with the at least one of the food services from at least one other remote computing system corresponding to at least one other calendar.

Example 5 includes the computer-readable storage medium of any one of examples 1 to 4, including or excluding optional features. In this example, the budget is specified as a predefined amount for each user who is authorized to interact with the food services.

Example 6 is a calendar application server, including a processor and a computer-readable storage medium operatively coupled to the processor. The computer-readable storage medium includes computer-executable instructions that, when executed by the processor, cause the processor to: enable execution of a calendar application on a first remote computing system corresponding to a first calendar, wherein the first remote computing system is communicably coupled to the calendar application server through a network; provide a first event user interface surfaced on a display of the first remote computing system in response to a user-initiated creation of a food-associated event with respect to a first calendar within the calendar application; associate a food service with the food-associated event within the calendar application in response to a first user command received via the first event user interface, wherein the first user command includes an authorization to interact with the food service according to a specified budget to select desired food for the food-associated event; transmit a food-associated event invitation to a second remote computing system corresponding to a second calendar in response to a second user command received via the first event user interface, wherein the second remote computing system is communicably coupled to the calendar application server through the network; enable execution of the calendar application on the second remote computing system; provide a second event user interface surfaced on a display of the second remote computing system in response to a user-initiated acceptance of the food-associated event invitation; connect with the food service associated with the food-associated event via an application programming interface corresponding to the food service in response to a third user command received via the second event user interface, wherein the application programming interface is provided within a context of the calendar application; generate food service data for the food-associated event in response to a user interaction with the food service via the application programming interface, wherein the user interaction includes a selection of the desired food for the food-associated event, and wherein the selection complies with the specified budget for interacting with the food service; and reconcile the food service data with food-associated event data corresponding to the food-associated event within the calendar application such that the food-associated event is updated with respect to the first calendar and the second calendar.

Example 7 includes the calendar application server of example 6, including or excluding optional features. In this example, the computer-executable instructions, when executed by the processor, further cause the processor to: analyze the reconciled food-associated event data including the food service data to determine costs associated with the user interaction with the food service via the second remote computing system corresponding to the second calendar; generate an expense report based on the determined costs; and provide the expense report to the first remote computing system corresponding to the first calendar.

Example 8 includes the calendar application server of example 6, including or excluding optional features. In this example, the computer-executable instructions, when executed by the processor, further cause the processor to: enable an expense reporting service to access the reconciled food-associated event data including the food service data to determine costs associated with the user interaction with the food service via the second remote computing system corresponding to the second calendar, wherein the expense reporting service generates an expense report based on the determined costs; and provide the expense report to the first remote computing system corresponding to the first calendar.

Example 9 includes the calendar application server of any one of examples 6 to 8, including or excluding optional features. In this example, the computer-executable instructions, when executed by the processor, cause the processor to associate a number of food services with the food-associated event within the calendar application, and the user interaction includes the selection of the desired food for the food-associated event from any of the number of food services.

Example 10 includes the calendar application server of any one of examples 6 to 9, including or excluding optional features. In this example, the budget is specified as a predefined amount for each user who is authorized to interact with the food service.

Example 11 includes the calendar application server of any one of examples 6 to 10, including or excluding optional features. In this example, the computer-executable instructions, when executed by the processor, cause the processor to provide the reconciled food-associated event data including the food service data to the first remote computing system such that the food service data generated as a result of the user interaction with the food service are presented via the first event user interface surfaced on the display of the first remote computing system.

Example 12 includes the calendar application server of any one of examples 6 to 11, including or excluding optional features. In this example, the computer-executable instructions, when executed by the processor, further cause the processor to: perform the transmission of the food-associated event invitation, the enablement of the execution of the calendar application on a corresponding computing system, the association of the food-associated event with a corresponding calendar, the providing of a corresponding event user interface, the connection with the food service, and the generation of corresponding food service data for at least one additional remote computing system; and reconcile the corresponding food service data received from the second remote computing system and the least one additional remote computing system with the food-associated event data corresponding to the food-associated event within the calendar application.

Example 13 includes the calendar application server of example 12, including or excluding optional features. In this example, the computer-executable instructions, when executed by the processor, cause the processor to provide the reconciled food-associated event data including the food service data to the first remote computing system such that the food service data generated as a result of the user interactions with the food service are presented via the first event user interface surfaced on the display of the first remote computing system.

Example 14 includes the calendar application server of any one of examples 6 to 13, including or excluding optional features. In this example, the computer-executable instructions, when executed by the processor, further cause the processor to: in response to a fourth user command received via the first event user interface, connect with the food service associated with the food-associated event via the corresponding application programming interface; in response to a second user interaction with the food service via the corresponding application programming interface, generate additional food service data for the food-associated event; and reconcile the additional food service data with the food-associated event data corresponding to the food-associated event within the calendar application such that the food-associated event is further updated with respect to the first calendar and the second calendar.

Example 15 includes the calendar application server of any one of examples 6 to 14, including or excluding optional features. In this example, the computer-executable instructions, when executed by the processor, cause the processor to utilize at least one machine learning technique to enrich the user interaction with the food service via the application programming interface.

Example 16 includes the calendar application server of any one of examples 6 to 15, including or excluding optional features. In this example, the food service includes a food delivery service, a restaurant, or a food-related donation service.

Example 17 includes the calendar application server of any one of examples 6 to 16, including or excluding optional features. In this example, the calendar application includes an application with at least one of a calendar functionality, a scheduling functionality, or a time management functionality.

Example 18 is a method for enabling food service management for a food-associated event within a context of a calendar application. The method is implemented via at least one processor. The method includes the following: associating food services with a food-associated event within a calendar application in response to first user commands received via an event user interface functionality provided by the calendar application, wherein at least one of the first user commands includes an authorization to interact with the food services according to a specified budget to select desired food for the food-associated event; connecting with any of the food services via corresponding application programming interfaces in response to second user commands received via the event user interface functionality provided by the calendar application, wherein the corresponding application programming interfaces are provided within a context of the calendar application; generating food service data for the food-associated event in response to at least one user interaction with at least one of the food services via the corresponding application programming interfaces provided within the context of the calendar application, wherein the at least one user interaction includes at least one selection of the desired food for the food-associated event, and wherein the at least one selection complies with the specified budget for interacting with the food services; and reconciling the food service data with food-associated event data corresponding to the food-associated event within the calendar application.

Example 19 includes the method of example 18, including or excluding optional features. In this example, the method includes analyzing the reconciled food-associated event data including the food service data to determine costs associated with the at least one user interaction with the at least one of the food services; generating an expense report based on the determined costs; and linking the expense report with the food-associated event within the calendar application.

Example 20 includes the method of example 18, including or excluding optional features. In this example, the method further includes enabling an expense reporting service to access the reconciled food-associated event data including the food service data to determine costs associated with the at least one user interaction with the at least one of the food services, wherein the expense reporting service generates an expense report based on the determined costs; and linking the expense report with the food-associated event within the calendar application.

In particular and in regard to the various functions performed by the above described components, devices, circuits, systems and the like, the terms (including a reference to a "means") used to describe such components are intended to correspond, unless otherwise indicated, to any component which performs the specified function of the described component, e.g., a functional equivalent, even though not structurally equivalent to the disclosed structure, which performs the function in the herein illustrated exemplary aspects of the claimed subject matter. In this regard, it will also be recognized that the innovation includes a system as well as a computer-readable storage media having computer-executable instructions for performing the acts and food-associated events of the various methods of the claimed subject matter.

There are multiple ways of implementing the claimed subject matter, e.g., an appropriate API, tool kit, driver code, operating system, control, standalone or downloadable software object, etc., which enables applications and services to use the techniques described herein. The claimed subject matter contemplates the use from the standpoint of an API (or other software object), as well as from a software or hardware object that operates according to the techniques set forth herein. Thus, various implementations of the claimed subject matter described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and additional components, and according to various permutations and combinations of the foregoing. Sub-components can also be implemented as components communicatively coupled to other components rather than included within parent components (hierarchical).

Additionally, it can be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the claimed subject matter may have been disclosed with respect to one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A computer-readable storage medium comprising computer-executable instructions that, when executed by at least one processor, cause the at least one processor to:

associate food services with a food-associated event within a calendar application in response to first user commands received via an event user interface functionality provided by the calendar application, wherein at least one of the first user commands comprises an authorization to interact with the food services according to a specified budget to select desired food for the food-associated event;

connect with any of the food services via corresponding application programming interfaces in response to second user commands received via the event user interface functionality provided by the calendar application, wherein the corresponding application programming interfaces are provided within a context of the calendar application;

generate food service data for the food-associated event in response to at least one user interaction with at least one of the food services via at least one corresponding application programming interface provided within the context of the calendar application, wherein the at least one user interaction comprises at least one selection of the desired food for the food-associated event, and wherein the at least one selection complies with the specified budget for interacting with the food services; and reconcile the food service data with food-associated event data corresponding to the food-associated event within the calendar application.

2. The computer-readable storage medium of claim 1, wherein the computer-executable instructions, when executed by the at least one processor, cause the at least one processor to:

analyze the reconciled food-associated event data comprising the food service data to determine costs associated with the at least one user interaction with the at least one of the food services;

generate an expense report based on the determined costs; and link the expense report with the food-associated event within the calendar application.

3. The computer-readable storage medium of claim 1, wherein the computer-executable instructions, when executed by the at least one processor, cause the at least one processor to:

enable an expense reporting service to access the reconciled food-associated event data comprising the food service data to determine costs associated with the at least one user interaction with the at least one of the food services, wherein the expense reporting service generates an expense report based on the determined costs; and link the expense report with the food-associated event within the calendar application.

4. The computer-readable storage medium of claim 1, wherein the computer-executable instructions, when executed by the at least one processor, cause the at least one processor to:

receive data relating to the first user commands from a remote computing system corresponding to a calendar; and receive data relating to the second user commands and the at least one user interaction with the at least one of the food services from at least one other remote computing system corresponding to at least one other calendar.

5. The computer-readable storage medium of claim 1, wherein the budget is specified as a predefined amount for each user who is authorized to interact with the food services.

6. A calendar application server, comprising:
a processor; and
a computer-readable storage medium operatively coupled to the processor, the computer-readable storage medium comprising computer-executable instructions that, when executed by the processor, cause the processor to:

enable execution of a calendar application on a first remote computing system corresponding to a first calendar, wherein the first remote computing system is communicably coupled to the calendar application server through a network;

provide a first event user interface surfaced on a display of the first remote computing system in response to a user-initiated creation of a food-associated event with respect to a first calendar within the calendar application;

associate a food service with the food-associated event within the calendar application in response to a first user command received via the first event user interface, wherein the first user command comprises an authorization to interact with the food service according to a specified budget to select desired food for the food-associated event;

transmit a food-associated event invitation to a second remote computing system corresponding to a second calendar in response to a second user command received via the first event user interface, wherein the second remote computing system is communicably coupled to the calendar application server through the network;

enable execution of the calendar application on the second remote computing system;

provide a second event user interface surfaced on a display of the second remote computing system in response to a user-initiated acceptance of the food-associated event invitation;

connect with the food service associated with the food-associated event via an application programming interface corresponding to the food service in response to a third user command received via the second event user interface, wherein the application programming interface is provided within a context of the calendar application;

generate food service data for the food-associated event in response to a user interaction with the food service via the application programming interface, wherein the user interaction comprises a selection of the desired food for the food-associated event, and wherein the selection complies with the specified budget for interacting with the food service; and reconcile the food service data with food-associated event data corresponding to the food-associated event within the calendar application such that the food-associated event is updated with respect to the first calendar and the second calendar.

7. The calendar application server of claim 6, wherein the computer-executable instructions, when executed by the processor, further cause the processor to:

analyze the reconciled food-associated event data comprising the food service data to determine costs associated with the user interaction with the food service via the second remote computing system corresponding to the second calendar;

generate an expense report based on the determined costs; and provide the expense report to the first remote computing system corresponding to the first calendar.

8. The calendar application server of claim 6, wherein the computer-executable instructions, when executed by the processor, further cause the processor to:

enable an expense reporting service to access the reconciled food-associated event data comprising the food service data to determine costs associated with the user interaction with the food service via the second remote computing system corresponding to the second calendar, wherein the expense reporting service generates an expense report based on the determined costs; and provide the expense report to the first remote computing system corresponding to the first calendar.

9. The calendar application server of claim 6, wherein the computer-executable instructions, when executed by the processor, cause the processor to associate a plurality of food services with the food-associated event within the calendar application, and wherein the user interaction comprises the selection of the desired food for the food-associated event from any of the plurality of food services.

10. The calendar application server of claim 6, wherein the budget is specified as a predefined amount for each user who is authorized to interact with the food service.

11. The calendar application server of claim 6, wherein the computer-executable instructions, when executed by the processor, cause the processor to provide the reconciled food-associated event data comprising the food service data to the first remote computing system such that the food service data generated as a result of the user interaction with the food service are presented via the first event user interface surfaced on the display of the first remote computing system.

12. The calendar application server of claim 6, wherein the computer-executable instructions, when executed by the processor, further cause the processor to:
 perform the transmission of the food-associated event invitation, the enablement of the execution of the calendar application on a corresponding computing system, the association of the food-associated event with a corresponding calendar, the providing of a corresponding event user interface, the connection with the food service, and the generation of corresponding food service data for at least one additional remote computing system; and
 reconcile the corresponding food service data received from the second remote computing system and the least one additional remote computing system with the food-associated event data corresponding to the food-associated event within the calendar application.

13. The calendar application server of claim 12, wherein the computer-executable instructions, when executed by the processor, cause the processor to provide the reconciled food-associated event data comprising the food service data to the first remote computing system such that the food service data generated as a result of the user interactions with the food service are presented via the first event user interface surfaced on the display of the first remote computing system.

14. The calendar application server of claim 6, wherein the computer-executable instructions, when executed by the processor, further cause the processor to:
 in response to a fourth user command received via the first event user interface, connect with the food service associated with the food-associated event via the corresponding application programming interface;
 in response to a second user interaction with the food service via the corresponding application programming interface, generate additional food service data for the food-associated event; and
 reconcile the additional food service data with the food-associated event data corresponding to the food-associated event within the calendar application such that the food-associated event is further updated with respect to the first calendar and the second calendar.

15. The calendar application server of claim 6, wherein the computer-executable instructions, when executed by the processor, cause the processor to utilize at least one machine learning technique to enrich the user interaction with the food service via the application programming interface.

16. The calendar application server of claim 6, wherein the food service comprises a food delivery service, a restaurant, or a food-related donation service.

17. The calendar application server of claim 6, wherein the calendar application comprises an application with at least one of a calendar functionality, a scheduling functionality, or a time management functionality.

18. A method for enabling food service management for a food-associated event within a context of a calendar application, wherein the method is implemented via at least one processor, and wherein the method comprises:
 associating food services with a food-associated event within a calendar application in response to first user commands received via an event user interface functionality provided by the calendar application, wherein at least one of the first user commands comprises an authorization to interact with the food services according to a specified budget to select desired food for the food-associated event;
 connecting with any of the food services via corresponding application programming interfaces in response to second user commands received via the event user interface functionality provided by the calendar application, wherein the corresponding application programming interfaces are provided within a context of the calendar application;
 generating food service data for the food-associated event in response to at least one user interaction with at least one of the food services via the corresponding application programming interfaces provided within the context of the calendar application, wherein the at least one user interaction comprises at least one selection of the desired food for the food-associated event, and wherein the at least one selection complies with the specified budget for interacting with the food services; and
 reconciling the food service data with food-associated event data corresponding to the food-associated event within the calendar application.

19. The method of claim 18, comprising:
 analyzing the reconciled food-associated event data comprising the food service data to determine costs associated with the at least one user interaction with at least one of the food services;
 generating an expense report based on the determined costs; and
 linking the expense report with the food-associated event within the calendar application.

20. The method of claim 18, comprising:
 enabling an expense reporting service to access the reconciled food-associated event data comprising the food service data to determine costs associated with the at least one user interaction with the at least one of the food services, wherein the expense reporting service generates an expense report based on the determined costs; and
 linking the expense report with the food-associated event within the calendar application.

\* \* \* \* \*